US 9,152,301 B2

(12) United States Patent
Akifusa et al.

(10) Patent No.: US 9,152,301 B2
(45) Date of Patent: Oct. 6, 2015

(54) INFORMATION PROCESSING APPARATUS INCLUDING PLURALITY OF DISPLAY PORTIONS AND INFORMATION PROCESSING SYSTEM

(75) Inventors: Yusuke Akifusa, Kyoto (JP); Masahiro Nitta, Kyoto (JP); Masahiko Nagaya, Kyoto (JP); Asako Kagita, Kyoto (JP); Yasuhito Fujisawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 431 days.

(21) Appl. No.: 13/242,501

(22) Filed: Sep. 23, 2011

(65) Prior Publication Data

US 2012/0075294 A1    Mar. 29, 2012

(30) Foreign Application Priority Data

Sep. 28, 2010  (JP) ................................. 2010-217102

(51) Int. Cl.
*G06T 15/00*     (2011.01)
*G09G 5/00*      (2006.01)
*G06F 3/0482*    (2013.01)
*G06F 1/16*      (2006.01)
*G06F 3/0484*    (2013.01)
*G06F 3/0485*    (2013.01)
*G06T 11/60*     (2006.01)

(52) U.S. Cl.
CPC ............ *G06F 3/0482* (2013.01); *G06F 1/1647* (2013.01); *G06F 1/1692* (2013.01); *G06F 3/0485* (2013.01); *G06F 3/04845* (2013.01); *G06T 11/60* (2013.01)

(58) Field of Classification Search
USPC .......................................................... 345/419
See application file for complete search history.

(56) References Cited

U.S. PATENT DOCUMENTS

2005/0245313 A1* 11/2005 Yoshino et al. ................. 463/30
2006/0073862 A1   4/2006 Shinoda et al.
2007/0232375 A1  10/2007 Izumi et al.
2008/0012732 A1   1/2008 Egashira (Continued)

FOREIGN PATENT DOCUMENTS

JP         6-274304       9/1994
JP         07-87433       3/1995

(Continued)

OTHER PUBLICATIONS

Office Action for U.S. Appl. No. 13/242,327, mailed Sep. 4, 2013.

(Continued)

*Primary Examiner* — Mark Zimmerman
*Assistant Examiner* — Sohum Kaji
(74) *Attorney, Agent, or Firm* — Nixon & Vanderhye P.C.

(57) ABSTRACT

An exemplary apparatus at least partially displays a first object group on a first display portion, selects at least one first object from the first object group in response to an operation of a direction operation portion, changes a selected position in an order of alignment in a second object group in response to an operation of a first or second operation portion, displays at least one object included in the second object group and corresponding to the selected position on a second display portion, adds a new object corresponding to the selected first object at a position corresponding to the selected position in the second object group in response to an operation of a third operation portion, and displays at least one object included in the second object group on the second display portion.

23 Claims, 34 Drawing Sheets

(56) References Cited

U.S. PATENT DOCUMENTS

| | | | |
|---|---|---|---|
| 2008/0085766 A1* | 4/2008 | Sitrick | 463/31 |
| 2008/0113793 A1 | 5/2008 | Miyamoto et al. | |
| 2009/0313580 A1* | 12/2009 | Nakata et al. | 715/810 |
| 2010/0079373 A1 | 4/2010 | Ohnishi | |
| 2011/0242361 A1 | 10/2011 | Kuwahara et al. | |

FOREIGN PATENT DOCUMENTS

| | | |
|---|---|---|
| JP | 2008-71271 | 3/2008 |
| JP | 2009-15331 | 1/2009 |
| JP | 2009-129417 | 6/2009 |
| JP | 2009-151638 | 7/2009 |
| JP | 2010-79589 | 4/2010 |
| WO | WO 9845830 A1 * | 10/1998 |
| WO | 2005/089895 | 9/2005 |
| WO | WO 2010/038296 | 4/2010 |

OTHER PUBLICATIONS

Office Action issued in U.S. Appl. No. 13/242,327 dated Sep. 12, 2014.

Office Action dated May 9, 2014 issued in connection with U.S. Appl. No. 13/242,327.

U.S. Appl. No. 13/242,327, filed Sep. 23, 2011.

* cited by examiner

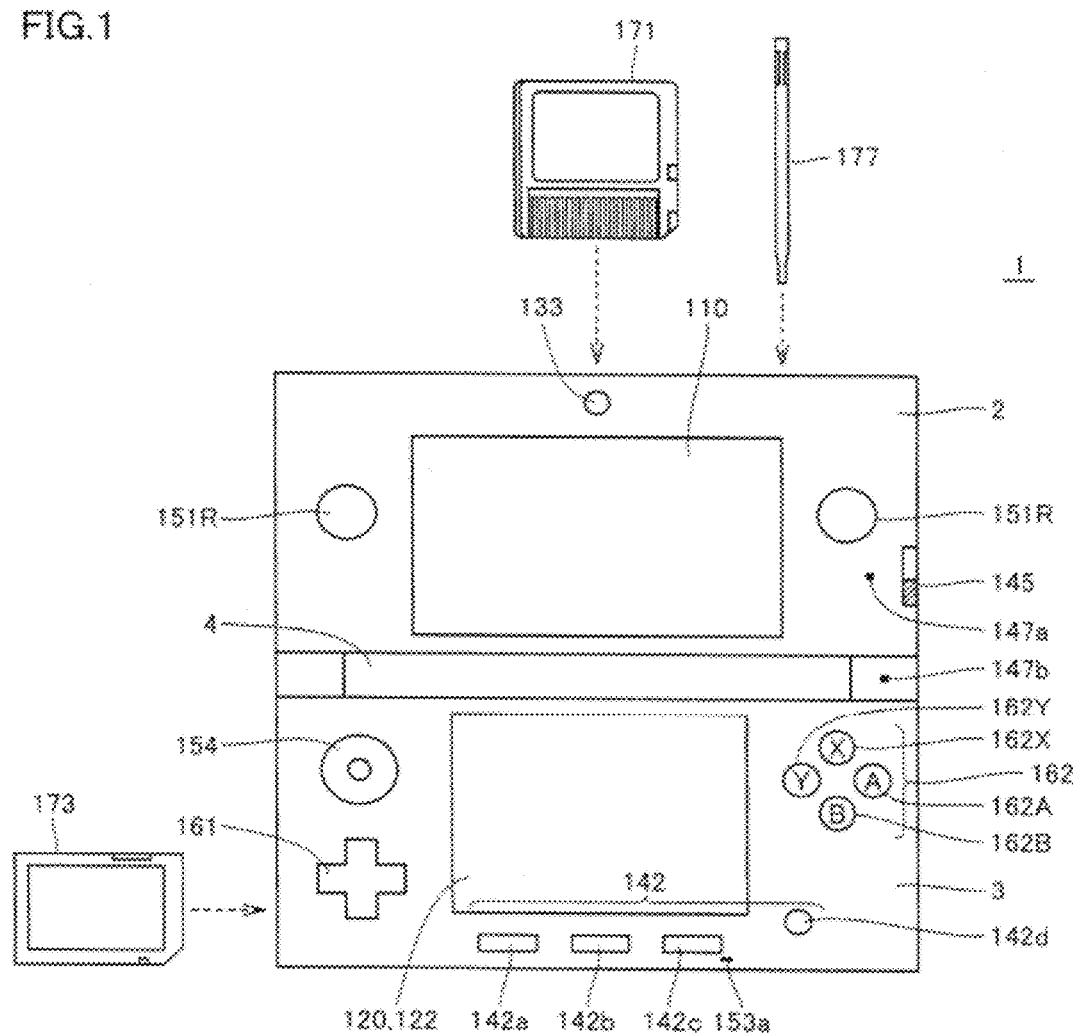

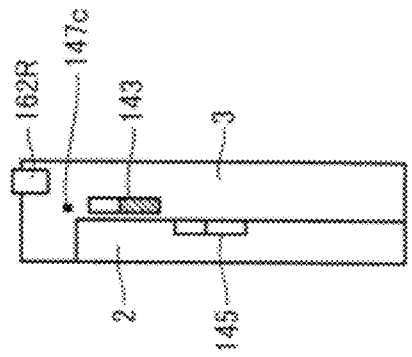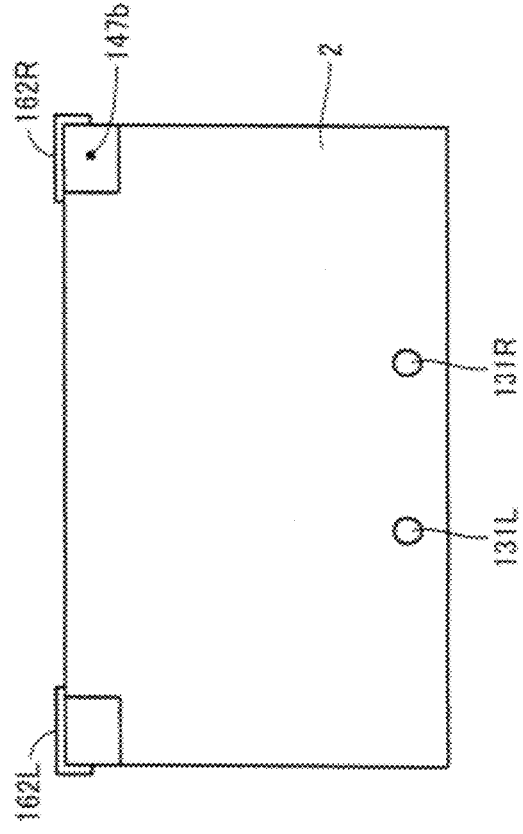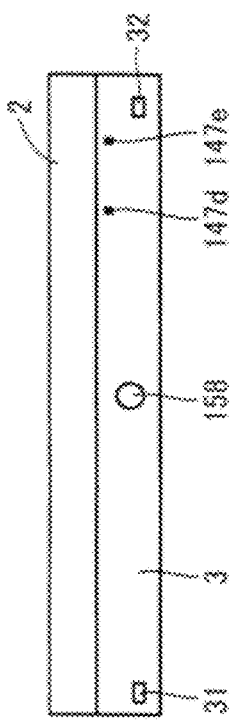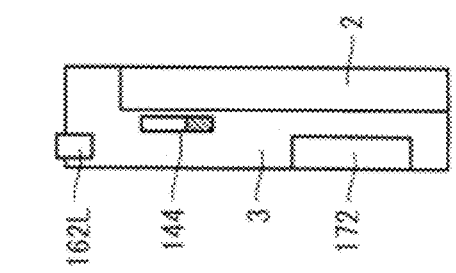

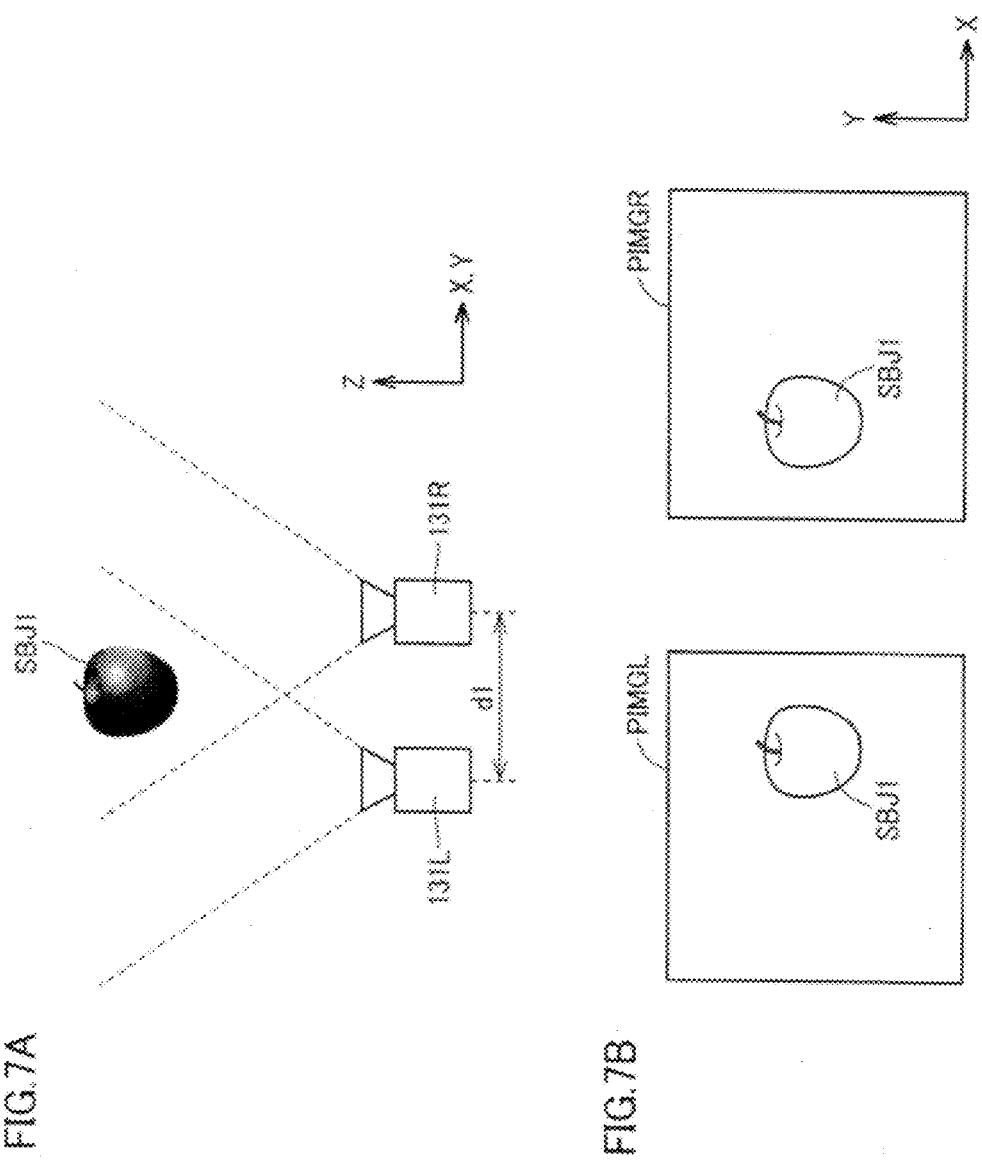

FIG.8A 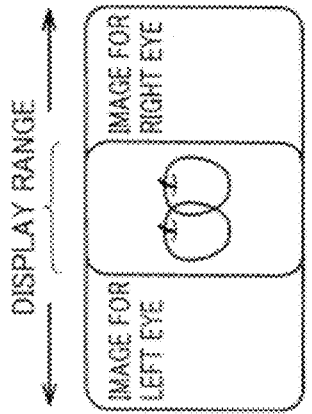 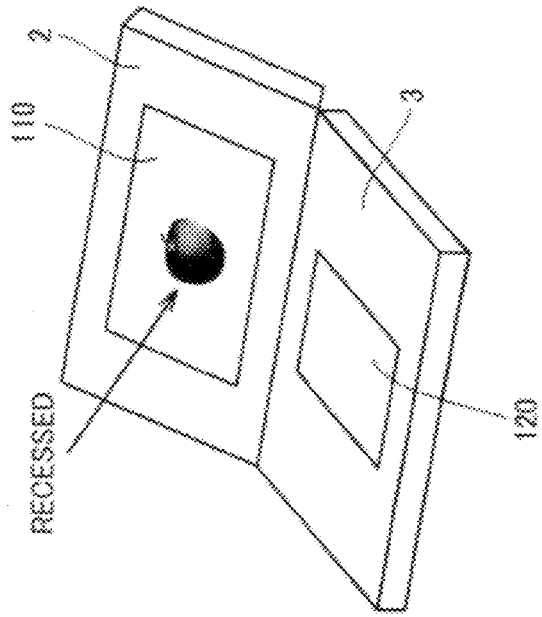
FIG.8B 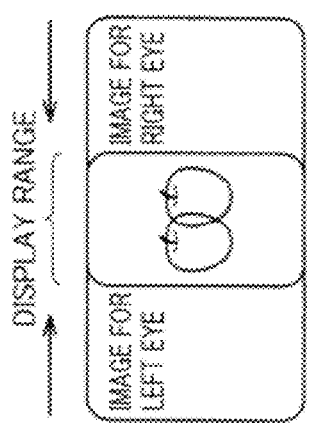 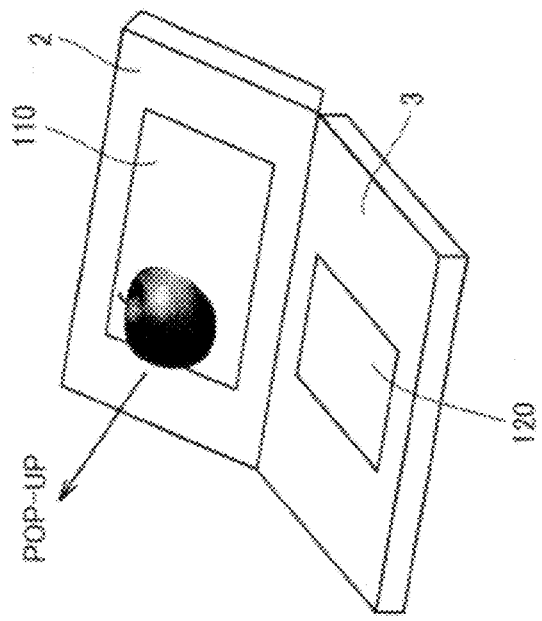

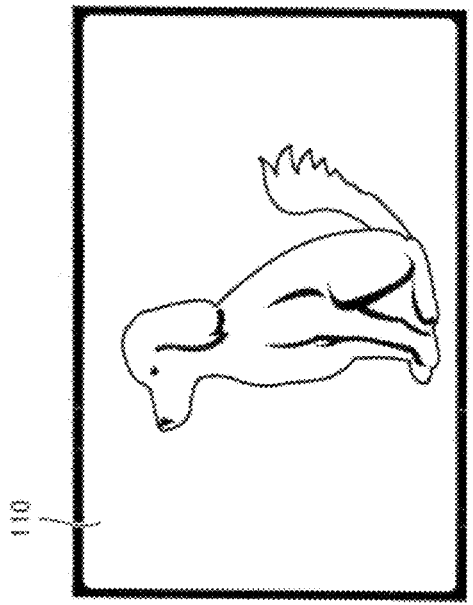
FIG.10A
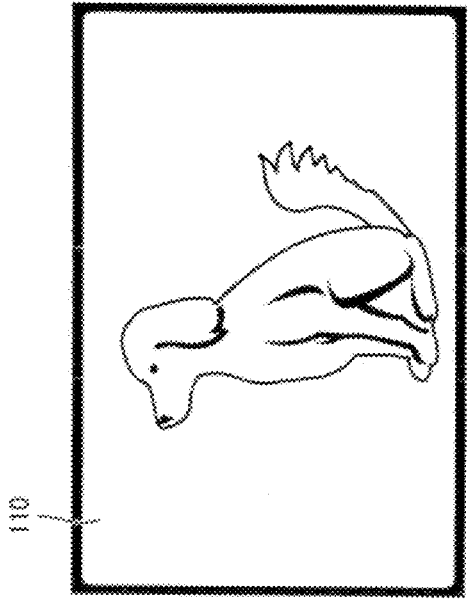
FIG.10B
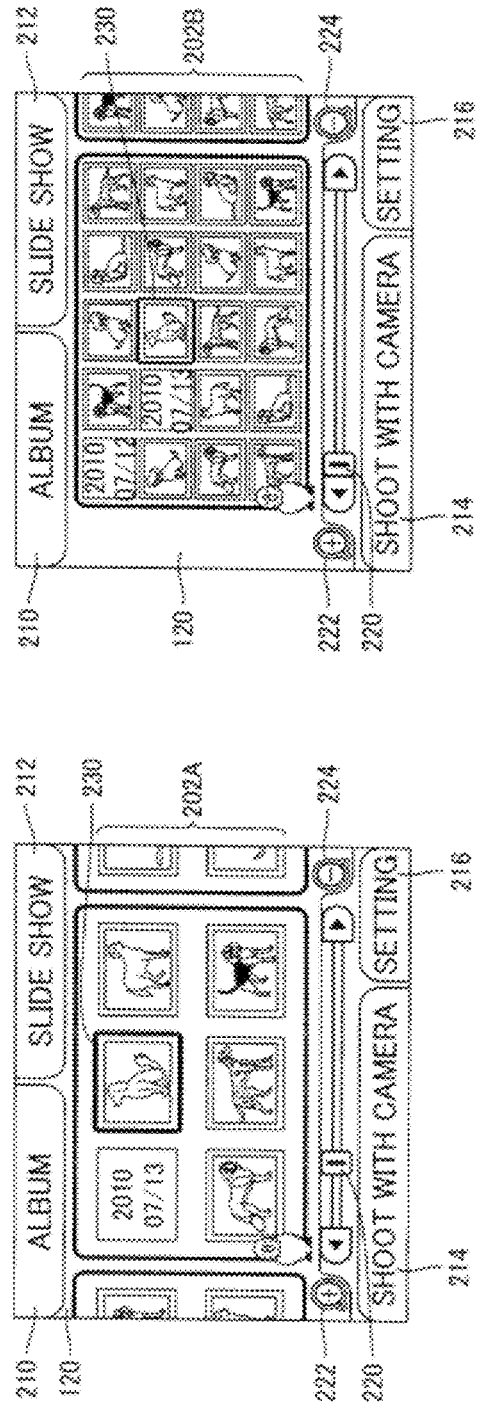

FIG.31
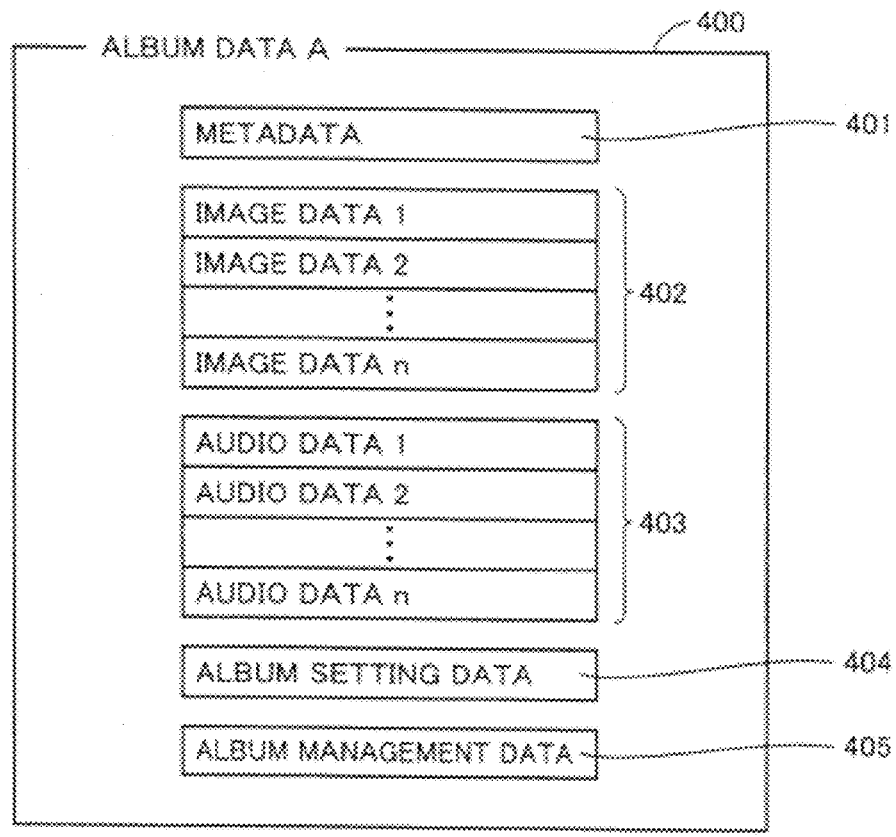
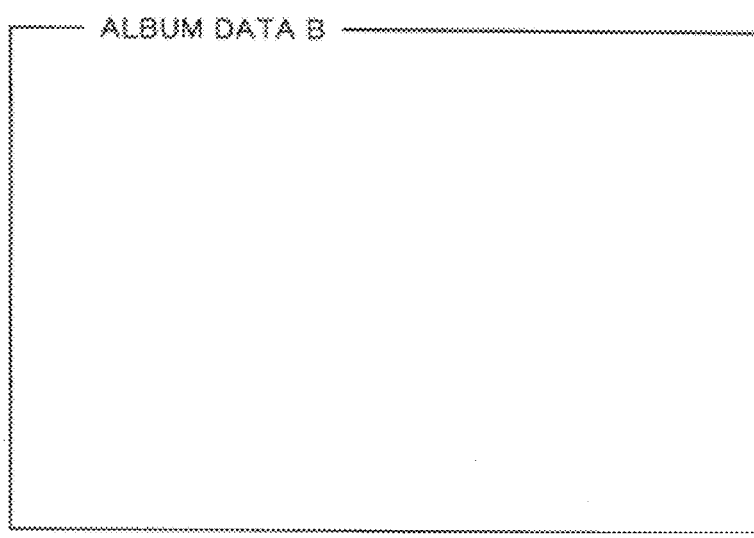

INFORMATION PROCESSING APPARATUS INCLUDING PLURALITY OF DISPLAY PORTIONS AND INFORMATION PROCESSING SYSTEM

This nonprovisional application is based on Japanese Patent Application No. 2010-217102 filed with the Japan Patent Office on Sep. 28, 2010, the entire contents of which are hereby incorporated by reference.

FIELD

The invention generally relates to an information processing apparatus including a plurality of display portions and an information processing system.

BACKGROUND AND SUMMARY

An information processing apparatus having a plurality of display portions have conventionally been developed and commercially available. For example, an information processing apparatus having two displays and an operation portion arranged adjacent to the display is disclosed. In the information processing apparatus having a plurality of displays, display contents on the displays can be independent of each other.

On the other hand, depending on contents in information processing, it may also be necessary to perform processing relating to objects displayed on respective displays.

An exemplary embodiment provides novel information processing apparatus and information processing system allowing processing relating to objects displayed on a plurality of display portions respectively to more intuitively be performed.

An information processing apparatus according to an exemplary embodiment includes a first housing, a second housing coupled to the first housing for allowing opening and closing, and a processing unit. The first housing includes a first display portion provided in a main surface which is a surface hidden when the first housing and the second housing are closed, first and second operation portions provided at respective opposing sides along an upper side which is a side where the second housing is present when the first housing and the second housing are opened, a third operation portion provided on any one of left and right sides of the first display portion in the main surface of the first housing, and a direction operation portion provided on any the other one of the left and right sides of the first display portion in the main surface of the first housing. The second housing includes a second display portion provided in its main surface. The main surface of the second housing and the main surface of the first housing face substantially an identical direction when the first housing and the second housing are opened. The processing unit includes a first object selection unit for at least partially displaying a first object group on the first display portion and selecting at least one first object from the first object group in response to an operation of the direction operation portion, a second object display unit for changing a selected position in an order of alignment in a second object group in response to an operation of the first or second operation portion and causing the second display portion to display at least one object included in the second object group and corresponding to the selected position, and an object addition unit for adding a new object corresponding to the selected first object at a position corresponding to the selected position in the second object group in response to an operation of the third operation portion and then displaying at least one object included in the second object group on the second display portion.

According to the exemplary embodiment, the user can change the selected position in the order of alignment in the second object group by operating the first and second operation portions provided on respective opposing sides along the upper side of the first housing and can select at least one first object from the first object group by operating the direction operation portion provided on any of left and right sides of the first display portion in the main surface of the first housing, independently of change in the selected position in the order of alignment in this second object group. Then, the user can add a new object corresponding to the selected first object at a position corresponding to the selected position in the second object group by operating the third operation portion located on the side opposite to the direction operation portion relative to the first display portion in the main surface of the first housing.

By operating the first to third operation portions and the direction operation portion provided at respective different positions in the first housing, such processing as adding a new object corresponding to the arbitrarily selected first object at any position in the second object group can be performed. Therefore, when the user holds the first housing with his/her both hands, an operation as intended by the user can intuitively and readily be performed with each hand.

According to an exemplary embodiment, the first housing further includes a fourth operation portion provided on the side where the third operation portion is located, relative to the first display portion. The processing unit further includes an object deletion unit for deleting at least one object included in the second object group and corresponding to the selected position in response to an operation of the fourth operation portion and then displaying at least one object included in the second object group on the second display portion.

In addition, according to the exemplary embodiment, an object added to the second object group can readily be deleted, so that addition/deletion of an object to/from the second object group can more intuitively be carried out. Therefore, the user can be provided with fun in determining by trial and error a new object to be added to the second object group.

According to an exemplary embodiment, the second object display unit provides display in a line, of objects included in the second object group in a direction in parallel to the upper side of the first housing and slides the objects included in the displayed second object group in a direction brought in correspondence with relative positional relation with the first or second operation portion relative to the first display portion in response to an operation of the first or second operation portion.

According to the exemplary embodiment, as the user operates the first operation portion or the second operation portion, the second object group displayed in a line is slid in the direction of operation. Therefore, the user can intuitively understand which operation portion of the first operation portion and the second operation portion should be operated in changing a selected position in the order of alignment in the second object group to a target position. Therefore, a selected position in the order of alignment in the second object group can more readily and quickly be set.

According to an exemplary embodiment, the direction operation portion is a cross-shaped key or an analog stick. The first object selection unit provides two-dimensional display of objects included in the first object group and display of a selected image indicating the selected first object at a position in accordance with an operation of the direction operation portion.

According to the exemplary embodiment, the selected image can be moved, and any first object can be selected by operating the direction operation portion in connection with the objects included in the two-dimensionally displayed first object group. Therefore, the user can more readily and quickly select a target first object. In addition, since indication in four directions can be given with one hand by operating a cross-shaped key or an analog stick, a selection operation can be made faster.

According to an exemplary embodiment, the first display portion includes a touch panel. The processing unit further includes an input processing unit capable of performing processing identical to corresponding processing performed when an operation of any of the first to third operation portions and the direction operation portion is performed, based on information detected in response to an operation of the touch panel.

According to the exemplary embodiment, similar processing can be performed also with an operation of a touch panel in addition to an input operation using the first to third operation portions and the direction operation portion. Therefore, the user can select an input method depending on the user's own knowledge level or operability suited to himself/herself. Namely, with an input interface using the touch panel, a message for assisting a user's operation can be displayed, and therefore even a user unaccustomed to a key operation can perform desired processing. On the other hand, a user accustomed to a key operation can quickly perform desired processing by operating the first to third operation portions and the direction operation portion.

According to an exemplary embodiment, the second display portion includes a display capable of stereoscopic display.

According to the exemplary embodiment, the user can enjoy stereoscopic display.

According to an exemplary embodiment, the third and fourth operation portions are arranged within a reach of a user's right thumb when the user holds the first housing with both hands. The direction operation portion is arranged within a reach of a user's left thumb when the user holds the first housing with both hands.

According to an exemplary embodiment, the first operation portion is arranged within a reach of a user's right forefinger when the user holds the first housing with both hands, and the second operation portion is arranged within a reach of a user's left forefinger when the user holds the first housing with both hands.

According to the exemplary embodiment(s), the user's right and left thumbs and forefingers are used to independently perform input operations using the first to third operation portions and the direction operation portion respectively. Therefore, the user can intuitively and quickly perform an input operation.

An information processing apparatus according to an exemplary embodiment includes a first housing, a second housing coupled to the first housing for allowing opening and closing, and a processing unit. The first housing includes a first display portion provided in a main surface which is a surface hidden when the first housing and the second housing are closed, first and second operation portions provided at respective opposing sides along an upper side which is a side where the second housing is present when the first housing and the second housing are opened, a third operation portion provided on any one of left and right sides of the first display portion in the main surface of the first housing, and a direction operation portion provided on any the other one of the left and right sides of the first display portion in the main surface of the first housing. The second housing includes a second display portion provided in its main surface. The main surface of the second housing and the main surface of the first housing face substantially an identical direction when the first housing and the second housing are opened. The processing unit includes a first object selection unit for at least partially displaying a first object group on the first display portion and selecting at least one first object from the first object group in response to an operation of the direction operation portion, a second object display unit for changing a selected position in an order of alignment in a second object group in response to an operation of the first or second operation portion and causing the second display portion to display at least one object included in the second object group and corresponding to the selected position, and an association unit for associating data corresponding to the selected first object with data showing at least one object included in the second object group and corresponding to the selected position in the second object group in response to an operation of the third operation portion and then displaying the associated object on the second display portion, with association with the data being shown.

According to the exemplary embodiment, the user can change the selected position in the order of alignment in the second object group by operating the first and second operation portions provided on respective opposing sides along the upper side of the first housing and can select at least one first object from the first object group by operating the direction operation portion provided on any of left and right sides of the first display portion in the main surface of the first housing, independently of change in the selected position in the order of alignment in this second object group. Then, the user can associate data corresponding to the selected first object with data showing at least one object included in the second object group and corresponding to the selected position in the second object group by operating the third operation portion located on the side opposite to the direction operation portion relative to the first display portion in the main surface of the first housing.

By operating the first to third operation portions and the direction operation portion provided at respective different positions in the first housing, such data corresponding to the arbitrarily selected first object can be associated with any object included in the second object group. Therefore, when the user holds the first housing with his/her both hands, an operation as intended by the user can intuitively and readily be performed with each hand.

According to an exemplary embodiment, the first housing further includes a fourth operation portion provided on the side where the third operation portion is located, relative to the first display portion. The processing unit further includes an association cancellation unit for canceling association with data showing at least one object included in the second object group and corresponding to the selected position in the second object group in response to an operation of the fourth operation portion and then displaying the object, of which association has been canceled, on the second display portion, with absence of association with data being shown.

Further, according to the exemplary embodiment, association of data with the objects included in the second object group can readily be canceled and therefore processing for associating data with an object in the second object group can be performed/canceled more intuitively. Therefore, the user can be provided with fun in determining by trial and error data to be associated with each object included in the second object group.

According to the exemplary embodiment(s), features similar to those in the exemplary embodiment(s) described above respectively can be achieved.

According to an exemplary embodiment, an information processing system including a non-transitory storage medium storing an information processing program and a processing apparatus main body to which the storage medium can be attached is provided. The processing apparatus main body includes a first housing, a second housing coupled to the first housing for allowing opening and closing, and a processing unit. The first housing includes a first display portion provided in a main surface which is a surface hidden when the first housing and the second housing are closed, first and second operation portions provided at respective opposing sides along an upper side which is a side where the second housing is present when the first housing and the second housing are opened, a third operation portion provided on any one of left and right sides of the first display portion in the main surface of the first housing, and a direction operation portion provided on any the other one of the left and right sides of the first display portion in the main surface of the first housing. The second housing includes a second display portion provided in its main surface. The main surface of the second housing and the main surface of the first housing face substantially an identical direction when the first housing and the second housing are opened. The storage medium includes instructions executed by a computer of the processing apparatus main body, the instructions including first object selection instructions for at least partially displaying a first object group on the first display portion and selecting at least one first object from the first object group in response to an operation of the direction operation portion, second object display instructions for changing a selected position in an order of alignment in a second object group in response to an operation of the first or second operation portion and displaying at least one object included in the second object group and corresponding to the selected position on the second display portion, and object addition instructions for adding a new object corresponding to the selected first object at a position corresponding to the selected position in the second object group in response to an operation of the third operation portion and then displaying at least one object included in the second object group on the second display portion.

According to an exemplary embodiment, an information processing system including a non-transitory storage medium storing an information processing program and a processing apparatus main body to which the storage medium can be attached is provided. The processing apparatus main body includes a first housing, a second housing coupled to the first housing for allowing opening and closing, and a processing unit. The first housing includes a first display portion provided in a main surface which is a surface hidden when the first housing and the second housing are closed, first and second operation portions provided at respective opposing sides along an upper side which is a side where the second housing is present when the first housing and the second housing are opened, a third operation portion provided on any one of left and right sides of the first display portion in the main surface of the first housing, and a direction operation portion provided on any the other one of the left and right sides of the first display portion in the main surface of the first housing. The second housing includes a second display portion provided in its main surface. The main surface of the second housing and the main surface of the first housing face substantially an identical direction when the first housing and the second housing are opened. The storage medium includes instructions executed by a computer of the processing apparatus main body, the instructions including first object selection instructions for at least partially displaying a first object group on the first display portion and selecting at least one first object from the first object group in response to an operation of the direction operation portion, second object display instructions for changing a selected position in an order of alignment in a second object group in response to an operation of the first or second operation portion and displaying at least one object included in the second object group and corresponding to the selected position on the second display portion, and association instructions for associating data corresponding to the selected first object with data showing at least one object included in the second object group and corresponding to the selected position in the second object group in response to an operation of the third operation portion and then displaying the associated object on the second display portion, with association with the data being shown.

The foregoing and other objects, features, aspects and advantages of the exemplary embodiment(s) will become more apparent from the following detailed description when taken in conjunction with the accompanying drawings.

BRIEF DESCRIPTION OF THE DRAWINGS

FIG. 1 shows an exemplary non-limiting top view of a game device (in an opened state) according to an exemplary embodiment.

FIGS. 2A to 2D show exemplary non-limiting projection views with an upper surface side of the game device shown in FIG. 1 being the center.

FIGS. 7A and 7B show exemplary non-limiting diagrams for illustrating one example of a method of generating a pair of images having parallax used in stereoscopic display in the game device.

FIGS. 8A and 8B show exemplary non-limiting diagrams for illustrating a method of providing stereoscopic display using the pair of images having parallax generated with the method shown in FIGS. 7A and 7B.

FIGS. 10A and 10B show exemplary non-limiting diagrams each showing a screen example of a "viewing mode" (a state ST4) shown in FIG. 9.

FIG. 31 shows an exemplary non-limiting diagram showing a data structure of album data generated in the game device.

DETAILED DESCRIPTION OF NON-LIMITING EXAMPLE EMBODIMENTS

Figure 3B:
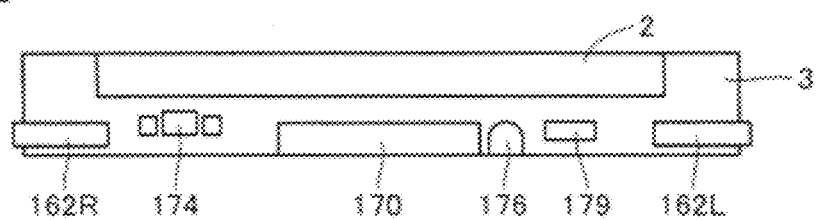
FIGS. 3A and 3B show exemplary non-limiting projection views with a bottom surface side of the game device shown in FIG. 1 being the center.

One or more exemplary embodiments will be described in detail with reference to the drawings. The same or corresponding elements in the drawings have the same reference characters allotted, and description thereof will not be repeated.

A portable game device 1 representing a computer will be described hereinafter as a representative example of an information processing apparatus according an exemplary embodiment. In particular, game device 1 according to the present embodiment has a plurality of display devices (display portions) as will be described later and at least one display device is capable of providing stereoscopic display. It is noted that even an information processing apparatus not incorporating a display device capable of providing stereoscopic display can provide a user interface according to the present embodiment.

An implementation example of the information processing apparatus is not limited to game device 1 so long as it has a plurality of display devices (display portions) and an operation portion. In addition, as will be described later, implementation as an information processing system including a storage medium storing an information processing program and a processing apparatus main body to which the storage medium can be attached may be included as one form of an exemplary embodiment.

<A. Definition>

(1) In the present specification, "stereoscopic display", "three-dimensional display" and "3D display" mean that an image is expressed such that the user can visually recognize at least a partial object included in the image stereoscopically. In order to have the user visually recognize the object stereoscopically, typically, physiological functions of eyes and brain of a human are utilized. Such stereoscopic display is realized by using images displayed such that an object is stereoscopically visually recognized by the user (typically, a stereo image).

(2) In the present specification, "planar display", "two-dimensional display" and "2D display" are terms as opposed to "stereoscopic display" and the like described above, and they mean that an image is expressed such that the user cannot visually recognize an object included in the image stereoscopically.

<B. Overview>

Game device 1 according to the present embodiment has a first housing (a lower housing 3) and a second housing (an upper housing 2) coupled to allow opening and closing, and a first display portion (a lower LCD 120) is provided in a main surface of the first housing. In the first housing, first and second operation portions (an L button 162L and an R button 162R) are provided at respective opposing sides along its upper side and a third operation portion (an operation button 162A) and a direction operation portion (a cross-shaped key 161) are provided on respective opposing sides of the first display portion.

Then, a first object group (a plurality of thumbnail images or audio icons) is at least partially displayed on lower LCD 120 and at least one first object (a thumbnail image or an audio icon) is selected in response to an operation of the direction operation portion (cross-shaped key 161). On the other hand, in response to an operation of the first or second operation portion, a selected position in the order of alignment in a second object group (images included in an album being created) is changed.

Further, in response to an operation of the third operation portion, a new object (new image) corresponding to the selected first object is added at a position corresponding to the selected position in the second object group. It is noted that the second object group to which this new object has been added is displayed on an upper LCD 110.

Alternatively, in response to an operation of the third operation portion, data corresponding to the selected first object is associated with an object corresponding to the selected position in the second object group. It is noted that this associated object is displayed on upper LCD 110, with association of the data being shown.

Details of game device 1 according to the present embodiment will be described hereinafter.

<C. Appearance of Device>

Figure 3A:
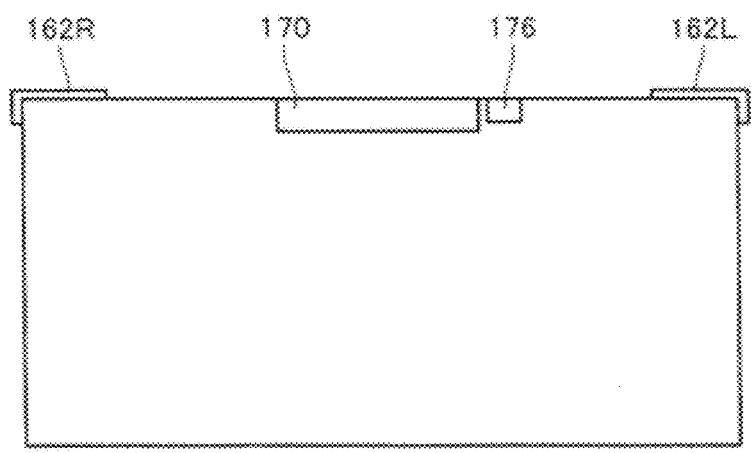

FIG. 1 shows a top view of game device 1 (in an opened state) according to an exemplary embodiment. FIG. 2A shows a top view of game device 1 (in a closed state), FIG. 2B shows a front view of game device 1, FIG. 2C shows a left side view of game device 1, and. FIG. 2D shows a right side view of game device 1. FIG. 3A shows a bottom view of game device 1 and FIG. 3B shows a rear view of game device 1. In the present specification, for the sake of convenience, with arrangement of game device 1 as shown in FIG. 1 being the reference, the terms "top", "front", "left side", "right side", "bottom", and "rear" are used, however, these terms are formally used and they do not intend to restrict a manner of use of game device 1 by the user.

Portable game device 1 according to the present embodiment is configured to be foldable. Appearance of game device 1 in an opened state is as shown in FIG. 1, and appearance thereof in a closed state is as shown in FIG. 2A. Game device 1 preferably has such a size that the user can hold game device 1 with both hands or one hand even in the opened state.

Game device 1 has upper housing 2 (second housing) and lower housing 3 (first housing). Upper housing 2 and lower housing 3 are coupled to allow opening and closing so that they are foldable. In the example shown in FIG. 1, upper housing 2 and lower housing 3 are each formed like a rectangular plate, and they are coupled to each other to be pivotable around a long side portion thereof by means of a hinge 4. Game device 1 is maintained in the opened state when used by the user and it is maintained in the closed state when not used.

In addition, in game device 1, an angle between upper housing 2 and lower housing 3 can also be maintained at any angle between a position in the closed state and a position in the opened state (approximately 0° to approximately 180°). In other words, upper housing 2 can rest at any angle with respect to lower housing 3. For resting of these housings, friction force or the like generated in a coupling portion between upper housing 2 and lower housing 3 is used. In addition to or instead of friction force, a latch mechanism may be adopted in the coupling portion between upper housing 2 and lower housing 3.

In upper housing 2, upper LCD (Liquid Crystal Display) 110 is provided on its main surface, as a display (display portion) capable of providing stereoscopic display. Here, the "main surface" means a surface of each housing hidden when upper housing 2 and lower housing 3 are closed.

Upper LCD 110 has a display region in a rectangular shape and it is arranged such that a direction in which its long side extends coincides with a direction in which a long side of upper housing 2 extends. In game device 1 according to the present embodiment, upper LCD 110 greater in screen size than lower LCD 120 is adopted so that the user can further enjoy stereoscopic display. It is noted, however, that the screen size does not necessarily have to be different as such, and a screen size can be designed as appropriate, depending on usage of an application, a size of game device 1, or the like. A detailed configuration of upper LCD 110 will be described later.

An image pick-up device (image pick-up means) for picking up an image of some subject is provided in upper housing 2. More specifically, a pair of outer cameras 131L, 131R (see FIG. 2A) and an inner camera 133 (see FIG. 1) are provided in upper housing 2. Here, inner camera 133 is arranged above upper LCD 110, while the pair of outer cameras 131L and 131R is arranged in a surface opposite to a main surface where inner camera 133 is arranged, that is, in a surface of upper housing 2 exposed when upper housing 2 and lower housing 3 are opened.

Based on such positional relation, the pair of outer cameras 131L and 131R can pick up an image of a subject present in a direction opposite to the main surface of upper housing 2, while inner camera 133 can pick up an image of a subject present in a direction opposite to the direction of image pick-up by outer cameras 131L and 131L, that is, in a direction the same as the direction in which the main surface of upper housing 2 faces.

The pair of outer cameras 131L and 131R is arranged at a prescribed distance from each other, and data of a pair of images obtained by these outer cameras 131L and 131R (hereinafter also referred to as an "input image") is used for reproduction of the subject in stereoscopic display. Namely, outer cameras 131L and 131R function as what is called stereo cameras. Prescribed parallax in accordance with relative positional relation between outer camera 131L and outer camera 131R is present between the pair of input images obtained as a result of image pick-up by outer cameras 131L and 131R.

Meanwhile, an input image obtained as a result of image pick-up by inner camera 133 is basically used for non-stereoscopic display (two-dimensional display, normal display). Therefore, in game device 1 according to the present embodiment, a pair of input images for stereoscopic display can be obtained by activating outer cameras 131L and 131R, and an input image for non-stereoscopic display can be obtained by activating inner camera 133.

In addition, in upper housing 2, stereoscopic vision volume 145 is provided on the right of upper LCD 110. This stereoscopic vision volume 145 is used for adjusting stereoscopic display on upper LCD 110.

It is noted that switching between outer cameras 131L and 131R and inner camera 133, that is, switching between stereoscopic display and two-dimensional display, can also be selected by the user on a program executed on game device 1. Here, stereoscopic vision volume 145 may be used for switching between stereoscopic display and two-dimensional display.

A speaker (a speaker 151 shown in FIG. 4) serving as an audio generation device (audio generation means) is accommodated in upper housing 2. More specifically, sound emission holes 151L and 151R are arranged on respective left and right sides of upper LCD 110 arranged in a central portion of the main surface of upper housing 2. Voice and sound generated from speaker 151 is emitted toward the user through sound emission holes 151L and 151R communicating with speaker 151.

Meanwhile, in lower housing 3, lower LCD 120 is provided on its main surface, as a display portion (display means). Namely, lower LCD 120 is provided in the main surface, which is a surface of lower housing 3, hidden when upper housing 2 and lower housing 3 are closed. On the other hand, upper LCD 110 is provided in the main surface of upper housing 2. The main surface of upper housing 2 and the main surface of lower housing 3 face substantially an identical direction when upper housing 2 and lower housing 3 are opened.

Lower LCD 120 has a display region in a rectangular shape and it is arranged such that a direction in which its long side extends coincides with a direction in which a long side of lower housing 3 extends. Though a display device capable of providing stereoscopic display as will be described later may be adopted as lower LCD 120, in the present embodiment, a common display device for providing non-stereoscopic display of various types of information or the like is adopted. Therefore, for example, a display device of other appropriate types such as a display utilizing EL (Electro Luminescence) may be adopted as lower LCD 120. In addition, resolution of the display portion (display means) is appropriately designed, depending on an application or the like to be executed.

In lower housing 3, a control pad 154, a cross-shaped key 161, and button groups 142, 162 are provided as input means (input devices) for accepting an input operation from a user or the like. These input portions are provided on the main surface of lower housing 3, which is a surface hidden when upper housing 2 and lower housing 3 are folded.

As shown in FIG. 1, cross-shaped key 161 is provided on the left on the sheet surface of lower LCD 120 on the main surface of lower housing 3 and button group 162 is provided on the right on the sheet surface of lower LCD 120 on the main surface of lower housing 3.

In particular, preferably, cross-shaped key 161 is arranged at such a position as being readily operated with the user's left hand when he/she holds game device 1 (lower housing 3) with both hands, and button group 162 is arranged at such a position as being readily operated with the user's right hand when he/she holds game device 1 (lower housing 3) with both hands. Namely, preferably, cross-shaped key 161 is arranged within a reach of the user's left thumb when he/she holds lower housing 3 with his/her both hands and button group 162 is arranged within a reach of the user's right thumb when he/she holds lower housing 3 with, his/her both hands.

It is noted that cross-shaped key 161 and button group 162 should only be provided on respective opposing sides (in a lateral direction of the sheet surface) with lower LCD 120 lying therebetween, and cross-shaped key 161 may be provided in positional relation opposite to the state shown in FIG. 1, that is, cross-shaped key 161 being provided on the right on the sheet surface of lower LCD 120 and button group 162 being provided on the left on the sheet surface of lower LCD 120. In this case as well, cross-shaped key 161 and button group 162 are preferably arranged at such positions that they can readily be operated with the user's right and left hands respectively when he/she holds game device 1 (lower housing 3) with his/her both hands.

Control pad 154 mainly accepts an operation for adjusting stereoscopic display on game device 1. In particular, control pad 154 represents one example of an analog device capable of simultaneously accepting inputs having at least two degrees of freedom. More specifically, control pad 154 has a projection accepting a user's operation and it is structured to be able to change relative positional relation with respect to lower housing 3 at least in a vertical direction of the sheet surface and a horizontal direction of the sheet surface. In addition, control pad 154 outputs a two-dimensional analog value in accordance with a direction of displacement and an amount of displacement from a prescribed reference position.

By way of typical example, control pad 154 includes two potentiometers brought in correspondence with two axes respectively, and each potentiometer outputs an analog value (typically, a voltage or a current) having a value in accordance with an amount of operation and a direction of operation by the user. As the user varies control pad 154 to a larger extent from the reference position (typically, a direction perpendicular to lower housing 3), control pad 154 outputs a greater analog value.

It is noted that an analog stick, a joystick or the like may be adopted, instead of control pad 154 shown in FIG. 1.

Cross-shaped key 161 is a direction operation portion capable of independently providing input in two directions, and outputs a two-dimensional value having values in accordance with a user's key operation in each direction. More specifically, cross-shaped key 161 permits displacement in the vertical direction of the sheet surface and the lateral direction of the sheet surface by the user, and outputs "ON" or "OFF" in correspondence with the direction of displacement.

It is noted that an analog stick, a joystick or the like allowing a direction operation may be adopted, instead of cross-shaped key 161. In addition, instead of cross-shaped key 161 as an integrally structured component, such a feature that independent buttons (four buttons in a case of four directions) brought in correspondence with respective directions are arranged or such a feature that a key brought in correspondence with an operation in a vertical direction of the sheet surface and a key brought in correspondence with an operation in a lateral direction of the sheet surface are independently arranged can also be adopted.

Button group 162 includes four operation buttons 162A, 162B, 162X, and 162Y. As the user operates operation button 162A, 162B, 162X, 162Y arranged in correspondence with each direction, a value indicating a state of operation is output.

The operation input output from cross-shaped key 161 and/or button group 162 may be used for adjustment of stereoscopic display in game device 1. Alternatively, in various applications executed on game device 1, these operation inputs are used for such operations as select, enter and cancel involved with game processing.

Button group 142 includes a select button 142a, a HOME button 142b, a start button 142c, and a power button 142d. Select button 142a is typically used for selecting an application to be executed on game device 1. HOME button 142b is typically used for setting a menu application or various applications executed on game device 1 to an initial state. Start button 142c is typically used for starting execution of an application on game device 1. Power button 142d is used for turning ON/OFF power of game device 1.

As shown in FIGS. 2C, 2D, 3A, and 3B, L button 162L is provided at a left end portion of a rear surface of lower housing 3 and R button 162R is provided at a right end portion of the rear surface of lower housing 3. Namely, L button 162L and R button 162R are provided at opposing sides along the upper side of the sheet surface, which is a side where lower housing 3 is present when upper housing 2 and lower housing 3 are opened.

In particular, preferably, L button 162L is arranged at a position where it can readily be operated by the user's left hand when he/she holds game device 1 (lower housing 3) with his/her both hands and R button 162R is arranged at a position where it can readily be operated by the user's right hand when he/she holds game device 1 (lower housing 3) with his/her both hands. Namely, preferably, L button 162L is arranged within a reach of the user's left forefinger when he/she holds lower housing 3 with his/her both hands and R button 162R is arranged within a reach of the user's right forefinger when he/she holds lower housing 3 with his/her both hands.

L button 162L and R button 162R are used for such an operation as select in various applications executed in game device 1.

A microphone (a microphone 153 shown in FIG. 4) serving as an audio obtaining device (audio obtaining means) is accommodated in lower housing 3. On the main surface of lower housing 3, a microphone hole 153a for microphone 153 to obtain sound around game device 1 is provided. It is noted that a position where microphone 153 is accommodated and a position of microphone hole 153a communicating with microphone 153 are not limited to those in the main surface of lower housing 3. For example, microphone 153 may be accommodated in hinge 4 and microphone hole 153a may be provided in the surface of hinge 4 at a position corresponding to a position where microphone 153 is accommodated.

In game device 1, in addition to control pad 154, cross-shaped key 161, and button groups 142, 162, a touch panel 122 is further provided as a pointing device serving as another operation portion (input portion). Touch panel 122 is attached to cover a screen of lower LCD 120, and when the user performs an input operation (a position indication operation, a pointing operation), touch panel 122 detects a value of a corresponding two-dimensional coordinate.

Typically, resistive touch panel 122 can be adopted. It is noted, however, that touch panel 122 is not limited to the resistive type and various pressing-type touch panels may also be adopted. In addition, touch panel 122 preferably has resolution (detection accuracy) as high as that of lower LCD 120 (display accuracy). It is noted that the resolution of touch panel 122 does not necessarily have to exactly be equal to the resolution of lower LCD 120.

A pointing operation onto touch panel 122 is normally performed by the user with the use of a stylus pen 177, however, instead of stylus pen 177, the pointing operation (input operation) can also be performed with a user's own finger or the like. As shown in FIGS. 1 and 3C, an accommodation portion 176 for stylus pen 177 is provided in the rear surface of lower housing 3. Namely, stylus pen 177 for an input operation onto touch panel 122 is normally stored in accommodation portion 176 and it is taken out by the user as necessary.

Instead of or in addition to touch panel 122, a mouse, a track ball, a pen tablet, or the like may be employed as a pointing device serving as accepting means for accepting a user's position indication operation. In addition, a pointer device capable of indicating a coordinate remotely from the display surface of the display portion (typically, a controller or the like of Wii®) may be adopted. With the use of any device, the structure is preferably such that a position indication operation associated with a position within a display region of lower LCD 120 is accepted.

As shown in FIG. 2C, sound volume 144 is provided on a left side surface of lower housing 3. Sound volume 144 is used for adjusting a volume of the speaker (speaker 151 shown in FIG. 4) mounted on game device 1.

As shown in FIG. 2D, a wireless switch 143 is provided on a right side surface of lower housing 3. Wireless switch 143 switches wireless communication in game device 1 between an ON state (an active state) and an OFF state (an inactive state).

A game card 171 and/or a memory card 173 can be attached to game device 1.

Namely, as shown in FIG. 3B, a game card slot 170 for attaching game card 171 is provided in the rear surface of lower housing 3. In the rear of game card slot 170, an interface for electrical connection between game device 1 and game card 171 is provided. Game card slot 170 is configured such that game card 171 is removably attached. Game card 171 retains an application program, a game program (both of which include an instruction set), or the like.

In addition, as shown in FIG. 2C, a memory card slot 172 for attaching memory card 173 is provided in the left side surface of lower housing 3. In the rear of memory card slot 172, an interface for electrical connection between game device 1 and memory card 173 is provided. Memory card slot 172 is configured such that memory card 173 is removably attached. Memory card 173 is used for reading a program or image data obtained from another information processing apparatus or game device, storage (saving) of data of an image picked up and/or processed by game device 1, or the like. Game card 171 is implemented by a non-volatile storage medium such as an SD (Secure Digital) card.

In game device 1, various display devices for presenting an operation state or the like to the user are provided. More specifically, in lower housing 3 and upper housing 2, an indicator group 147 consisting of a plurality of LEDs (Light Emitting Diodes) is provided as a display device (display portion). Indicator group 147 includes a stereoscopic display indicator 147a, a notification indicator 147b, a wireless indicator 147c, a power supply indicator 147d, and a charge indicator 147e. Stereoscopic display indicator 147a is provided on the main surface of upper housing 2 and other indicators are provided on the main surface or on the side surface of lower housing 3.

Stereoscopic display indicator 147a gives notification of whether stereoscopic display is provided on upper LCD 110 or not. Typically, while stereoscopic display on upper LCD 110 is active, stereoscopic display indicator 147a illuminates.

Notification indicator 147b gives notification of whether information to be notified of the user is present or not. Typically, when an e-mail unread by the user is present or when some message is received from various servers, notification indicator 147b illuminates.

Wireless indicator 147c gives notification of a state of wireless communication in game device 1. Typically, when wireless communication is active, wireless indicator 147c illuminates.

Power supply indicator 147d gives notification of a power supply state in game device 1. Game device 1 contains a not-shown battery (typically, stored in lower housing 3), and it is mainly driven by electric power from this battery. Therefore, power supply indicator 147d gives notification of a state of power ON in game device 1 and/or a state of charge of the battery or the like. Typically, while power of game device 1 is turned ON (in the ON state) and a state of charge of the battery is sufficiently high, power supply indicator 147d illuminates in green, and while power of game device 1 is turned ON (in the ON state) and a state of charge of the battery is low, it illuminates in red.

Charge indicator 147e gives notification of a state of charge of the battery described above. Typically, when a charge adapter (not shown) or the like is attached to game device 1 and the contained battery is being charged, charge indicator 147e illuminates. It is noted that the charge adapter is connected to a charge terminal 174 provided in the rear surface of game device 1, as shown in FIG. 3A.

In addition, game device 1 according to the present embodiment incorporates an infrared communication function, and an infrared port 179 is provided on the rear surface of game device 1. This infrared port 179 projects/receives infrared rays, which are carrier waves for data communication.

Moreover, in the front surface of game device 1, hooks 31, 32 for connection to a strap for suspending game device 1 are provided.

Further, on the front surface of lower housing 3, a connection terminal 158 for connecting a headphone and/or a microphone is provided.

<D. Electrical Configuration of Device>

Figure 4:
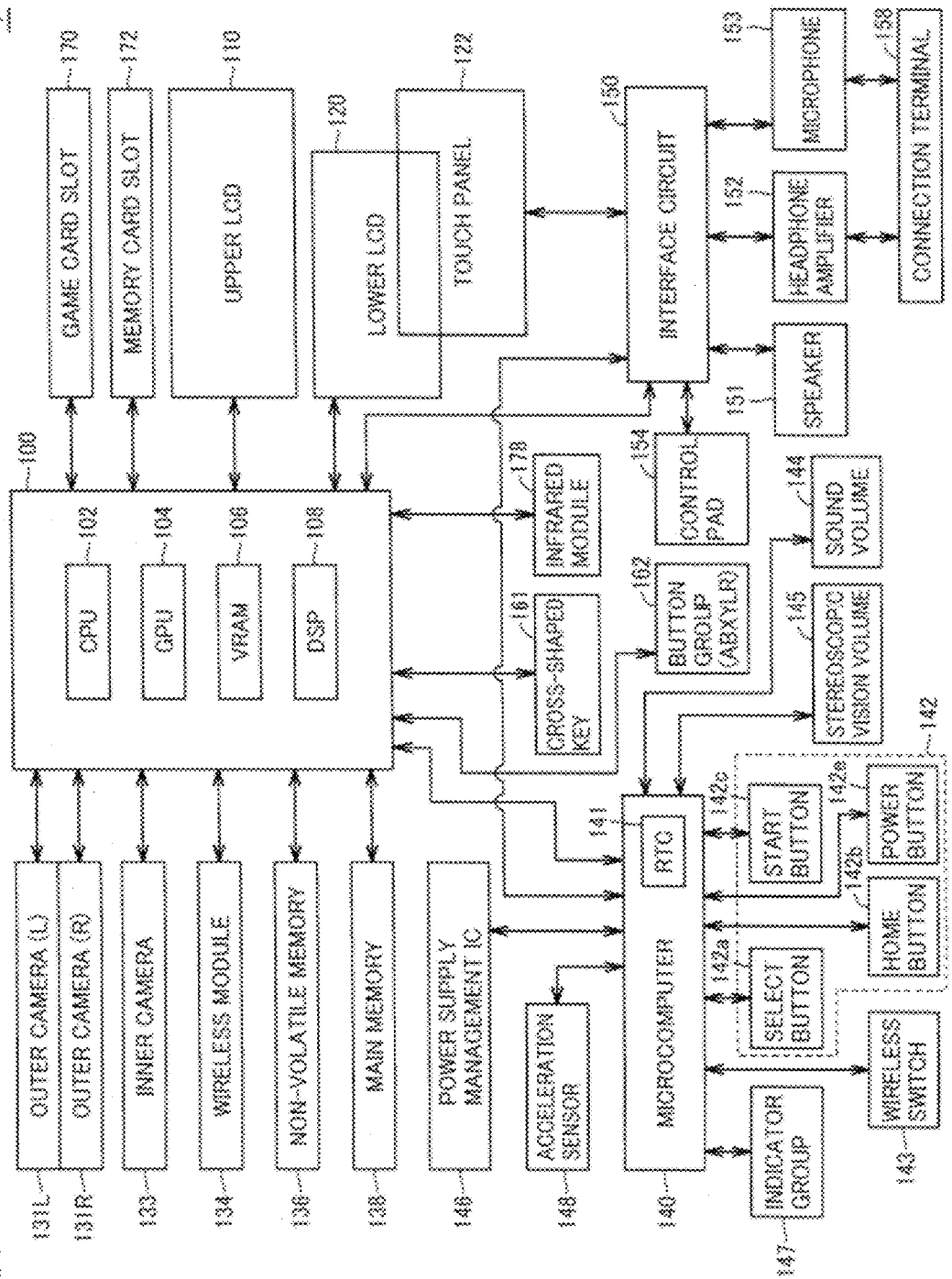
FIG. 4 shows an exemplary non-limiting block diagram showing an electrical configuration of the game device according to an exemplary embodiment.

Referring to FIG. 4, game device 1 includes an operation processing unit 100, upper LCD 110, lower LCD 120, touch panel 122, outer cameras 131L, 131R, inner camera 133, a wireless module 134, a non-volatile memory 136, a main memory 138, a microcomputer 140, button group 142, sound volume 144, stereoscopic vision volume 145, a power supply management IC (Integrated Circuit) 146, indicator group 147, an acceleration sensor 148, an interface circuit 150, speaker 151, a headphone amplifier 152, microphone 153, connection terminal 158, cross-shaped key 161, button group 162, game card slot 170, memory card slot 172, and an infrared module 178. In addition, game device 1 includes a battery and a power supply circuit that are not shown.

Operation processing unit 100 corresponds to a processing unit responsible for overall control of game device 1. More specifically, operation processing unit 100 realizes various types of processing including control of stereoscopic display on upper LCD 110 by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like.

It is noted that, in addition to a case where a program (an instruction set) executed by operation processing unit 100 is provided through game card 171 or memory card 173, a program may be provided to game device 1 through an optical storage medium such as a CD-ROM or a DVD. Moreover, a program may be provided from a server device (not shown) connected through a network.

More specifically, operation processing unit 100 includes a CPU (Central Processing Unit) 102, a GPU (Graphical Processing Unit) 104, a VRAM (Video Random Access Memory) 106, and a DSP (Digital Signal Processor) 108. Processing in each unit will be described later. In addition, operation processing unit 100 exchanges data with each unit.

Each of outer cameras 131L, 131R and inner camera 133 is connected to operation processing unit 100, and outputs an input image obtained as a result of image pick-up to operation processing unit 100 in response to an instruction from operation processing unit 100. Each of these cameras includes image pick-up elements such as CCD (Charge Coupled Device) or CIS (CMOS Image Sensor) and a peripheral circuit for reading image data (input image) obtained by the image pick-up elements.

Wireless module 134 exchanges data with another game device 1 or some information processing apparatus through a wireless signal. By way of example, wireless module 134 communicates data with another device under a wireless LAN scheme complying with such standards as IEEE802.11a/b/g/n.

Non-volatile memory 136 stores firmware or the like necessary for a basic operation of game device 1 and a code describing the firmware is developed on main memory 138. As CPU 102 of operation processing unit 100 executes the code developed on main memory 138, basic processing in game device 1 is realized. In addition, non-volatile memory 136 may store data on various parameters set in advance in game device 1 (pre-set data). By way of example, non-volatile memory 136 is implemented by a flash memory.

Main memory 138 is used as a work area or a buffer area for operation processing unit 100 to perform processing. Namely, main memory 138 temporarily stores a program (a code) or data necessary for processing by operation processing unit 100. By way of example, main memory 138 is implemented by a PSRAM (Pseudo-SRAM).

Microcomputer 140 mainly provides processing involved with a user interface. More specifically, microcomputer 140 is connected to operation processing unit 100 as well as to button group 142, sound volume 144, stereoscopic vision volume 145, power supply management IC 146, indicator group 147, and acceleration sensor 148. Microcomputer 140 senses a user's button operation or the like, outputs the result of sensing to operation processing unit 100, and causes an indicator for notifying the user of various types of information to illuminate, in response to a signal from operation processing unit 100.

In addition, microcomputer 140 has a real time counter (RTC: Real Time Clock) 141. Real time counter 141 is a part providing a time-counting function, and counts time in a predetermined cycle. The result of counting is successively output to operation processing unit 100. Operation processing unit 100 can also calculate the current time (date) or the like based on a count value counted by real time counter 141.

Power supply management IC 146 causes supply of electric power from a power supply (typically, the battery described above) mounted on game device 1 to each unit and controls an amount of supply thereof.

Acceleration sensor 148 detects displacement of game device 1 and the result of detection is output to operation processing unit 100 through microcomputer 140. The result of detection by acceleration sensor 148 is utilized in a program (a game application) or the like executed on game device 1.

Infrared module 178 establishes wireless communication (infrared communication) with another game device 1. Wireless communication established by this infrared module 178 is narrower in coverage than wireless communication through wireless module 134. Namely, infrared module 178 is designed to exchange data with game device 1 of the same type, in accordance with a predetermined communication protocol. It is noted that infrared rays which are carrier waves for infrared communication are projected/received through infrared port 179 (see FIG. 3B).

Interface circuit 150 is connected to operation processing unit 100 as well as to speaker 151, headphone amplifier 152, microphone 153, control pad 154, and touch panel 122. More specifically, interface circuit 150 includes an audio control circuit (not shown) for controlling speaker 151, headphone amplifier 152 and microphone 153 and a touch panel control circuit (not shown) for controlling touch panel 122.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone. Microphone 153 senses user's voice or the like uttered toward game device 1 to output an audio signal indicating sensed voice to interface circuit 150.

As described above, the audio control circuit constituting interface circuit 150 carries out A/D (analog/digital) conversion of an analog audio signal sensed by microphone 153 to output the resultant digital audio signal to operation processing unit 100, and carries out D/A (digital/analog) conversion of a digital audio signal generated by operation processing unit 100 or the like to output the resultant analog audio signal to speaker 151 and/or a connected headphone.

In addition, the touch panel control circuit constituting interface circuit 150 generates touch position data (a two-dimensional coordinate value) indicating a position where the user performed an input operation (a pointing operation) in response to a detection signal from touch panel 122 and outputs the data to operation processing unit 100. Namely, touch panel 122 outputs an operation input (touch position data) in accordance with a two-dimensional coordinate value corresponding to the position pointed on a touch surface.

Game card slot 170 and memory card slot 172 are each connected to operation processing unit 100. Game card slot 170 reads and writes data from and into attached game card 171 through a connector in response to a command from operation processing unit 100. Memory card slot 172 reads and writes data from and into attached memory card 173 through a connector in response to a command from operation processing unit 100.

Lower LCD 120 and upper LCD 110 each display an image in response to a command from operation processing unit 100. In a typical manner of use of game device 1, an image for accepting various operations is displayed on lower LCD 120 and stereoscopic display is provided on upper LCD 110.

<E. Configuration of Display Portion>

Figure 5:
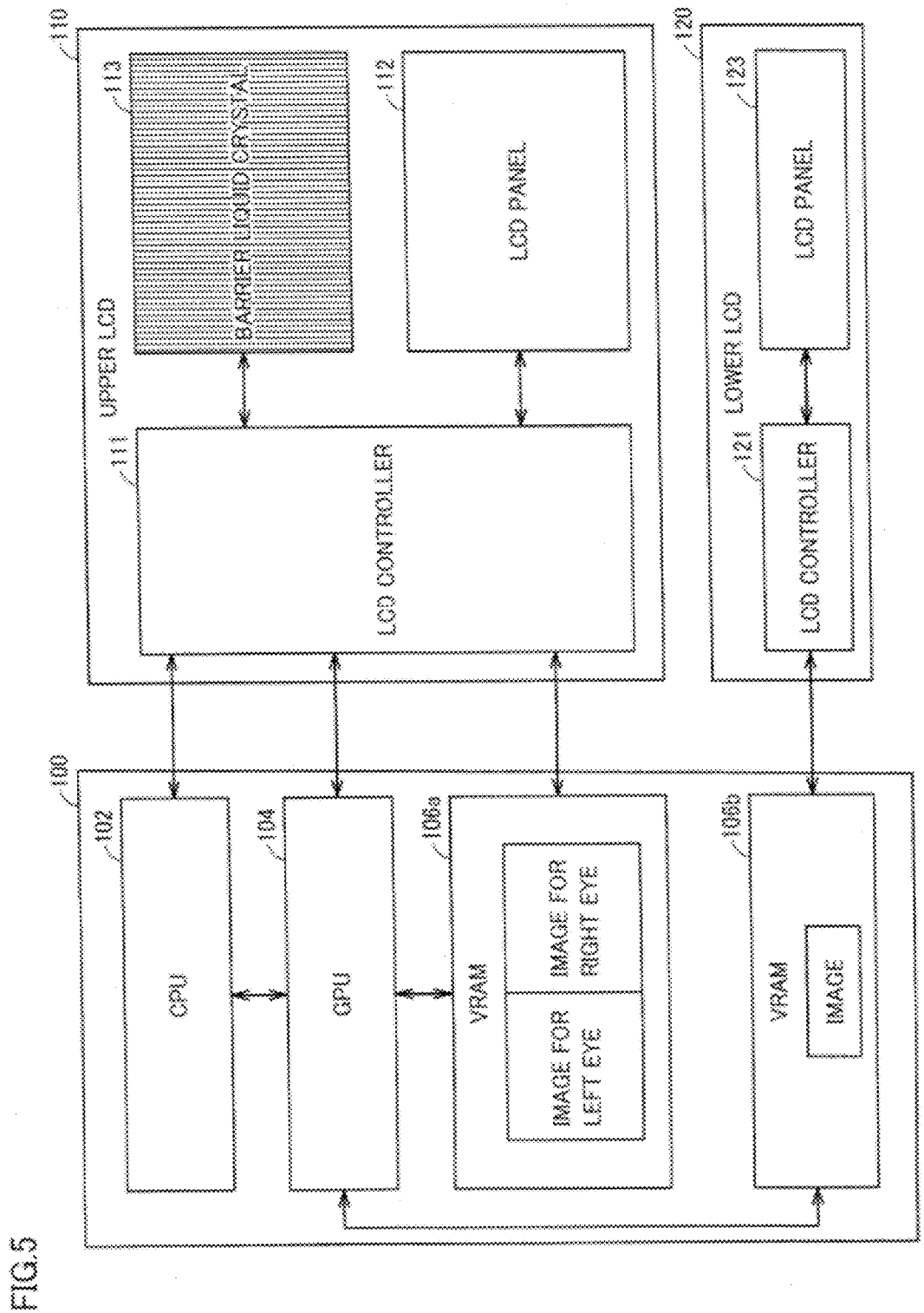
FIG. 5 shows an exemplary non-limiting block diagram showing an electrical configuration for implementing display control in the game device.

Referring to FIG. 5, operation processing unit 100 includes GPU 104 for mainly performing processing for displaying images on upper LCD 110 and lower LCD 120 respectively (image processing), in addition to CPU 102. GPU 104 has a processing circuit specialized for image processing and successively generates images to be displayed on upper LCD 110 and lower LCD 120 respectively in response to a command from CPU 102. These images are transferred to a VRAM 106a for upper LCD 110 and a VRAM 106b for lower LCD 120 respectively.

Here, a pair of images (an image for left eye and an image for right eye) for stereoscopic display on upper LCD 110 is written in VRAM 106a independently of each other. In contrast, since two-dimensional display (non-stereoscopic display) is provided on lower LCD 120, a single image is written in VRAM 106b.

Upper LCD 110 includes an LCD controller 111, an LCD panel 112, and a barrier liquid crystal 113. In contrast, lower LCD 120 includes an LCD controller 121 and an LCD panel 123.

A structure of upper LCD 110 is further described.

Figure 6:
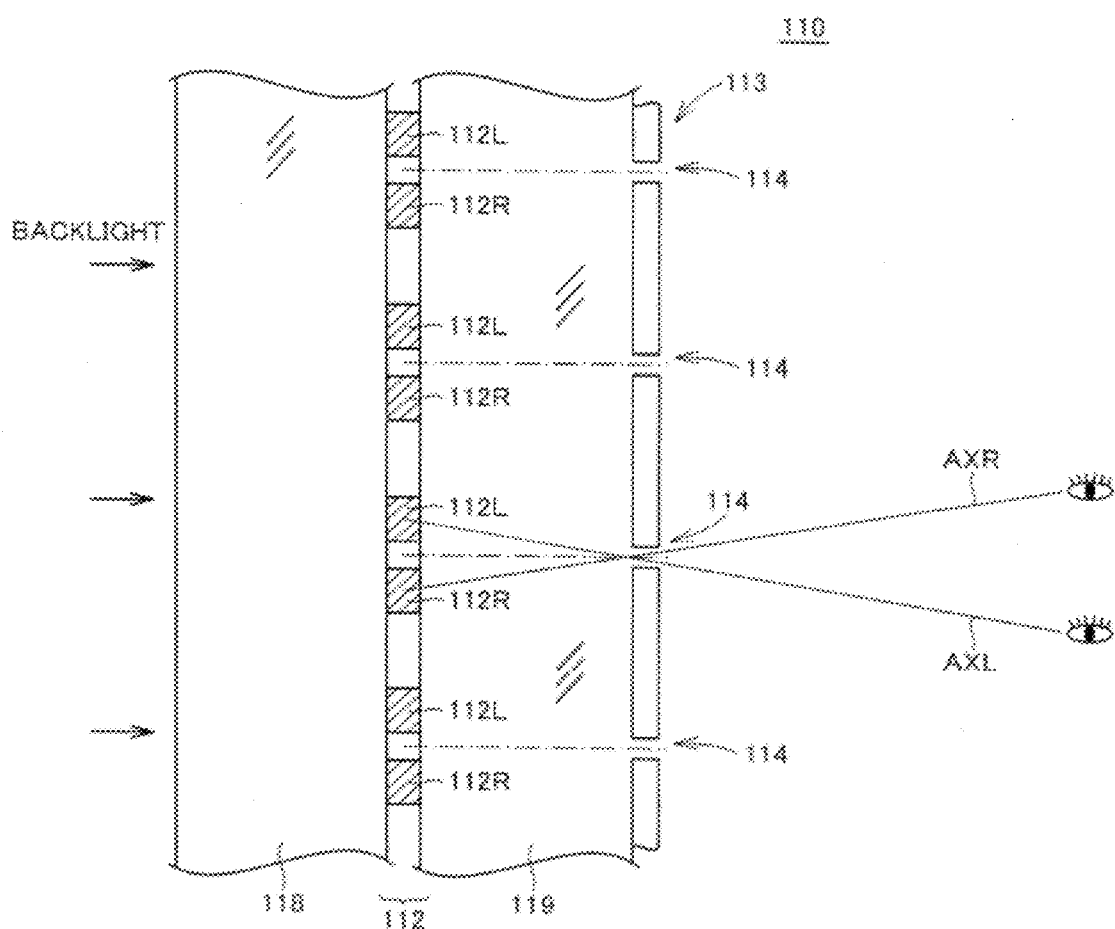
FIG. 6 shows an exemplary non-limiting schematic cross-sectional view of an upper LCD shown in FIG. 5.

FIG. 6 shows a structure of a parallax barrier type liquid crystal display device as a typical example of upper LCD 110. Upper LCD 110 includes LCD panel 112 arranged between a glass substrate 118 and a glass substrate 119.

LCD panel 112 includes a left eye pixel group 112L and a right eye pixel group 112R. A not-shown backlight is provided on a side of glass substrate 118 opposite to glass substrate 119 and light from this backlight is emitted toward left eye pixel group 112L and right eye pixel group 112R. Left eye pixel group 112L and right eye pixel group 112R function as a spatial light modulator for adjusting light from the backlight. Here, each pixel in left eye pixel group 112L and each pixel in right eye pixel group 112R are alternately arranged.

Barrier liquid crystal 113 representing a parallax optical system is provided on a side opposite to the side where glass substrate 118 is in contact with left eye pixel group 112L and right eye pixel group 112R. In this barrier liquid crystal 113, a plurality of slits 114 are provided in rows and columns at prescribed intervals. Left eye pixel group 112L and right eye pixel group 112R are arranged symmetrically to each other, with an axis passing through a central position of each slit 114 and perpendicular to a surface of glass substrate 118 serving as the reference. By appropriately designing positional relation with the slit, of each set of left eye pixel group 112L and right eye pixel group 112R brought in correspondence with each slit, the user visually recognizes only left eye pixel group 112L with his/her left eye and visually recognizes only right eye pixel group 112R with his/her right eye.

Namely, each slit 114 in barrier liquid crystal 113 restricts a field of view of each of the user's right and left eyes to a corresponding angle. Consequently, only left eye pixel group 112L is present in a line of sight AXL of the user's left eye, while only right eye pixel group 112R is present in a line of sight AXR of the user's right eye.

Here, by causing left eye pixel group 112L and right eye pixel group 112R to display a pair of images having prescribed parallax, an image having prescribed parallax can be presented to the user. By displaying such a pair of images having prescribed parallax, the user feels as if he/she stereoscopically viewed a subject.

More specifically, as shown in FIG. 5, GPU 104 successively writes an image for left eye and an image for right eye, by designating an address in VRAM 106a. LCD controller 111 successively reads image data in each column from the address of interest in VRAM 106a such that images in the direction of column constituting the image for left eye and the image for right eye written in VRAM 106a are alternately displayed in alignment on LCD panel 112, and drives LCD panel 112.

It is noted that upper LCD 110 can also provide two-dimensional display, that is, non-stereoscopic display, of an image. In this case, a method of inactivating barrier liquid crystal 113 and a method of setting parallax between the image for left eye and the image for right eye used for display to substantially zero, by providing a command to LCD controller 111, are available.

In the case of the former method, since a plurality of slits 114 provided in barrier liquid crystal 113 are inactivated, light from left eye pixel group 112L and right eye pixel group 112R is substantially incident on the user's left and right eyes. In this case, resolution for the user is substantially twice as high as resolution in stereoscopic display.

In the case of the latter method, since the image visually recognized by the user's left eye and the image visually recognized by the user's right eye are substantially equally controlled, the user visually recognizes the same image with his/her left and right eyes.

Meanwhile, non-stereoscopic display is provided on lower LCD 120. Namely, GPU 104 successively writes an image to be displayed, by designating an address in VRAM 106b, and LCD controller 121 successively reads images written in VRAM 106b and drives LCD panel 123.

Though a parallax barrier type display device has been exemplified in FIG. 6 by way of a typical example of a display device capable of providing stereoscopic display, for example, a lenticular type display device or the like may also be adopted. According to such a type, a display area for an image for left eye and a display area for an image for right eye are arranged in a certain pattern (typically, alternately).

Alternatively, a configuration of a display device capable of providing stereoscopic display may be such that two images different in main wavelength component are independently displayed and stereoscopic display is provided by having the user wear glasses incorporating two respective color filters different in transmitted wavelength range.

Similarly, a configuration may be such that two images are displayed with directions of polarization being differed and stereoscopic display is provided by having the user wear glasses incorporating two respective polarizing filters corresponding to the two directions of polarization.

In addition, such a form that an image for left eye and an image for right eye are alternately displayed with a display area for the image for left eye and a display area for the image for right eye being common may also be adopted, as in the method of utilizing shutter glasses (time-division type).

<F. Stereoscopic Display>

Referring next to FIGS. 7A, 7B, 8A, and 8C, processing for providing stereoscopic display on upper LCD 110 of game device 1 according to the present embodiment will be described.

FIG. 7A shows a case where an "apple" is present as a subject SBJ1 at a prescribed distance from game device 1 and an image of this "apple" is picked up (stereo image pick-up) using the pair of outer cameras 131L, 131R mounted on upper housing 2.

In the description below, it is assumed that the pair of outer cameras 131L and 131R is arranged in alignment in a horizontal direction.

In addition, a pair of images providing stereoscopic vision (stereo images consisting of an image for left eye and an image for right eye) is displayed in substantially the same display region. Namely, according to the lenticular type as shown in FIG. 6, a pixel for left eye and a pixel for right eye are alternately arranged so that the image for left eye and the image for right eye of interest are spatially alternately displayed in a lateral direction of the screen. Alternatively, according to shutter glasses (time-division type), an image for left eye and an image for right eye of interest are temporally alternately displayed as the same display surface is temporally divided.

Therefore, a region in a stereoscopic image where parallax is zero looks like being present on the display surface when viewed from the user. Namely, by setting parallax of a target region to zero, the user feels that an object included in that region is located on or around the display surface of the display portion.

FIG. 7B shows one example of a pair of images (stereo images) obtained as a result of image pick-up in positional relation as shown in FIG. 7A. Namely, as outer camera 131L picks up an image of subject SBJ1, an input image PIMGL for left eye is generated, and as outer camera 131R picks up an image of subject SBJ1, an input image PIMGR for right eye is generated.

Comparing input image PIMGL for left eye and input image PIMGR for right eye with each other, it can be seen that a position of a subject image representing subject SBJ1 within input image PIMGL is different from a position of a subject image representing subject SBJ1 within input image PIMGR. Namely, in input image PIMGL, the position of the subject image representing subject SBJ1 is located relatively on the right side, while in input image PIMGR, the position of the subject image representing subject SBJ1 is located relatively on the left side.

By displaying the pair of images (stereo images) thus obtained and having parallax on the display surface of upper LCD 110, the user can stereoscopically visually recognize subject SBJ1 of the "apple".

It is noted that a pair of images generated as a result of image pick-up by outer cameras 131L and 131R can be displayed on the display surface of upper LCD 110 in a manner superimposed on each other or relative positional relation between these images can also be changed. Namely, when input image PIMGL and input image PIMGR are displayed on the display surface of upper LCD 110 in a manner superimposed on each other, an amount of parallax in accordance with positional relation between outer cameras 131L and 131R and subject SBJ1 at the time of image pick-up is produced. In addition, by changing a relative display position between input image PIMGL and input image PIMGR on the display surface of upper LCD 110, an amount of parallax regarding subject SBJ1 can be adjusted. Such adjustment of the amount of parallax will vary stereoscopic effect (an amount of pop-up/an amount of recess) visually recognized by the user.

Namely, as shown in FIG. 8A, when relative positional relation between input image PIMGL and input image PIMGR is changed in a direction to increase an amount of parallax regarding subject SBJ1, the user feels that subject SBJ1 is present closer toward the user side, relative to the display surface of upper LCD 110. So to speak, the user visually recognizes the subject image of subject SBJ1 as if it "popped up" from the display surface.

In contrast, when relative positional relation between input image PIMGL and input image PIMGR is changed in a direction to decrease an amount of parallax regarding subject SBJ1, the user feels that subject SBJ1 is present at a position closer toward the display surface of upper LCD 110. So to speak, the user visually recognizes the subject image of subject SBJ1 as if it were "recessed" in the display surface.

Thus, by changing relative display position between input image PIMGL and input image PIMGR on the display surface of upper LCD 110, a position of subject SBJ1 (a position on a line from the user to the display surface) stereoscopically visually recognized by the user can be adjusted. Here, by displaying the entirety or a part of input images PIMGL and PIMGR having parallax on the display surface of upper LCD 110, stereoscopic display is provided.

<G. Processing Mode>

A processing mode provided in game device 1 according to the present embodiment will now be described with reference to FIG. 9.

Game device 1 has a "HOME menu mode" in which the user can select various applications (a state ST1). Though various applications installed in game device 1 can be executed in this "HOME menu mode," FIG. 9 shows an example where transition to a "camera menu mode" (a state ST2), an "album reproduction mode" (a state ST7), and "other applications" (a state ST8) can be made.

In this "camera menu mode" (state ST2), a menu of applications with which an image can be obtained with image pick-up by using a camera or various operations such as edition of the obtained image can be performed as will be described later is displayed.

In addition, in the "album reproduction mode" (state ST7), an album created in accordance with a procedure as will be described later can be reproduced. The "album" as used herein means a collection of one or more pieces of image data, and an order of reproduction of images or the like may be defined in advance. It is noted that, in the "album reproduction mode," the order of display of images included in the album or the like may arbitrarily be changed.

From the "camera menu mode," transition to an "image pick-up mode" (a state ST3) can be made. In the "image pick-up mode," a pair of outer cameras 131L and 131R (see FIG. 2A) or inner camera 133 (see FIG. 1) can be used to obtain an input image.

From the "image pick-up mode," transition to a "viewing mode" (a state ST4) can be made. In the "viewing mode", images obtained in the "image pick-up mode" can be viewed.

In addition, from the "viewing mode", transition to an "album creation mode" (a state ST5) or a "slide show mode" (a state ST6) can be made.

In the "album creation mode" (state ST5), input images obtained in the "image pick-up mode" or image data stored in memory card 173 (see FIG. 1) can be used to create an "album". In addition, in the "album creation mode," data of the created album (hereinafter also referred to as "album data") can also be output and saved. The album data created in this "album creation mode" can be displayed on display means (typically, upper LCD 110 and/or lower LCD 120 shown in FIG. 1) in the "album reproduction mode."

In the "slide show mode" (state ST6), images obtained in advance can successively be displayed, with the images being switched over time.

<H. Viewing Mode>

Initially, processing in the "viewing mode" (state ST4) shown in FIG. 9 will be described.

Figure 9:
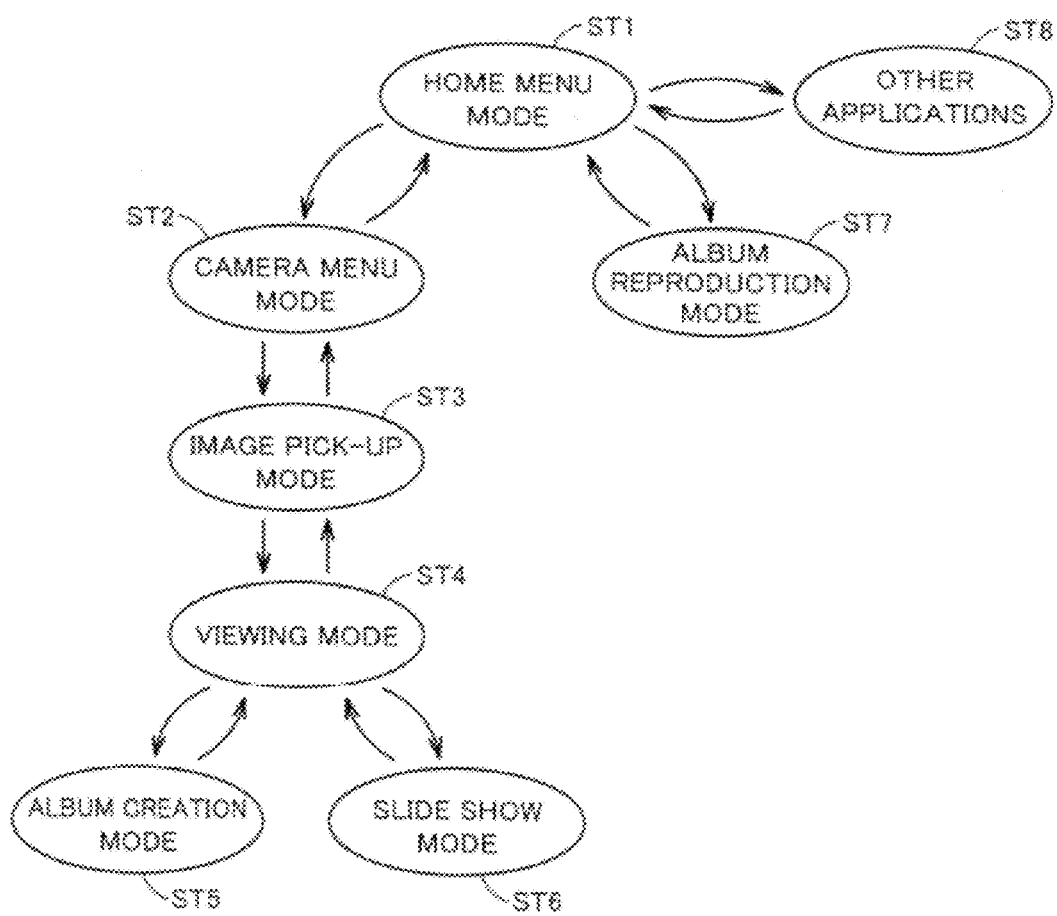
FIG. 9 shows an exemplary non-limiting diagram for illustrating transition of a processing mode provided in the game device.

FIGS. 10A and 10B each show a screen example of the "viewing mode" (state ST4) shown in FIG. 9. It is noted that FIGS. 10A and 10B schematically show contents displayed on upper LCD 110 and lower LCD 120 in correspondence with positional relation therebetween, respectively. This is also the case with figures shown below.

Referring to FIG. 10A, in the "viewing mode" (state ST4), a listing image 202A including objects showing images obtained in advance (thumbnail images) is displayed on lower LCD 120. The objects (thumbnail images) included in this listing image 202A are preferably smaller in an amount of information than image data obtained through image pick-up or the like.

Such thumbnail images may be created separately from an image (hereinafter also referred to as a "main image" in contrast to the "thumbnail image") essentially obtained during image pick-up by a pair of outer cameras 131L and 131R (see FIG. 2A) or inner camera 133 (see FIG. 1). In this case, data of the thumbnail images and data of the main image can be included in a single file of image data. In addition, in a case where a pair of outer cameras 131L and 131R is used to obtain a pair of images (an image for left eye and an image for right eye) for stereoscopic display on upper LCD 110, this pair of images is preferably included in a single file of image data.

A selected display image 230 is displayed on this listing image 202A. A position of this selected display image 230 on listing image 202A varies in response to a user's operation of cross-shaped key 161 (see FIG. 1). The main image corresponding to the object (thumbnail image) indicated by this selected display image 230 is displayed on upper LCD 110. Namely, an image selected through the user's operation from among the thumbnail images included in listing image 202A is displayed on upper LCD 110 in a zoomed-up manner.

Here, in a case where the selected thumbnail image is a pair of images for stereoscopic display, the image is stereoscopically displayed on upper LCD 110, while in a case where the selected thumbnail image is an image for two-dimensional display, the image is two-dimensionally displayed on upper LCD 110. It is noted that, even when a pair of images for stereoscopic display is selected, the image can also be displayed two-dimensionally on upper LCD 110.

In this "viewing mode", a slider image 220 is displayed in a lower portion of the screen of lower LCD 120. As the user uses stylus pen 177 or the like to perform a slide operation of this slider image 220 in a lateral direction over the sheet surface (move while keeping touching), the thumbnail images displayed on upper LCD 110 may be changed. Namely, the thumbnail images are aligned (virtually) under a prescribed alignment rule and the user can successively switch contents displayed on lower LCD 120 (effectively-displayed thumbnail images) by operating slider image 220. It is noted that switching among the thumbnail images may be made by continuously sliding a displayed portion or updating for each page.

In addition, in the "viewing mode", a zoom-up display icon 222 and a zoom-down display icon 224 are displayed in the lower portion of the screen of lower LCD 120. As the user uses stylus pen 177 or the like to perform an operation to touch this zoom-up display icon 222, the displayed thumbnail image is zoomed up. Consequently, since an area occupied by one thumbnail image becomes greater, a smaller number of thumbnail images are displayed in a list on lower LCD 120. On the other hand, when the user uses stylus pen 177 or the like to perform an operation to touch this zoom-down display icon 224, a displayed thumbnail image is made smaller. Consequently, since an area occupied by one thumbnail image becomes smaller, a larger number of thumbnail images are displayed in a list on lower LCD 120.

FIG. 10B shows such a state that the user performs an operation to touch zoom-down display icon 224 in a state shown in FIG. 10A and then slides slider image 220 toward the left over the sheet surface. Namely, in the state shown in FIG. 10A, thumbnail images in two rows x three columns are displayed in a list for each sheet (listing image 202A), whereas in the state shown in FIG. 10B, thumbnail images in four rows x five columns are displayed in a list for each sheet (a listing image 202B). In addition, in the state shown in FIG. 10A, among the virtually arranged thumbnail images, thumbnail images located at a prescribed position from the left end are displayed. On the other hand, in the state shown in FIG. 10B, among the virtually arranged thumbnail images, thumbnail images located at the left end are displayed.

Moreover, lower LCD 120 includes an operation image 210 for indicating switch to the "album creation mode" (state ST5 shown in FIG. 9), an operation image 212 for indicating switch to the "slide show mode" (state ST6 shown in FIG. 9), an operation image 214 for indicating switch to the "image pick-up mode" (state ST3 shown in FIG. 9), and an operation image 216 for making various settings.

Figure 11:
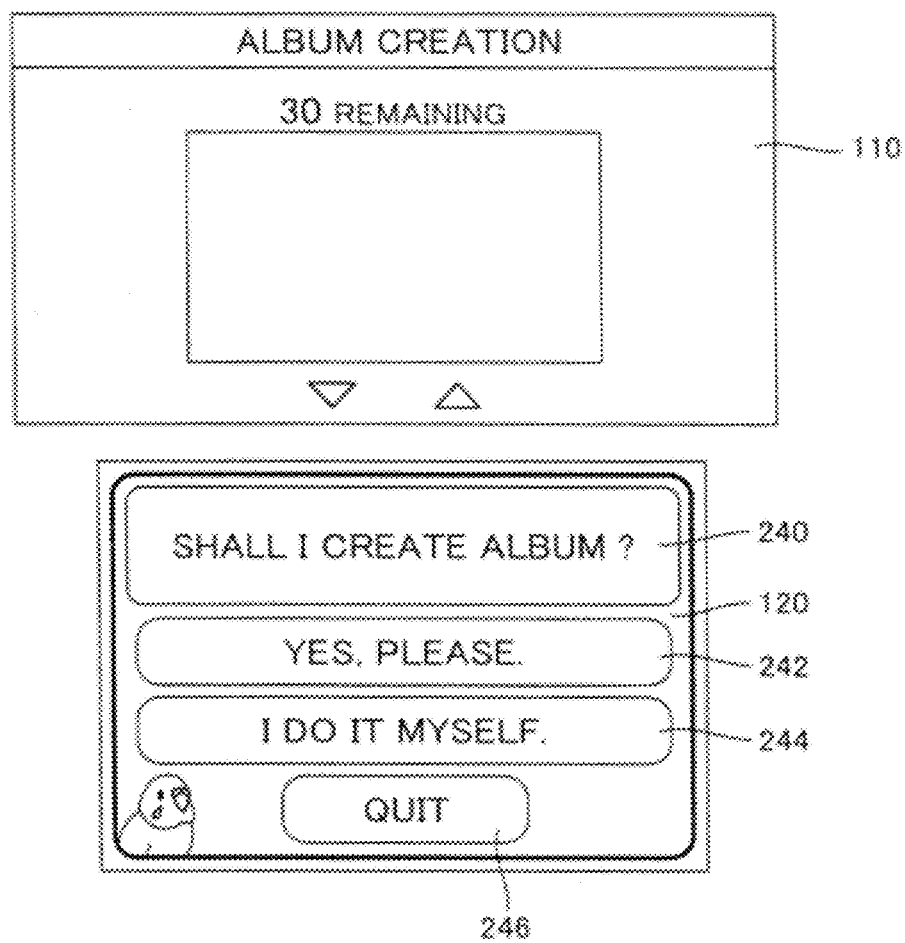
FIG. 11 shows an exemplary non-limiting diagram showing a screen example of an "album creation mode" (a state ST5) shown in FIG. 9.

Namely, as the user uses stylus pen 177 or the like to perform an operation to touch operation image 210 labeled with "album", transition to screen display as shown in FIG. 11 which will be described later is made. Alternatively, as the user uses stylus pen 177 or the like to perform an operation to touch operation image 212 labeled with "slide show", main images corresponding to the thumbnail images displayed in a list on lower LCD 120 are displayed on upper LCD 110 as being switched under prescribed rules or randomly (that is, slide show is carried out). Here, various effects may be provided to the displayed images. Alternatively, as the user uses stylus pen 177 or the like to perform an operation to touch operation image 214 labeled with "shoot with camera," transition to screen display for picking up an image with the use of a pair of outer cameras 131L and 131R (see FIG. 2A) or inner camera 133 (see FIG. 1) is made. Further, as the user uses stylus pen 177 or the like to perform an operation to touch operation image 216 labeled with "setting", transition to screen display for making various settings in connection with the "viewing mode" is made.

<I. Album Creation Mode>

Processing in the "album creation mode" (state ST5) shown in FIG. 9 will now be described.

As described above, in the "album creation mode," the user can select any image for compiling images as one "album". This album created by the user is output as album data. This album data can be reproduced on game device 1 used by the user who created the album, or the album data itself can also be passed to another game device, a personal computer or the like. In this case, not only the user who created the album but also another user having relation with the user can also see the album on his/her own game device 1.

In particular, in the present embodiment, voice and sound (sound effect) at the time of reproduction can be associated with each image constituting the album. Namely, in reproduction of the album data, each time a displayed main image changes, sound effect associated with each main image is reproduced. Since this sound effect can independently be associated with each main image, a degree of freedom in creating an album can be enhanced from a point of view of the user.

More specifically, in the "album creation mode," the following five types of processing can mainly be performed.

(1) Material selection processing: selection of images to be included in the album (2) Sound effect association processing: selection of voice and sound reproduced along with reproduction of images (3) Graffiti processing: addition of an object to an image (4) Preview processing: preview display of an album being created (5) Album data output processing: generation/output of album data Details of such processing will be described hereinafter.

(i1: Material Selection Processing)

In the material selection processing, an image to be included in an album is selected. In particular, in game device 1 according to the present embodiment, as the user operates L button 162L and R button 162R as well as operation button 162A, operation button 162B, and cross-shaped key 161 with the user's forefingers and thumbs of both hands, selection of a main image included in the album can intuitively and readily be made.

More specifically, on lower LCD 120 located on the lower side when viewed from the user, an object (thumbnail image) group showing main images that can be included in the album is at least partially displayed and at least one object (thumbnail image) from the object (thumbnail image) group is selected in response to the user's operation of cross-shaped key 161.

As will be described later, since the number of thumbnail images simultaneously displayed on lower LCD 120 is restricted to a prescribed number, in a case where a large number of main images that can be included in the album are present, only thumbnail images corresponding to a part of them are accordingly displayed. On the other hand, in a case where a small number of main images that can be included in the album are present, thumbnail images corresponding to all main images respectively can simultaneously be displayed.

On the other hand, on upper LCD 110 located on the upper side when viewed from the user, a main image (hereinafter also referred to as an "image of interest," for distinction from main images that are not selected) included in the album is displayed as an object and a selected position in the order of alignment in a group of images of interest is changed in response to the user's operation of L button 162L or R button 162R. Here, in accordance with change in selected position in the group of images of interest, at least one object (image of interest) included in the object group (the group of images of interest) and corresponding to the selected position is displayed on upper LCD 110.

In game device 1 according to the present embodiment, the order of alignment is set for the images of interest included in the album being created and the images of interest included in the group of images of interest are displayed in a line in a direction in parallel to the upper side of upper housing 2 in accordance with this order of alignment. Here, three images of interest in total, that is, the image of interest corresponding to the selected position in response to the user's operation of L button 162L or R button 162R and two images of interest located on opposing sides of the image of interest, are displayed on upper LCD 110.

As described above, a thumbnail image (main image) included in the album is selected in lower LCD 120. In addition, as the user operates operation button 162A while the selected position in the group of images of interest is determined, in response to that operation, a new image of interest corresponding to the selected thumbnail image (main image) is added at a position corresponding to the selected position in the order of alignment in the group of images of interest. In accordance with addition of this new image of interest, at least one object (image of interest) included in the group of images of interest after addition is displayed on upper LCD 110.

On the other hand, when the user operates operation button 162B while the selected position in the group of images of interest is determined, in response to that operation, at least one object (image of interest) included in the group of images of interest and corresponding to the selected position is deleted. In accordance with deletion of this image of interest, at least one object (image of interest) included in the group of images of interest after deletion is displayed on upper LCD 110.

Operation button 162B is provided on the same side of lower LCD 120 where operation button 162A is located, and the user can operate with his/her right thumb any of operation button 162A and operation button 162B.

As described above, by operating L button 162L or R button 162R located on the upper side when viewed from the user, a selected position in the group of images of interest displayed on upper LCD 110 located above is changed, and by operating cross-shaped key 161, operation button 162A and operation button 162B located on the lower side when viewed from the user, a thumbnail image displayed on lower LCD 120 located below is selected, added and deleted. Namely, positional relation between L button 162L and R button 162R and cross-shaped key 161, operation button 162A and operation button 162B corresponds to positional relation between upper LCD 110 and lower LCD 120. Therefore, the user can operate L button 162L and R button 162R in association with upper LCD 110 and can operate cross-shaped key 161, operation button 162A and operation button 162B in association with lower LCD 120, so that the user can more intuitively perform an operation in album creation.

More specific processing in the material selection processing will be described hereinafter.

Initially, game device 1 according to the present embodiment has a function to automatically initially select an image of interest from main images (automatic image selection) under some kind of selection rules, in addition to a function allowing the user to freely select an image of interest.

Figure 12:
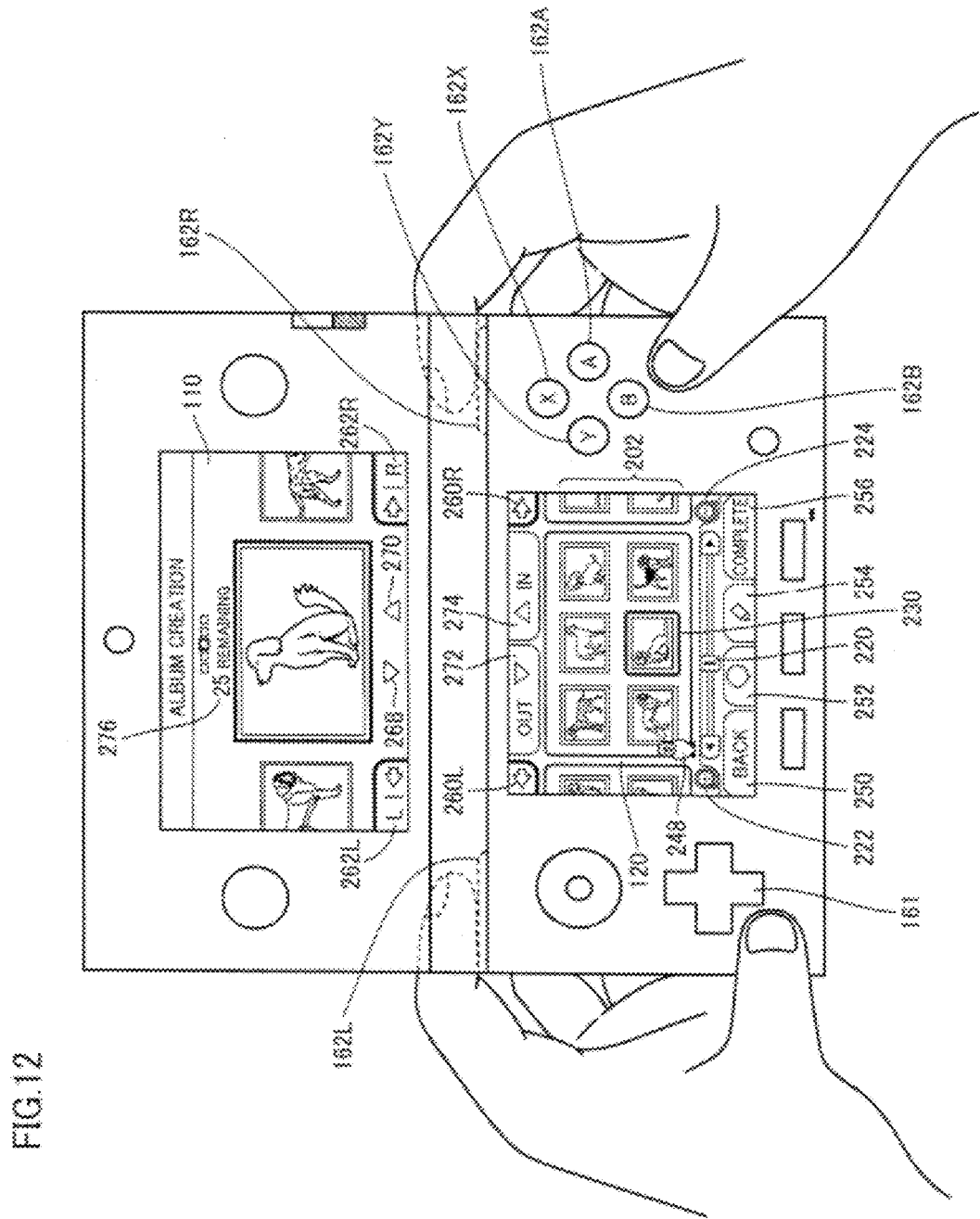
FIGS. 12 and 13 show exemplary non-limiting diagrams each showing a screen example displayed after an operation to touch an operation image shown in FIG. 11 has been performed.
Figure 13:
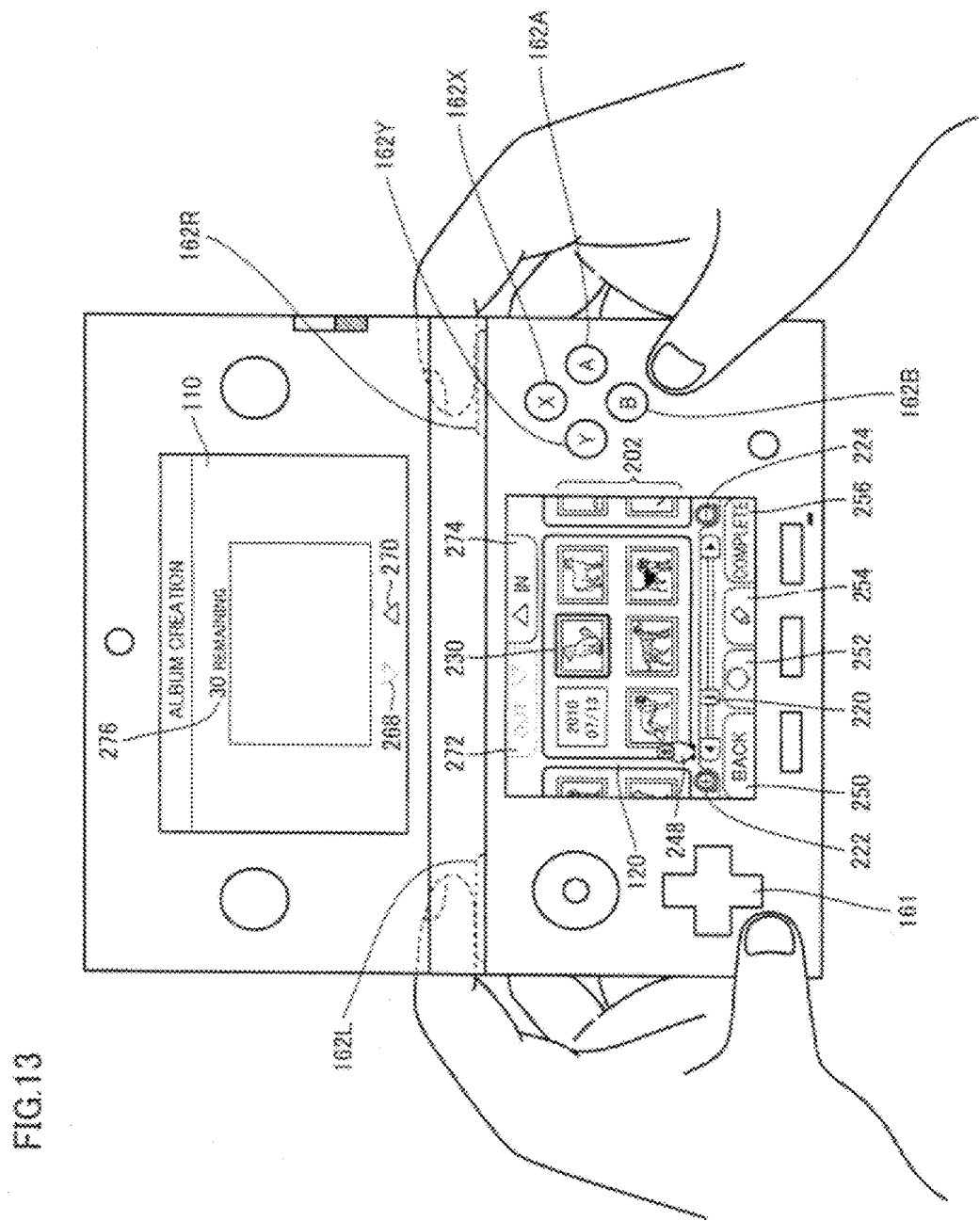

FIG. 11 shows a screen example of the "album creation mode" (state ST5) shown in FIG. 9. FIG. 12 shows a screen example displayed after an operation to touch an operation image 242 shown in FIG. 11 has been performed. FIG. 13 shows a screen example displayed after an operation to touch an operation image 244 shown in FIG. 11 has been performed.

As transition to the "album creation mode" is made, switching to screen display as shown in FIG. 11 is made. As shown in FIG. 11, initially, a user interface inquiring of the user about whether to make automatic image selection or not is displayed on lower LCD 120. Namely, together with a message image 240 indicating that "shall I create album?", operation image 242 permitting automatic image selection, operation image 244 for skipping automatic image selection, and an operation image 246 indicating end of the "album creation mode" are displayed.

As the user uses stylus pen 177 or the like to perform an operation to touch operation image 242 labeled with "yes, please", one theme is selected for display (not shown) from among a plurality of themes set in advance. Thereafter, based on the selected theme, transition to screen display as shown in FIG. 12 which will be described later is made. Alternatively, as the user uses stylus pen 177 or the like to perform an operation to touch operation image 244 labeled with "I do it myself," transition to screen display as shown in FIG. 13 which will be described later is made.

Further alternatively, as the user uses stylus pen 177 or the like to perform an operation to touch operation image 246 labeled with "quit", the screen returns to screen display as shown in FIGS. 10A and 10B.

Referring to FIG. 12, when processing for automatic image selection is performed, under the selection rules randomly defined or set by the user in advance, a prescribed number of images are selected from among images saved in game device 1, as images of interest to be included in the album. It is noted that, during processing for automatic image selection, such an effect that a bird object 248 holds and carries an image to the album may be provided.

For instance, in the example shown in FIG. 12, the number of images of interest that can be included in one album is set to 30 at the maximum, and FIG. 12 shows such a state that five images have initially been selected. Therefore, a message image 276 indicating that the remaining number of images of interest that can be included in the album is 25 is shown on upper LCD 110. It is noted that, in accordance with the number of images of interest included in the album being created, the number displayed in message image 276 or the like is sequentially updated.

In contrast, when automatic image selection is skipped in FIG. 11, transition to screen display as shown in FIG. 13 is made. When automatic image selection is skipped, as shown in FIG. 13, such a state that no image of interest to be included in the album being created is selected is set as the initial state.

As shown in FIG. 12, the group of images of interest included in the album being created is at least partially displayed on upper LCD 110. In upper LCD 110, a selected position in the order of alignment in the group of images of interest included in the album being created is determined in accordance with the user's operation of L button 162L or R button 162R. An image of interest corresponding to this selected position is displayed in a largest size and at least a part of two images of interest adjacent to the selected image of interest is also displayed on upper LCD 110.

As shown in FIG. 12, upper LCD 110 displays indicator images 262L and 262R notifying the user of contents of operations allocated to L button 162L and R button 162R respectively. In addition, in an upper portion of lower LCD 120, movement indication images 260L and 260R for guiding an operation to change a selected position in the order of alignment in the group of images of interest are displayed. These movement indication images 260L and movement indication image 260R graphically provide notification of contents of an instruction allocated to user's operations of L button 162L and R button 162R, respectively.

In contrast, as automatic image selection is skipped, no image of interest included in the album being created exists and therefore the user's operation of L button 162L and R button 162R is invalidated. Further, as shown in FIG. 13, movement indication images 260L and 260R and indicator images 262L and 262R are not displayed. It is noted that, as the user adds an image of interest to the album being created in accordance with the operation as described above, the user's operation of L button 162L and R button 162R is validated and movement indication images 260L and 260R and indicator images 262L and 262R are accordingly displayed.

By performing the operation as shown below, the user can add a desired image to the album being created or delete an unnecessary image from the album being created.

Figure 14:
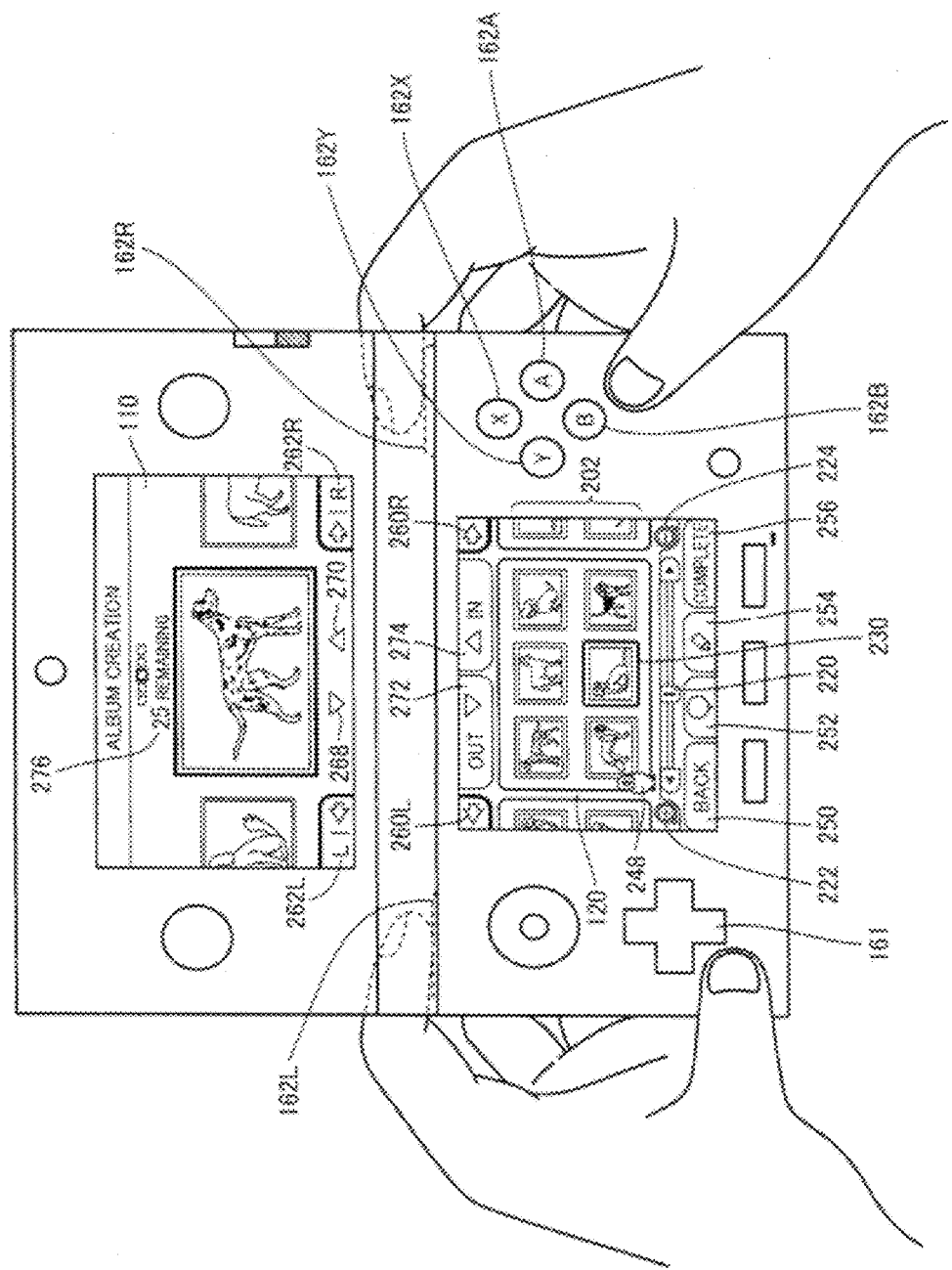
FIG. 14 shows an exemplary non-limiting diagram showing a screen example in a state where an L button has been pressed in the screen example shown in FIG. 12.
Figure 15:
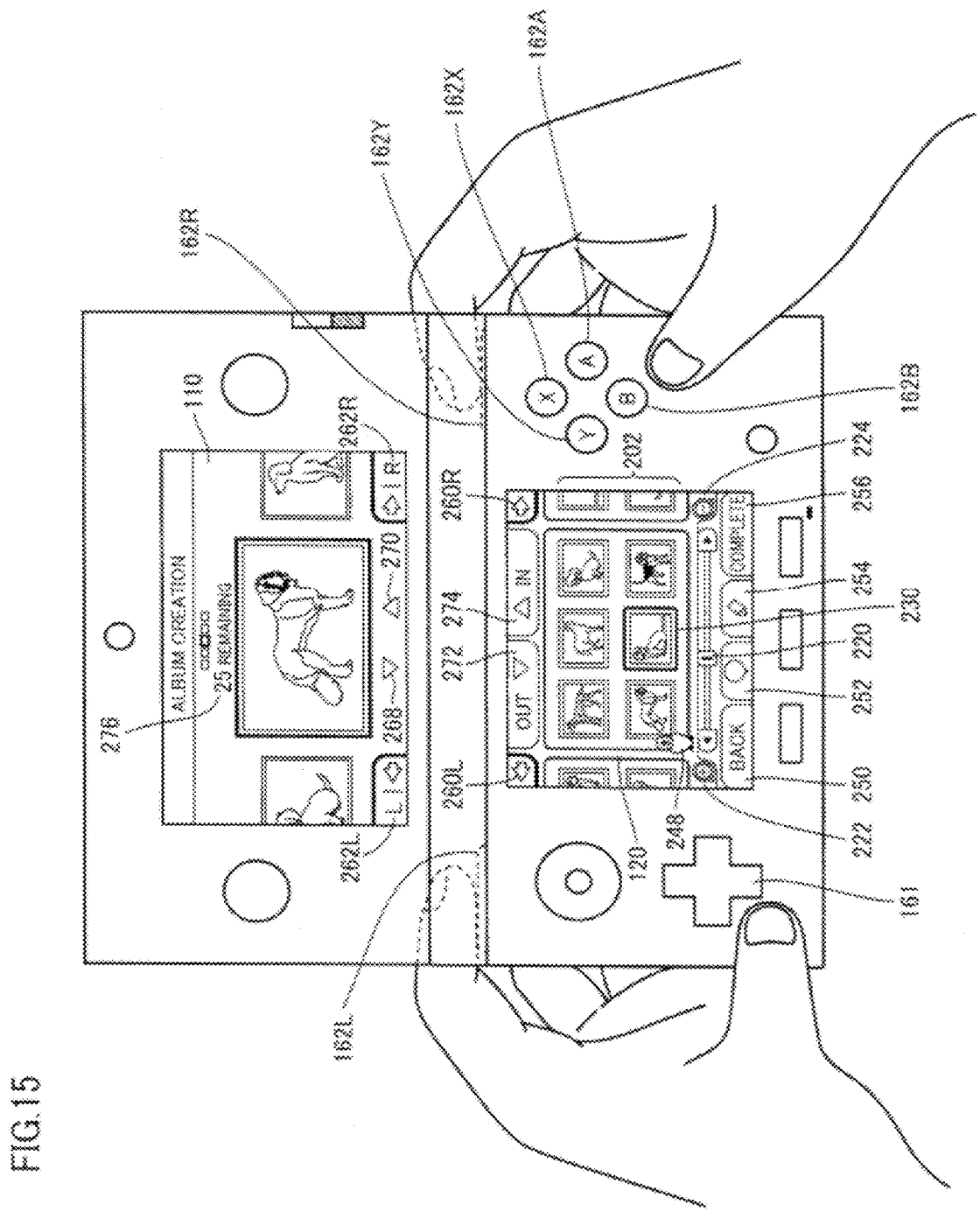
FIG. 15 shows an exemplary non-limiting diagram showing a screen example in a state where an R button has been pressed in the screen example shown in FIG. 12.

FIG. 14 shows a screen example of a state where L button 162L has been pressed in the screen example shown in FIG. 12. FIG. 15 shows a screen example of a state where R button 162R has been pressed in the screen example shown in FIG. 12.

Referring to FIG. 14, when the user presses L button 162L once, the group of images of interest displayed on upper LCD 110 moves to the left as a whole. In addition, the selected position in the order of alignment in the group of images of interest moves to an image of interest located on the right of the image of interest corresponding to the selected position before the button operation. Namely, the group of images of interest displayed on upper LCD 110 shifts to the left by the number of times of pressing of L button 162L by the user.

Referring now to FIG. 15, when the user presses R button 162R once, the group of images of interest displayed on upper LCD 110 moves to the right as a whole. In addition, the selected position in the order of alignment in the group of images of interest moves to an image of interest located on the left of the image of interest corresponding to the selected position before the button operation. Namely, the group of images of interest displayed on upper LCD 110 shifts to the right by the number of times of pressing of R button 162R by the user.

Thus, on upper LCD 110, the images of interest included in the group of images of interest are displayed in a line in a direction in parallel to the upper side of upper housing 2, and the images of interest included in the displayed group of images of interest are displayed as slid in a direction brought in correspondence with relative positional relation of L button 162L or R button 162R to upper LCD 110.

It is noted that an operation the same as in the case of pressing of L button 162L or R button 162R can be performed also by the user's operation of touch panel 122. Namely, based on information detected in response to the operation of touch panel 122, processing the same as in the operation of L button 162L or R button 162R can be performed.

More specifically, as the user uses stylus pen 177 or the like to perform an operation to touch movement indication image 260L showing an arrow pointing to the left, as in the case of pressing of L button 162L, a group of images of interest displayed on upper LCD 110 slides to the left as a whole. Alternatively, as the user uses stylus pen 177 or the like to perform an operation to touch movement indication image 260R showing an arrow pointing to the right, as in the case of pressing of R button 162R, a group of images of interest displayed on upper LCD 110 slides to the right as a whole.

On the other hand, on lower LCD 120, as in the "viewing mode" or the like shown in FIG. 10, a listing image 202 including thumbnail images showing images saved in game device 1 is displayed. Independently of an operation to change a selected position in the order of alignment in the group of images of interest included in the album being created as described above, the user can select at least one thumbnail image from the thumbnail image group.

Figure 16:
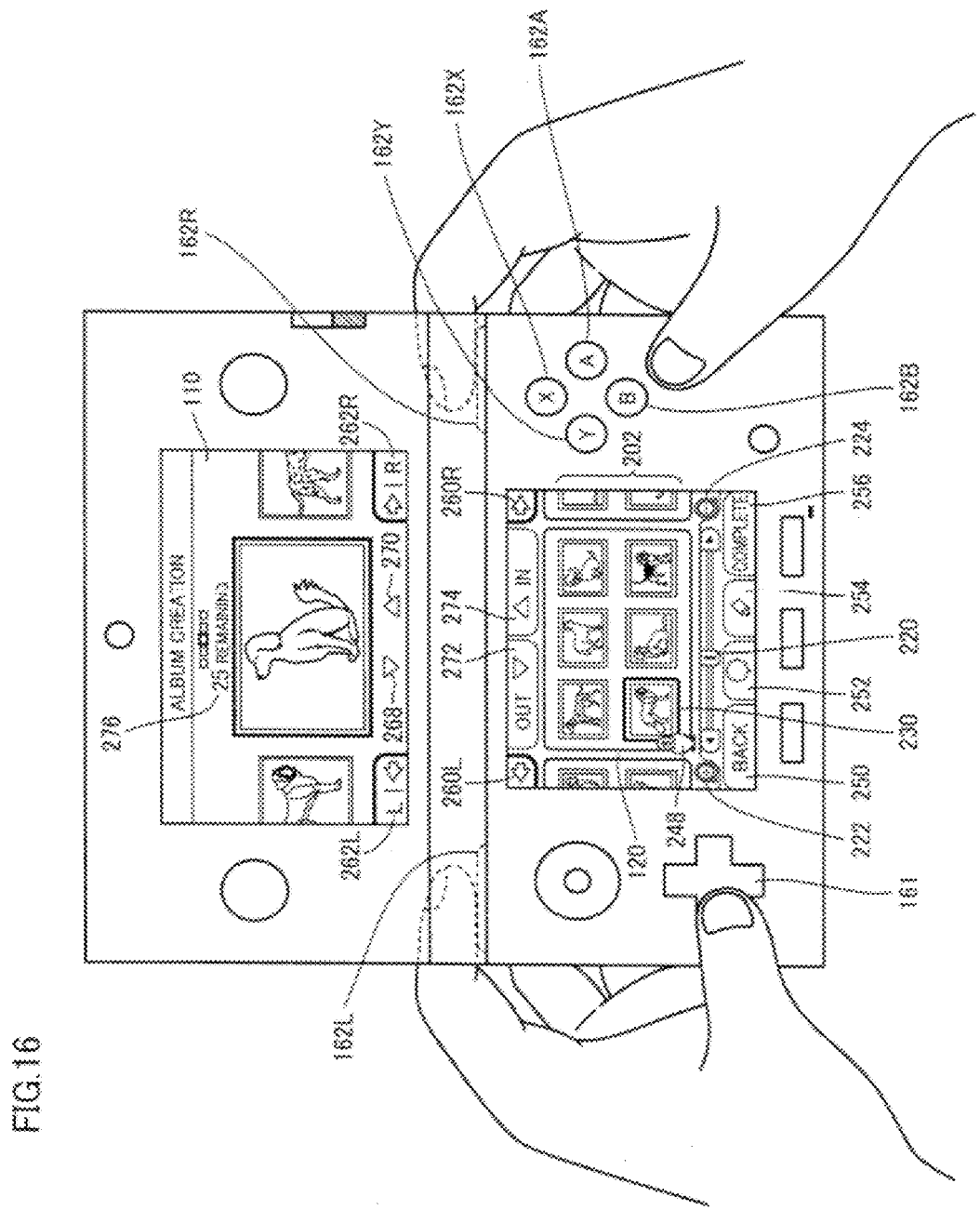
FIG. 16 shows an exemplary non-limiting diagram showing a screen example in a state where a cross-shaped key has been operated in the screen example shown in FIG. 12.
Figure 17:
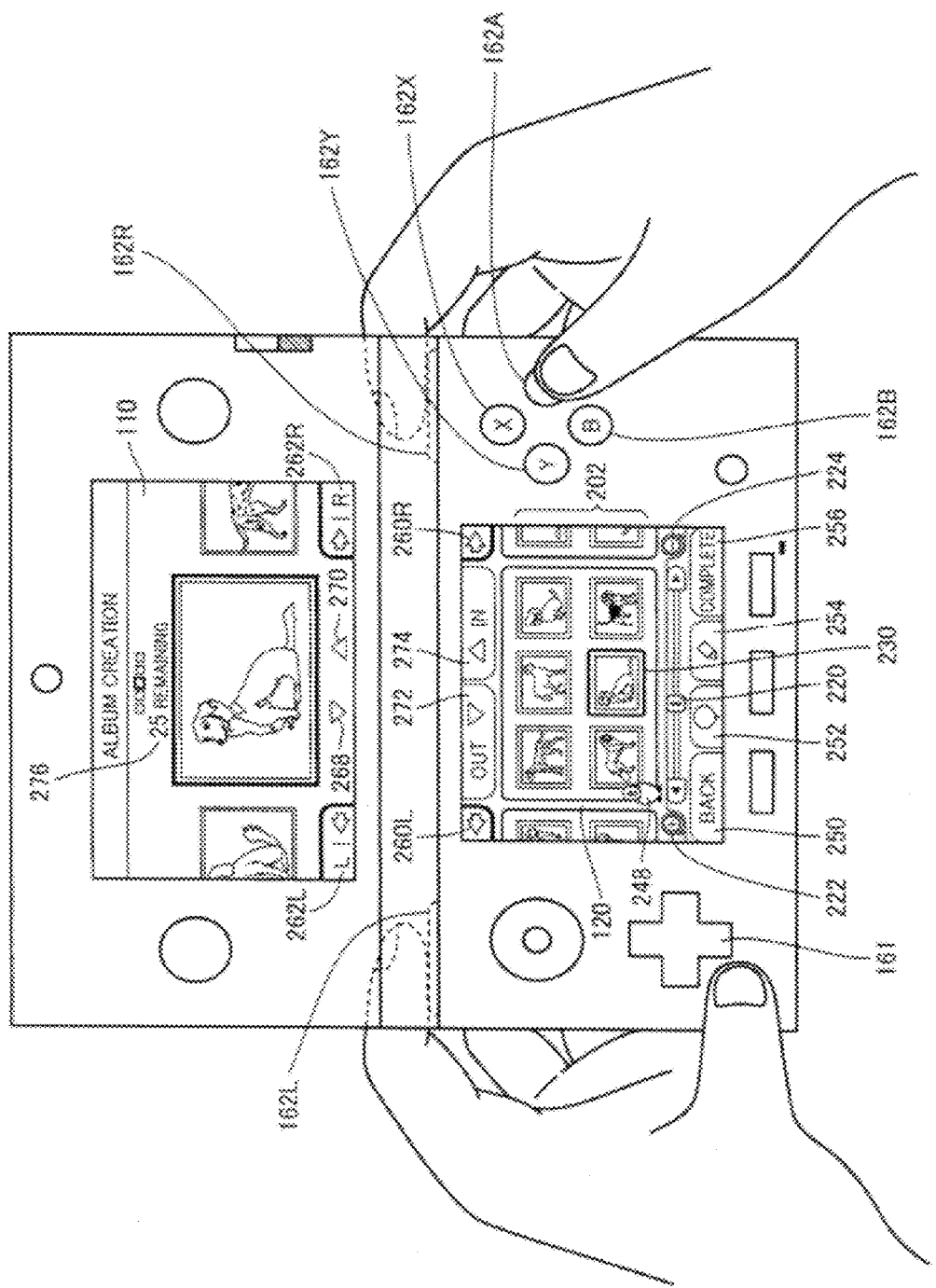
FIG. 17 shows an exemplary non-limiting diagram showing a screen example in a state where an operation button (an A button) has been operated in the screen example shown in FIG. 12.
Figure 18:
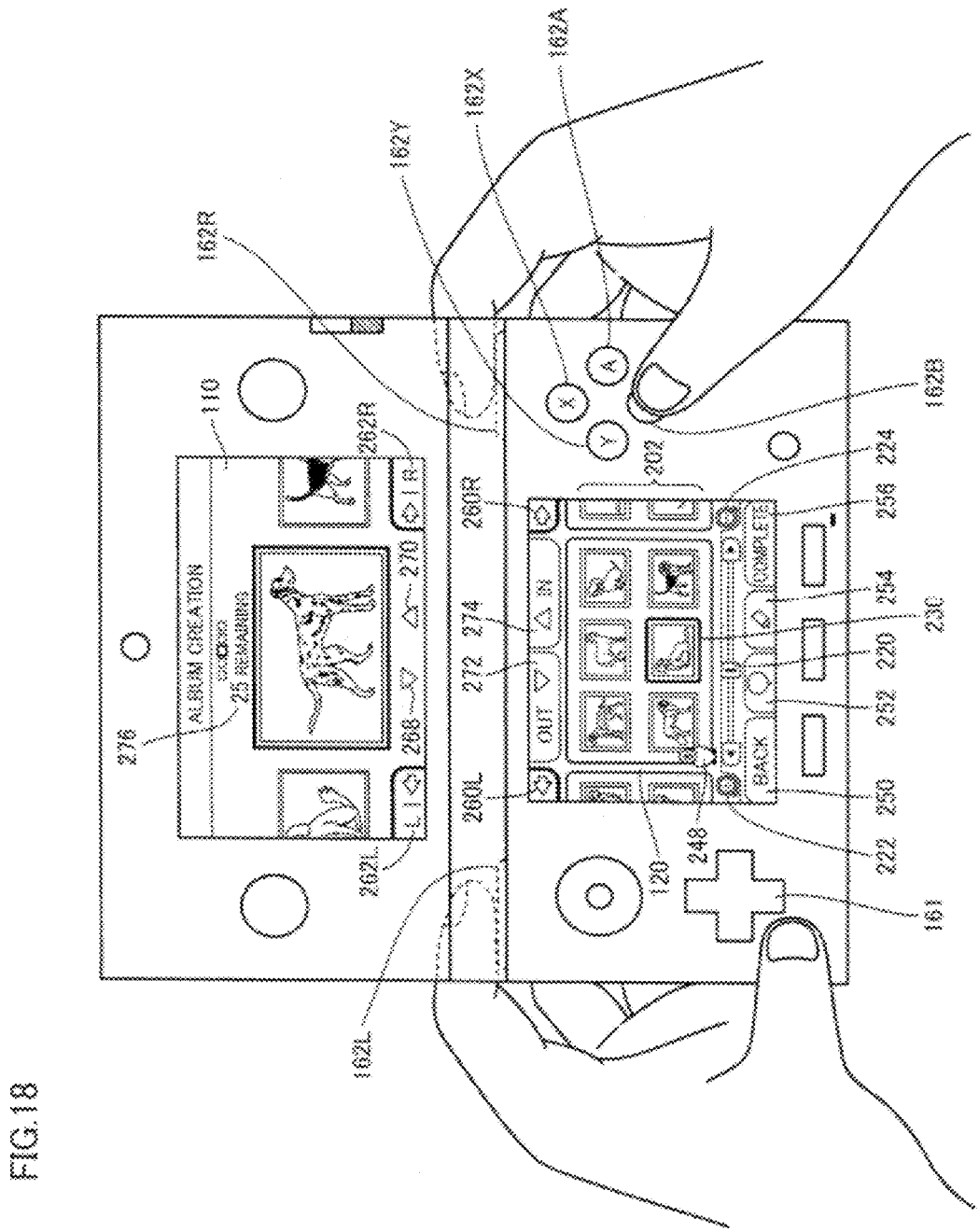
FIG. 18 shows an exemplary non-limiting diagram showing a screen example in a state where an operation button (a B button) has been operated in the screen example shown in FIG. 12.

FIG. 16 shows a screen example in a state where cross-shaped key 161 has been operated in the screen example shown in FIG. 12. FIG. 17 shows a screen example in a state where operation button 162A has been operated in the screen example shown in FIG. 12. FIG. 18 shows a screen example in a state where operation button 162B has been operated in the screen example shown in FIG. 12.

Referring to FIG. 16, the user operates cross-shaped key 161 to select at least one thumbnail image from the thumbnail image group. This selected thumbnail image is indicated by selected display image 230 displayed as superimposed on listing image 202. Namely, cross-shaped key 161 is operated such that selected display image 230 is located on the thumbnail image corresponding to the image of interest (main image) of which addition to the album being created is desired.

Thus, a thumbnail image included in the thumbnail image group is two-dimensionally displayed and selected display image 230 indicating the selected thumbnail image is displayed at a position in accordance with the operation of cross-shaped key 161.

Referring to FIG. 17, when the user presses operation button 162A while the selected display image 230 is set at a position corresponding to a target thumbnail image, the corresponding main image is added as a new image of interest into the album being created. Here, an image corresponding to the selected thumbnail image is added as a new image of interest, at a position adjacent to the image of interest corresponding to the selected position in the order of alignment in the group of images of interest.

More specifically, the newly added image of interest (main image) is inserted in between the image of interest corresponding to the selected position in the order of alignment in the group of images of interest and the image of interest located on its immediate left. Alternatively, the newly added image of interest (main image) may be inserted in between the image of interest corresponding to the selected position in the order of alignment in the group of images of interest and the image of interest located on its immediate right.

As shown in FIG. 17, as such an image of interest is added, the order of alignment provided to the images of interest included in the album being created is updated. Then, at least one object (image of interest) included in the group of images of interest is displayed on upper LCD 110, with the new image of interest having been added.

Referring to FIG. 18, when the selected position is set in advance at the image of interest in the group of images of interest, of which deletion is desired, and the user presses operation button 162B, the image of interest corresponding to the selected position in the order of alignment in the group of images of interest is deleted from the album being created. More specifically, as the target image of interest (main image) is deleted, the images of interest located on opposing sides of the deleted image of interest are brought closer to each other.

As shown in FIG. 18, as such an image of interest is deleted, the order of alignment provided to the images of interest included in the album being created is updated. Then, at least one object (image of interest) included in the group of images of interest is displayed on upper LCD 110, with the image of interest having been deleted.

Upper LCD 110 displays indicator images 268 and 270 notifying the user of an operation corresponding to deletion and addition of a main image, in correspondence with an operation image 272 and an operation image 274 respectively.

It is noted that a button for performing an operation to add a new image of interest (main image) to images of interest in the album is not limited to operation button 162A and other buttons may be made use of. Similarly, a button for performing an operation to delete an image of interest from the album is not limited to operation button 162B and other buttons may be made use of.

Further, a configuration may be such that a plurality of thumbnail images can simultaneously be selected.

It is noted that an operation the same as in the case of pressing cross-shaped key 161, operation button 162A or operation button 162B can be performed also by the user's operation of touch panel 122. Namely, based on information detected in response to the operation of touch panel 122, processing the same as in the operation of any of cross-shaped key 161, operation button 162A and operation button 162B can be performed.

More specifically, as the user uses stylus pen 177 or the like to perform an operation to touch any position on listing image 202, selected display image 230 moves to a touched position. Alternatively, as the user uses stylus pen 177 or the like to perform an operation to touch operation image 274 labeled with "in", as in the case of pressing of operation button 162A, an image of interest corresponding to the thumbnail image selected in lower LCD 120 is added to the album being created. On the other hand, as the user uses stylus pen 177 or the like to perform an operation to touch operation image 272 labeled with "out", as in the case of pressing of operation button 162B, an image of interest corresponding to the selected position in the group of group of images of interest is deleted from the album being created.

Further, lower LCD 120 displays an operation image 250 indicating end of the material selection processing to return to a menu screen (FIG. 11), an operation image 252 indicating start of sound effect association processing, a touch operation image 254 indicating start of graffiti processing, and an operation image 256 indicating completion of the album creation processing.

As the user uses stylus pen 177 or the like to perform an operation to touch operation image 252 in which a picture of an audio box is shown, sound effect association processing which will be described later is started. Alternatively, as the user uses stylus pen 177 or the like to perform an operation to touch operation image 254 in which a picture of a pencil is shown, graffiti processing which will be described later is started.

Furthermore, as the user uses stylus pen 177 or the like to perform an operation to touch operation image 256 labeled with "complete", preview processing and album data output processing are started. This album data output processing will be described later.

(i2: Sound Effect Association Processing)

In the sound effect association processing, voice and sound at the time of reproduction (sound effect) can be associated with each image of interest constituting the album. In particular, in game device 1 according to the present embodiment, as the user operates with his/her forefingers and thumbs of both hands, L button 162L and R button 162R as well as operation button 162A, operation button 162B and cross-shaped key 161, the user can intuitively and readily select sound effect to be associated with each image of interest.

More specifically, on lower LCD 120 located on the lower side when viewed from the user, an audio icon group showing voices and sounds that can be associated with the images of interest is at least partially displayed and at least one object (audio icon) is selected from the object (audio icon) group in response to the user's operation of cross-shaped key 161.

As will be described later, the number of audio icons simultaneously displayed on lower LCD 120 is restricted to a prescribed number. Therefore, when a large number of audio icons showing voices and sounds that can be associated with the image of interest are present, only audio icons corresponding to a part thereof are accordingly displayed. On the other hand, when a small number of audio icons showing voices and sounds that can be associated with the image of interest are present, all audio icons can simultaneously be displayed.

On the other hand, on upper LCD 110 located on the upper side when viewed from the user, the group of images of interest included in the album is displayed as the object and a selected position in the order of alignment in the group of images of interest is changed in response to the user's operation of L button 162L or R button 162R. Here, along with change in the selected position in the group of images of interest, at least one object (image of interest) included in the object group (group of images of interest) and corresponding to the selected position is displayed on upper LCD 110.

In game device 1 according to the present embodiment, the order of alignment is set for the images of interest included in the album being created, and the images of interest included in the group of images of interest are displayed in a line in a direction in parallel to the upper side of upper housing 2 in accordance with this order of alignment. Here, three images of interest in total, that is, the image of interest corresponding to the selected position in response to the user's operation of L button 162L or R button 162R and two images of interest located on opposing sides of the image of interest, are displayed on upper LCD 110.

As described above, an audio icon showing voice and sound that can be associated with the image of interest is selected in lower LCD 120. In addition, as the user operates operation button 162A while the selected position in the group of images of interest is determined, in response to that operation, voice and sound corresponding to the selected audio icon is associated with the main image showing the image of interest corresponding to the selected position in the order of alignment in the group of images of interest. In accordance with this association processing, the associated image of interest is displayed on upper LCD 110, with association of voice and sound being shown.

When the user further operates operation button 162A while the main image showing the image of interest corresponding to the selected position in the order of alignment in the group of images of interest and some kind of voice and sound are associated with each other, association of voice and sound with the main image showing the image of interest is canceled and then new voice and sound corresponding to the selected audio icon is associated with the main image showing the image of interest corresponding to the selected position in the order of alignment in the group of images of interest.

On the other hand, when the user operates operation button 162B while the selected position in the group of images of interest is determined, in response to that operation, association with the main image showing at least one object (image of interest) included in the group of images of interest and corresponding to the selected position is canceled. Along with this cancellation of association, the image of interest of which association has been canceled is displayed on upper LCD 110, with absence of association with voice and sound being shown.

Operation button 162B is provided on the same side of lower LCD 120 where operation button 162A is located, and the user can operate with his/her right thumb any of operation button 162A and operation button 162B.

As described above, by operating L button 162L or R button 162R located on the upper side when viewed from the user, a selected position in the group of images of interest displayed on upper LCD 110 located above is changed, and by operating cross-shaped key 161, operation button 162A and operation button 162B located on the lower side when viewed from the user, voice and sound corresponding to an audio icon displayed on lower LCD 120 located below is selected, added and deleted. Namely, positional relation between L button 162L and R button 162R and cross-shaped key 161, operation button 162A and operation button 162B corresponds to positional relation between upper LCD 110 and lower LCD 120. Therefore, the user can operate L button 162L and R button 162R in association with upper LCD 110 and can operate cross-shaped key 161, operation button 162A and operation button 162B in association with lower LCD 120, so that the user can more intuitively perform an operation for sound effect association.

More specific processing in the sound effect association processing will be described hereinafter.

In the sound effect association processing as well, as in the material selection processing described above, L button 162L and R button 162R are used to change the selected position in the order of alignment in the group of images of interest. Namely, as the user presses L button 162L once as in FIG. 14 described above, the group of images of interest displayed on upper LCD 110 moves to the left as a whole. In addition, the selected position in the order of alignment in the group of images of interest moves to an image of interest located on the right of the image of interest corresponding to the selected position before the button operation. Namely, the group of images of interest displayed on upper LCD 110 shifts to the left by the number of times of pressing of L button 162L by the user.

Alternatively, as the user presses R button 162R once as in FIG. 15 described above, the group of images of interest displayed on upper LCD 110 moves to the right as a whole. In addition, the selected position in the order of alignment in the group of images of interest moves to an image of interest located on the left of the image of interest corresponding to the selected position before the button operation. Namely, the group of images of interest displayed on upper LCD 110 shifts to the right by the number of times of pressing of R button 162B by the user.

Thus, on upper LCD 110, the images of interest included in the group of images of interest are displayed in a line in a direction in parallel to the upper side of upper housing 2, and the images of interest included in the displayed group of images of interest are displayed as slid in a direction brought in correspondence with relative positional relation of L button 162L or R button 162R to upper LCD 110.

It is noted that an operation the same as in the case of pressing of L button 162L or R button 162R can be performed also by the user's operation of touch panel 122. Namely, based on information detected in response to the operation of touch panel 122, processing the same as in the operation of any of L button 162L and R button 162R can be performed.

On the other hand, lower LCD 120 displays listing images 286 and 288 including audio icons indicating voices and sounds that can be associated with the images of interest.

Figure 19:
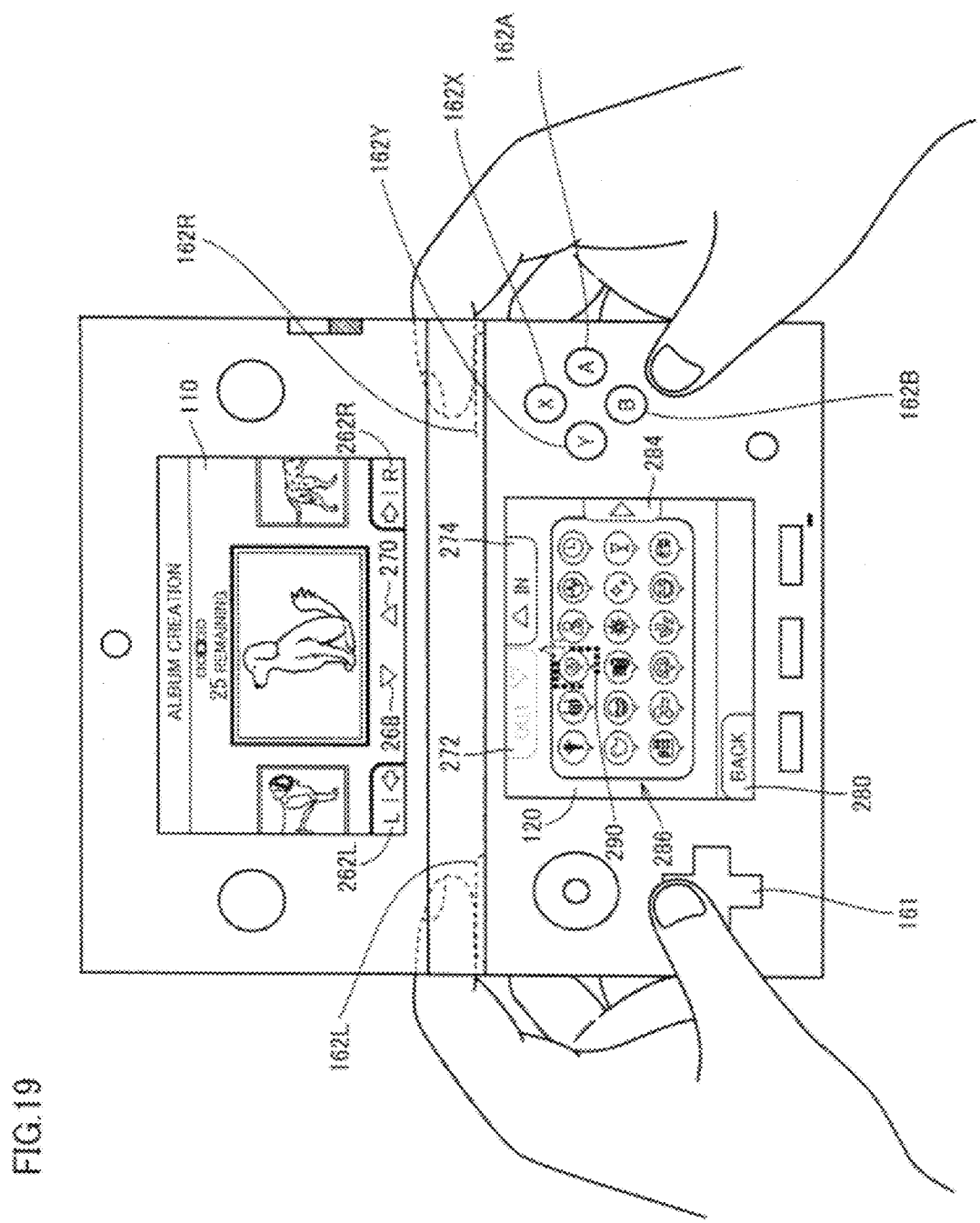
FIGS. 19 and 20 show exemplary non-limiting diagrams each showing a screen example in a state where the cross-shaped key has been operated in sound effect association processing.
Figure 20:
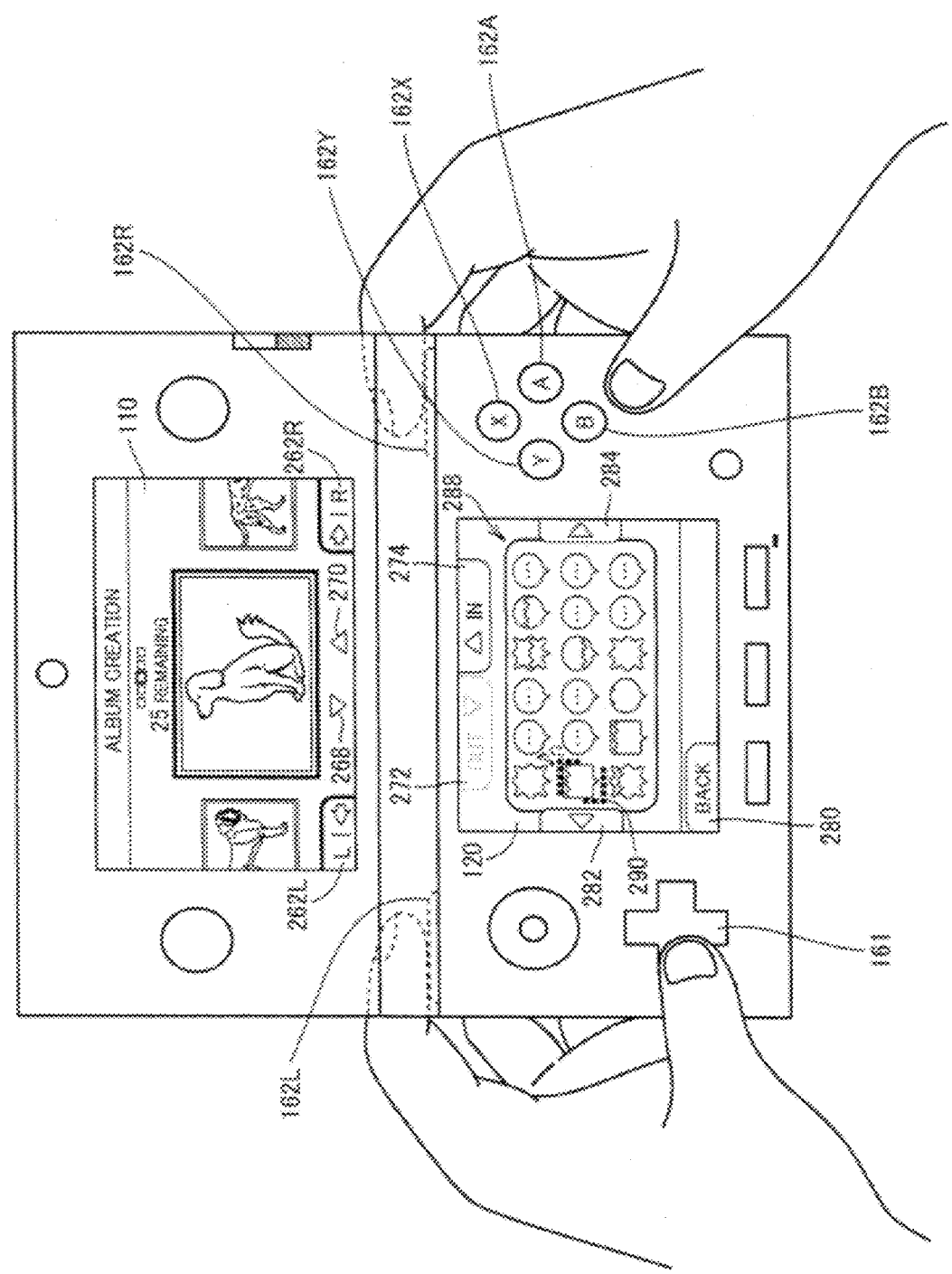
Figure 21:
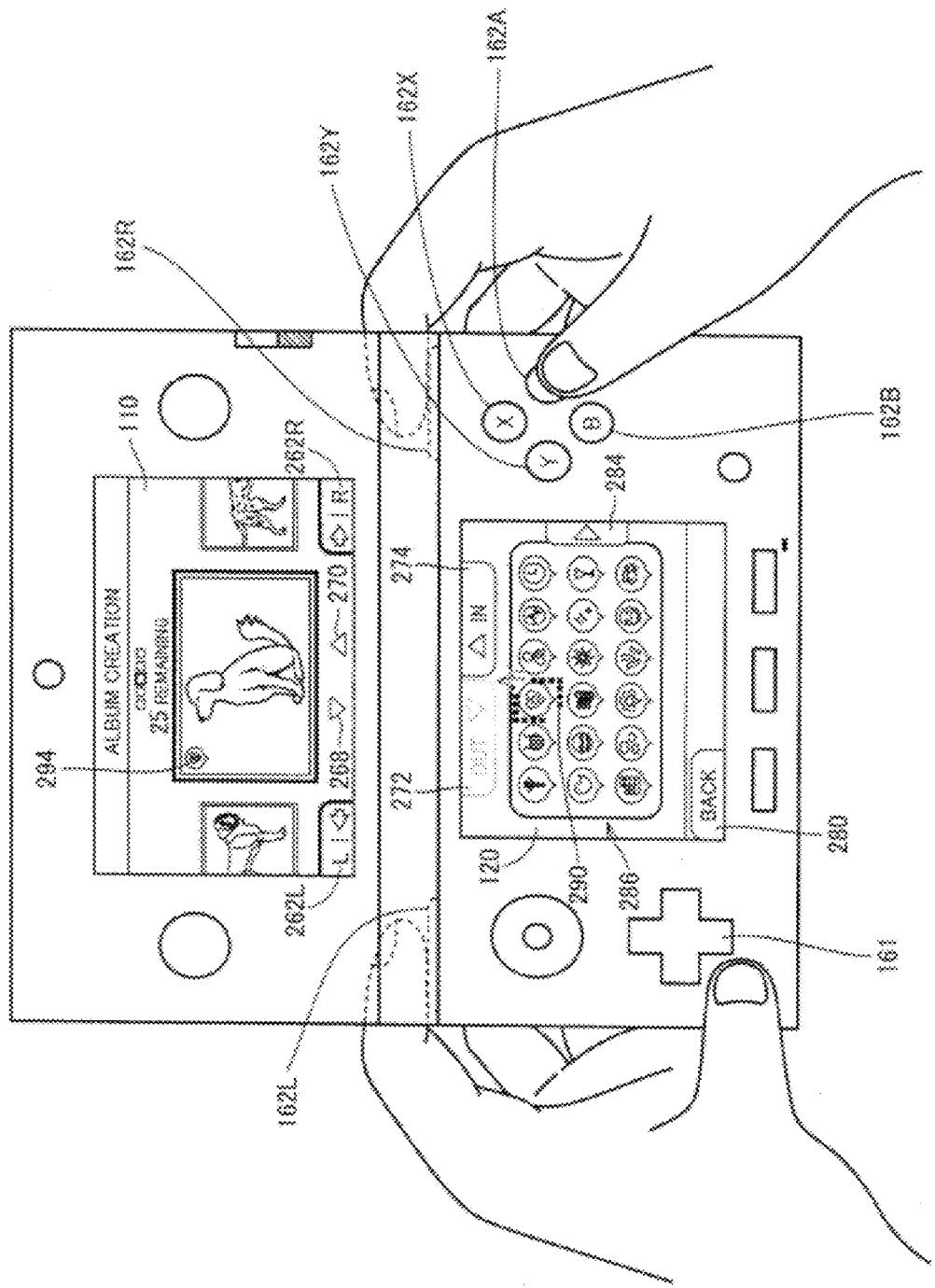
FIG. 21 shows an exemplary non-limiting diagram showing a screen example in a state where the operation button (A button) has been operated in the screen example shown in FIG. 19 or 20.
Figure 22:
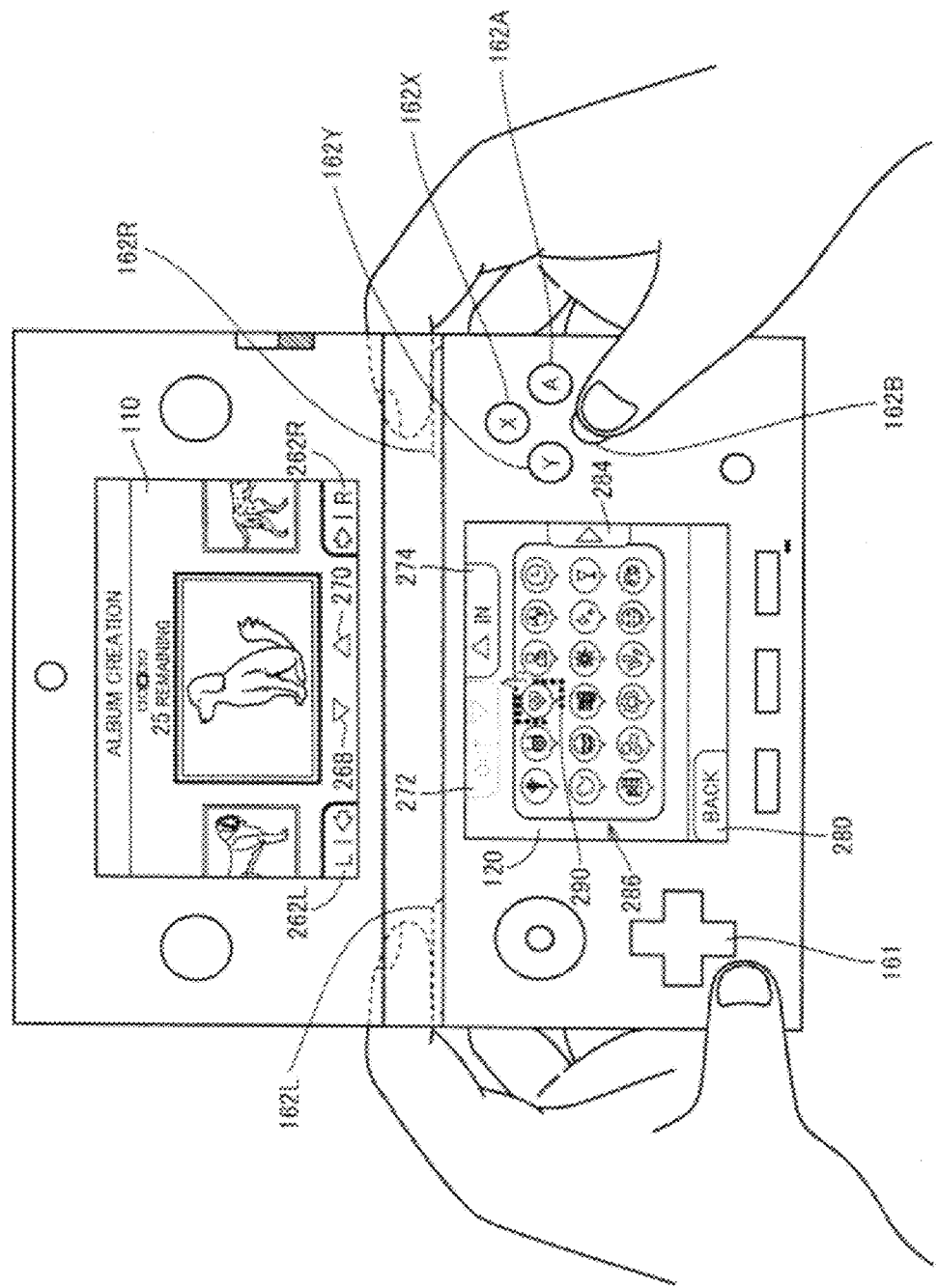
FIG. 22 shows an exemplary non-limiting diagram showing a screen example in a state where the operation button (B button) has been operated in the screen example shown in FIG. 19 or 20.
Figure 23:
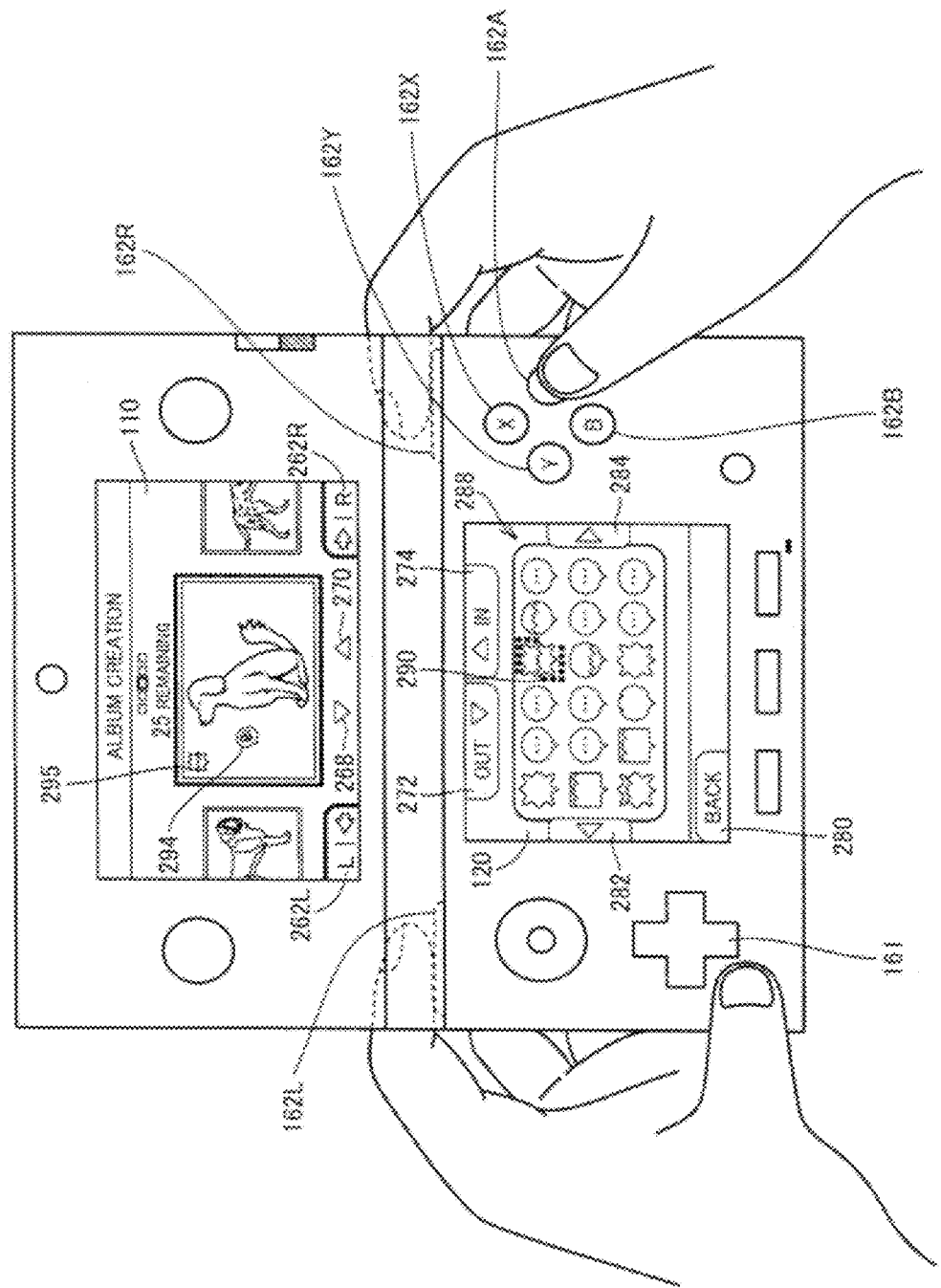
FIG. 23 shows an exemplary non-limiting diagram showing a screen example in a state where the operation button (A button) has further been operated in the screen example shown in FIG. 22.

FIGS. 19 and 20 each show a screen example of a state where cross-shaped key 161 has been operated in the sound effect association processing. FIG. 21 shows a screen example of a state where operation button 162A has been operated in the screen example shown in FIG. 19 or 20. FIG. 22 is a diagram showing a screen example of a state where operation button 162B has been operated in the screen example shown in FIG. 19 or 20. FIG. 23 is a diagram showing a screen example of a state where operation button 162A has further been operated in the screen example shown in FIG. 22.

When an operation to touch operation image 252 is performed in screen display shown in FIG. 12 or 13, switch to screen display as shown in FIG. 19 or 20 is made.

Referring to FIGS. 19 and 20, the user operates cross-shaped key 161 to select at least one audio icon from the audio icon group. This selected audio icon is indicated by a selected display image 290 displayed as superimposed on listing image 286 or listing image 288. Namely, cross-shaped key 161 is operated such that selected display image 290 is located over the audio icon, association with which is desired.

Thus, an audio icon included in the audio icon group is two-dimensionally displayed and selected display image 290 indicating the selected audio icon is displayed at a position in accordance with the operation of cross-shaped key 161.

In the present embodiment, in addition to voice and sound saved in advance in game device 1, voice and sound arbitrarily selected from among voices and sounds arbitrarily recorded by the user can be associated with a main image. Namely, listing image 286 shown in FIG. 19 displays voices and sounds saved in advance in game device 1 in a two-dimensionally selectable manner and a picture of each audio icon expresses contents of corresponding voice and sound. In addition, listing image 288 shown in FIG. 20 displays voices and sounds recorded by the user in a two-dimensionally selectable manner, and a picture of each audio icon expresses an amount of recording of corresponding voice and sound. More specifically, if a time period for recording of corresponding voice and sound is longer, such a picture that a container contains more content is employed as the audio icon included in listing image 288. On the other hand, if a time period for recording of corresponding voice and sound is shorter, such a picture that a container contains less content is employed as the audio icon included in listing image 288. It is noted that recording of voice and sound by the user can be carried out by using microphone 153 (see FIG. 4).

In addition, a larger number of audio candidates other than those as shown in FIGS. 19 and 20 may be prepared, and in that case, an operation image 282 or an operation image 284 for switching listing display of voice and sound are displayed. As the user operates cross-shaped key 161, a type of the audio icon displayed on lower LCD 120 is switched. Alternatively, in screen display shown in FIG. 19, as the user uses stylus pen 177 or the like to perform an operation to touch operation image 284, display contents on lower LCD 120 are switched from listing image 286 to listing image 288 shown in FIG. 20. Similarly, in screen display shown in FIG. 15, as the user uses stylus pen 177 or the like to perform an operation to touch operation image 282, display contents on lower LCD 120 are switched from listing image 288 to listing image 286 shown in FIG. 19.

It is noted that voice and sound corresponding to the audio icon selected on listing image 286 or 288 may be reproduced. Namely, while listing image 286 or 288 is displayed, the user arbitrarily moves selected display image 290 so as to select voice and sound to be associated with each image included in the album. Here, as the contents thereof are sequentially reproduced, the user can also search for appropriate sound effect while checking voice and sound.

Referring to FIG. 21, as the user presses operation button 162A while selected display image 290 is set at a position corresponding to a target audio icon, corresponding voice and sound is associated with a new image of interest in the album being created. Namely, in response to the user's operation of operation button 162A, voice and sound corresponding to the selected audio icon is associated with the main image showing at least one image of interest included in the group of images of interest and corresponding to the selected position in the order of alignment in the group of images of interest. Then, the associated image of interest is displayed on upper LCD 110, with a notification image (an icon 294) indicating that the data is associated therewith being provided in its upper left portion.

It is noted that information indicating an image of interest (main image) included in the album is held in main memory 138 (see FIG. 4). This information holds information for specifying main data showing each image of interest (a folder name, a file name and the like), in association with an order of alignment in the album. In addition, information for specifying voice and sound associated with each main image is also held. Therefore, when some kind of voice and sound is associated with a main image corresponding to an image of interest, new information indicating such contents is additionally written.

As shown in FIG. 21, when some kind of voice and sound is associated with the image of interest included in the album being created through the processing as described above, icon 294 which is a notification image for indicating the associated state is displayed as superimposed on the corresponding image of interest. Alternatively, icon 294 may be displayed in proximity to the image of interest. Namely, the associated image of interest is displayed on upper LCD 110, with association with voice and sound being shown. This icon 294 is preferably substantially the same in design as the audio icon corresponding to the voice and sound associated with the image of interest, in order for the user to apparently grasp which voice and sound is brought in correspondence with the image of interest.

Referring next to FIG. 22, when a selected position in the order of alignment in the group of images of interest indicating a main image of which association with voice and sound is desirably canceled is set in advance and the user presses operation button 162B, association of voice and sound with the main image showing the image of interest corresponding to the selected position in the order of alignment in the group of images of interest is canceled. Then, the image of interest of which association has been canceled is displayed on upper LCD 110, with absence of association of data being shown, that is, with a notification image (icon 294) provided in its upper left portion being absent. Here, information on association between the main image corresponding to the image of interest and some kind of voice and sound is updated (deleted).

Referring further to FIG. 23, it is assumed that voice and sound has already been associated with any image of interest included in the album being created, through the user's operation as described above. Here, on upper LCD 110, icon 294 is displayed as superimposed on the image of interest.

In this state, as shown in FIG. 23, as the user operates cross-shaped key 161 to select at least one audio icon from the audio icon group and further presses operation button 162A, in response to that operation, preceding association with data indicating at least one object included in the group of images of interest and corresponding to the selected position in the order of alignment in the group of images of interest is canceled and then new voice and sound corresponding to the selected audio icon is associated with the image of interest in the album being created.

More specifically, icon 294 displayed as superimposed on the image of interest displayed on upper LCD 110 is deleted from the screen with such an effect that icon 294 "falls" down to the lower side of the screen. In addition, an icon 295 corresponding to a new audio icon selected by the user is displayed as superimposed on the image of interest.

Upper LCD 110 displays indicator images 268 and 270 notifying the user of an operation corresponding to deletion and addition of a main image, in correspondence with operation image 272 and operation image 274 respectively.

It is noted that a button for performing an operation for processing for associating some kind of voice and sound with an image of interest in the album is not limited to operation button 162A and other buttons may be made use of. Similarly, a button for performing an operation to delete voice and sound associated with an image of interest from the album is not limited to operation button 162B and other buttons may be made use of.

Further, a configuration may be such that a plurality of audio icons can simultaneously be selected.

It is noted that an operation the same as in the case of pressing cross-shaped key 161, operation button 162A or operation button 162B can be performed also by the user's operation of touch panel 122. Namely, based on information detected in response to the operation of touch panel 122, processing the same as in the operation of any of cross-shaped key 161, operation button 162A and operation button 162B can be performed.

More specifically, as the user uses stylus pen 177 or the like to perform an operation to touch any position on listing image 202, selected display image 230 moves to the touched position. Alternatively, as the user uses stylus pen 177 or the like to perform an operation to touch operation image 274 labeled with "in", as in the case of pressing of operation button 162A, voice and sound corresponding to the audio icon selected in lower LCD 120 is associated with the image of interest selected in the album being created. On the other hand, as the user uses stylus pen 177 or the like to perform an operation to touch operation image 272 labeled with "out", as in the case of pressing of operation button 162B, association of voice and sound with the main image showing the image of interest is canceled and then the image of interest of which association has been canceled is displayed on lower LCD 120, with absence of association of data being shown.

Further alternatively, based on a position indicated in a series of position indication operations in the display region of lower LCD 120 with the use of stylus pen 177 or the like, selection of a target audio icon and association processing may be performed.

For example, the user uses stylus pen 177 or the like to select a target audio icon included in displayed listing image 286 or 288 on lower LCD 120 and thereafter performs such an operation as "flicking" the selected audio icon toward upper LCD 110. Then, the main image corresponding to the image of interest (displayed on upper LCD 110) selected in advance from among the images of interest included in the album and voice and sound corresponding to the selected audio icon (sound effect) are associated with each other.

From a point of view of improvement in usability or prevention of an erroneous operation, only when subsequent variation in indicated position caused by the user's operation on touch panel 122 satisfies a prescribed condition, voice and sound corresponding to the audio icon may be associated with the main image.

This prescribed condition can include a condition relating to at least one of a moving speed and an amount of displacement in the user's series of position indication operations (a single operation performed, with the state of touching touch panel 122 being maintained).

(i3: Graffiti Processing)

In graffiti processing, the user can arbitrarily add an object to each image saved in game device 1. This graffiti processing is started as an operation to touch operation image 254 in screen display shown in FIG. 12 or 13 is performed.

The image generated in this graffiti processing, to which a graffiti object has been added, may overwrite the original image, however, the image is preferably saved as another piece of data. By saving the image changed by the user as another piece of data, the user can enjoy free processing of the image obtained through image pick-up or the like and can arbitrarily select an image of interest constituting the album from among candidates including the processed image in addition to the original image.

Further, when the graffiti processing is performed on the image of interest included in the album being created, the processed image (the image to which a graffiti object has been added) may be added as a new image of interest included in the album being created (with the original image of interest being maintained).

As one specific example of such graffiti processing, the user can use stylus pen 177 or the like to add any graphics or character onto an image. In this case, preferably, a user interface allowing arbitrary change in thickness, color, shape, and the like of an added graphics or character is also provided.

By way of another example, the user can use stylus pen 177 or the like to arrange an object (stamp) at any position over an image. In this case, preferably, a user interface allowing arbitrary change in a type or the like of a stamp to be arranged is also provided.

The graffiti processing according to the present embodiment can adopt various forms of processing of an image, without limited to the contents described above.

(i4: Preview Processing)

In preview processing, preview display of the album being created is provided. Namely, the user can check beforehand, contents that will be displayed when album data generated from the album being created is reproduced.

Figure 24:
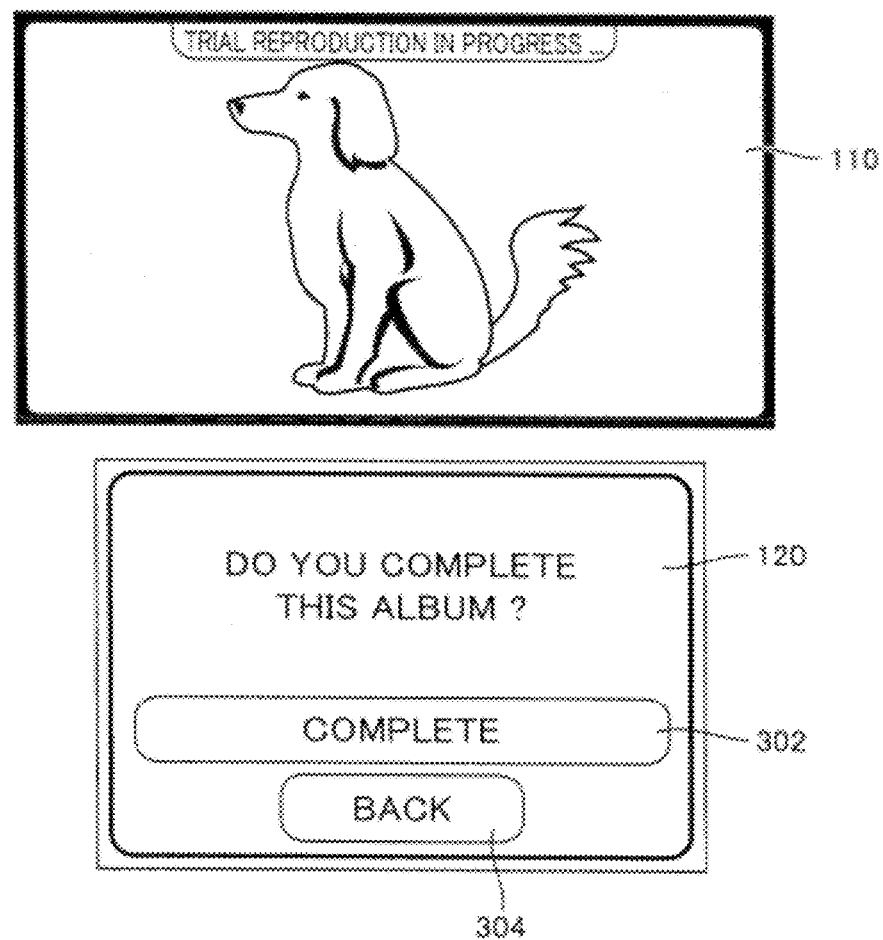
FIGS. 24 and 25 show exemplary non-limiting diagrams each showing a screen example in preview processing according to an exemplary embodiment.
Figure 25:
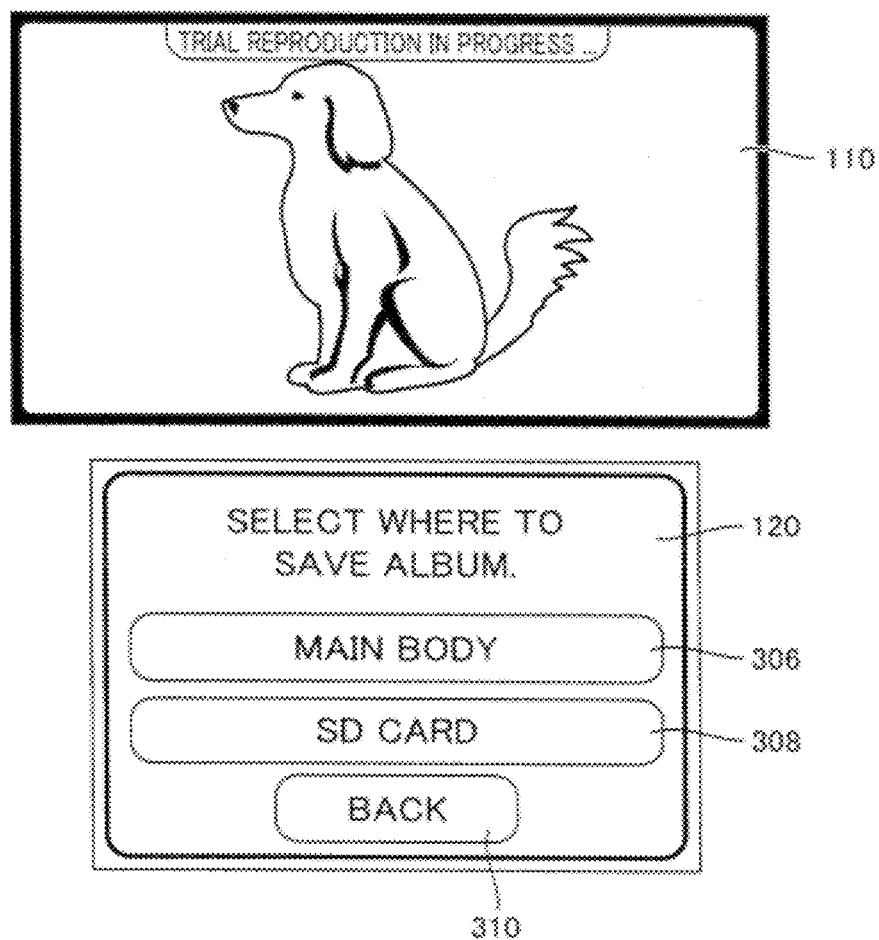

FIGS. 24 and 25 each show a screen example in the preview processing according to the embodiment. The preview processing is started when an operation to touch operation image 256 in screen display shown in FIG. 12 or 13 is performed. Namely, when an operation to touch operation image 256 in screen display shown in FIG. 12 or 13 is performed, switching to screen display as shown in FIG. 24 is made.

Referring to FIG. 24, on upper LCD 110, contents in the album being created are displayed. Namely, on upper LCD 110, images included in the album being created are displayed as being switched over time in a prescribed order of alignment. Here, together with display of the images, voice and sound associated in the sound effect association processing is also reproduced. It is noted that, in order to notify the user that preview display is provided, a message of "trial reproduction in progress . . . " is displayed on upper LCD 110.

In addition, on lower LCD 120, together with a message image "do you complete this album?", an operation image 302 indicating completion of the album (generation and output of the album data) and an operation image 304 indicating stop of preview processing are displayed.

Namely, as the user uses stylus pen 177 or the like to perform an operation to touch operation image 302 labeled with "complete", transition to screen display as shown in FIG. 25 is made. Alternatively, as the user uses stylus pen 177 or the like to perform an operation to touch operation image 304 labeled with "back", the screen returns to screen display as shown in FIG. 12 or 13.

In screen display shown in FIG. 25, the user is inquired about where to save the album data generated in album data output processing which will be described later. Namely, the output album data is saved in the main body of game device 1 or a storage device attached to game device 1.

In screen display shown in FIG. 25, on lower LCD 120, together with a message image "select where to save album," an operation image 306 indicating that non-volatile memory 136 (see FIG. 4) contained in game device 1 is to be set as a saving destination, an operation image 308 indicating that memory card 173 (see FIG. 1; typically, an SD card) attached to game device 1 is to be set as the saving destination, and an operation image 310 indicating return to screen display shown in FIG. 24 are displayed.

Namely, as the user uses stylus pen 177 or the like to perform an operation to touch operation image 306 labeled with "main body", non-volatile memory 136 is set as an output destination (saving destination) of the album data and then the album data output processing which will be described later is started. Alternatively, as the user uses stylus pen 177 or the like to perform an operation to touch operation image 308 labeled with "SD card", memory card 173 is set as an output destination (saving destination) of the album data and then the album data output processing which will be described later is started.

(i5: Album Data Output Processing)

In the album data output processing, album data is generated from the created album and the album data is output to the saving destination set in advance. At the time of generation of this album data, the user can arbitrarily designate attribute information on each piece of album data (typically, time and day of creation, a title, an icon for display, and the like).

Figure 26:
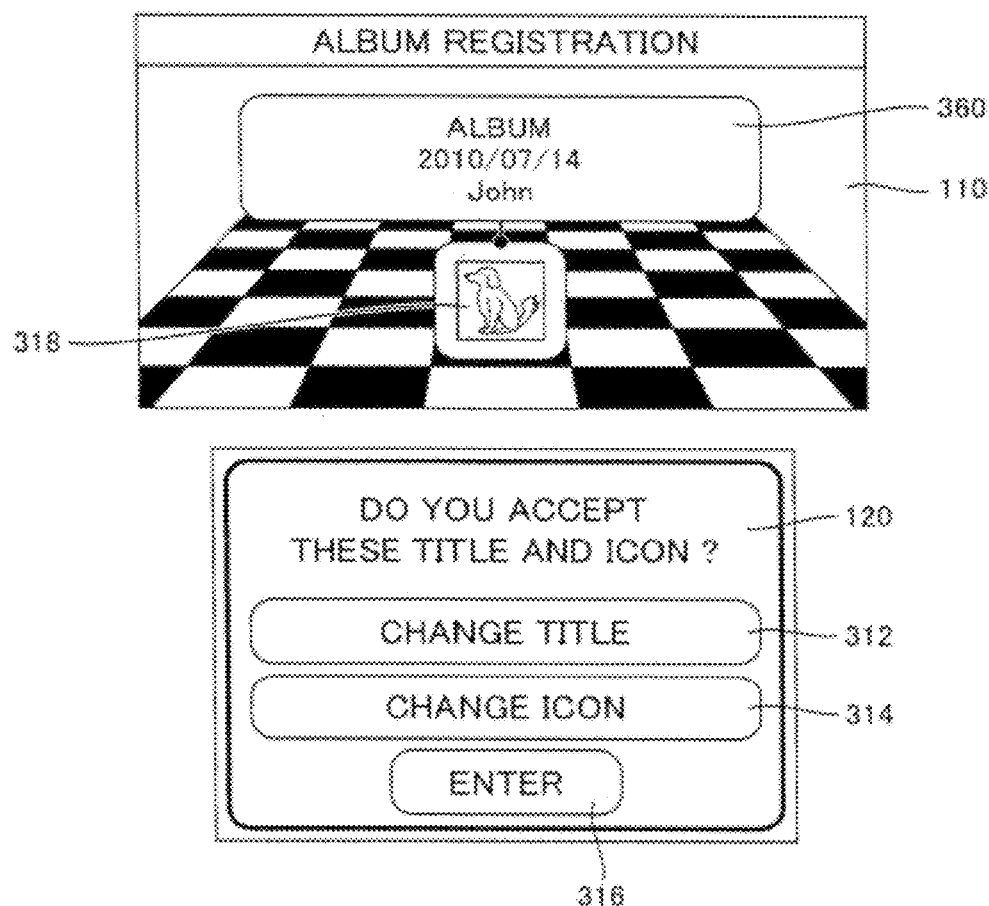
FIGS. 26 to 30 show exemplary non-limiting diagrams each showing a screen example in album data output processing according to an exemplary embodiment.

FIGS. 26 to 30 each show a screen example in the album data output processing according to the embodiment. In screen display shown in FIG. 25, as an operation to touch operation image 306 or operation image 308 is performed, transition to screen display shown in FIG. 26 is made and the album data output processing is started.

In screen display shown in FIG. 26, a message image 360 and an icon 318 showing attribute information provided to the generated album data are displayed on upper LCD 110. This message image 360 shows the time and day of creation and a title of the album. Icon 318 corresponds to an icon at the time when album data is selectably displayed in the not-shown HOME menu.

Lower LCD 120 provides a user interface for changing these title and icon. More specifically, on lower LCD 120, an operation image 312 indicating change in title, an operation image 314 indicating change in icon, and an operation image 316 indicating completion of the album data output processing are displayed.

Figure 27:
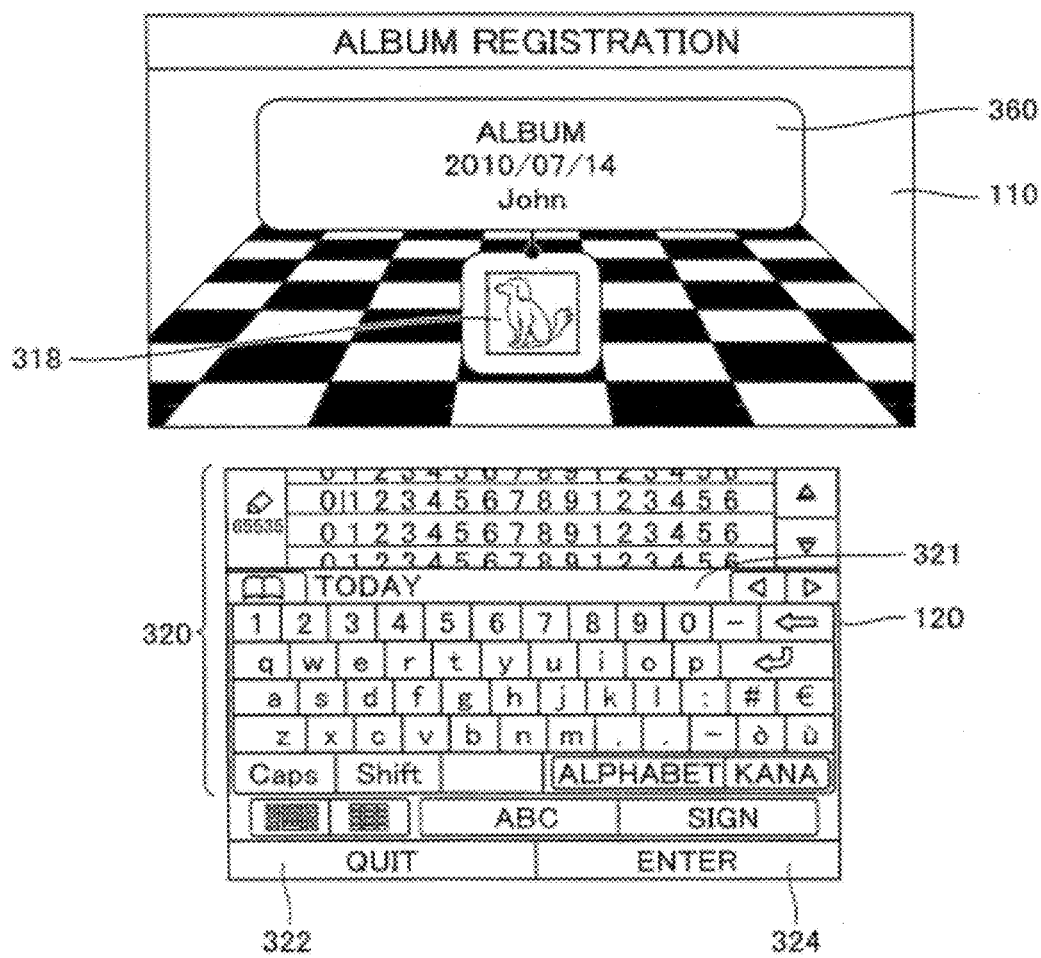
Figure 28:
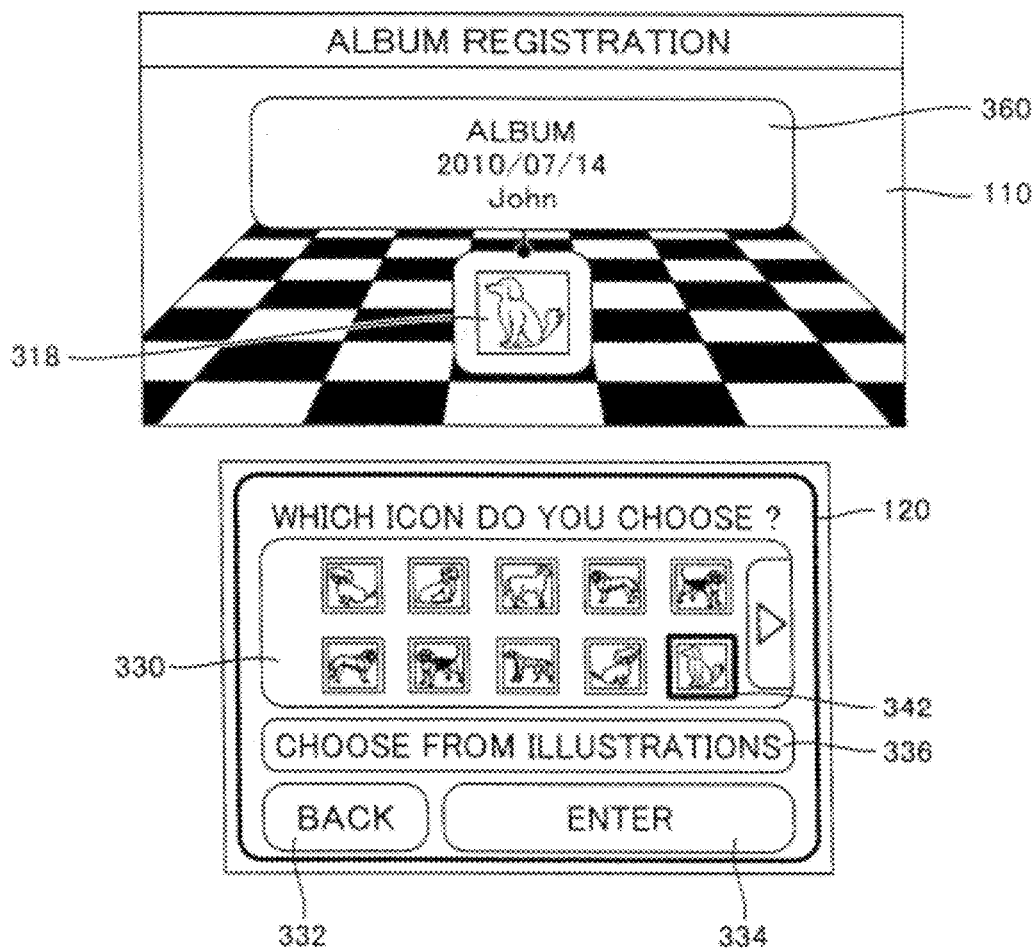
Figure 29:
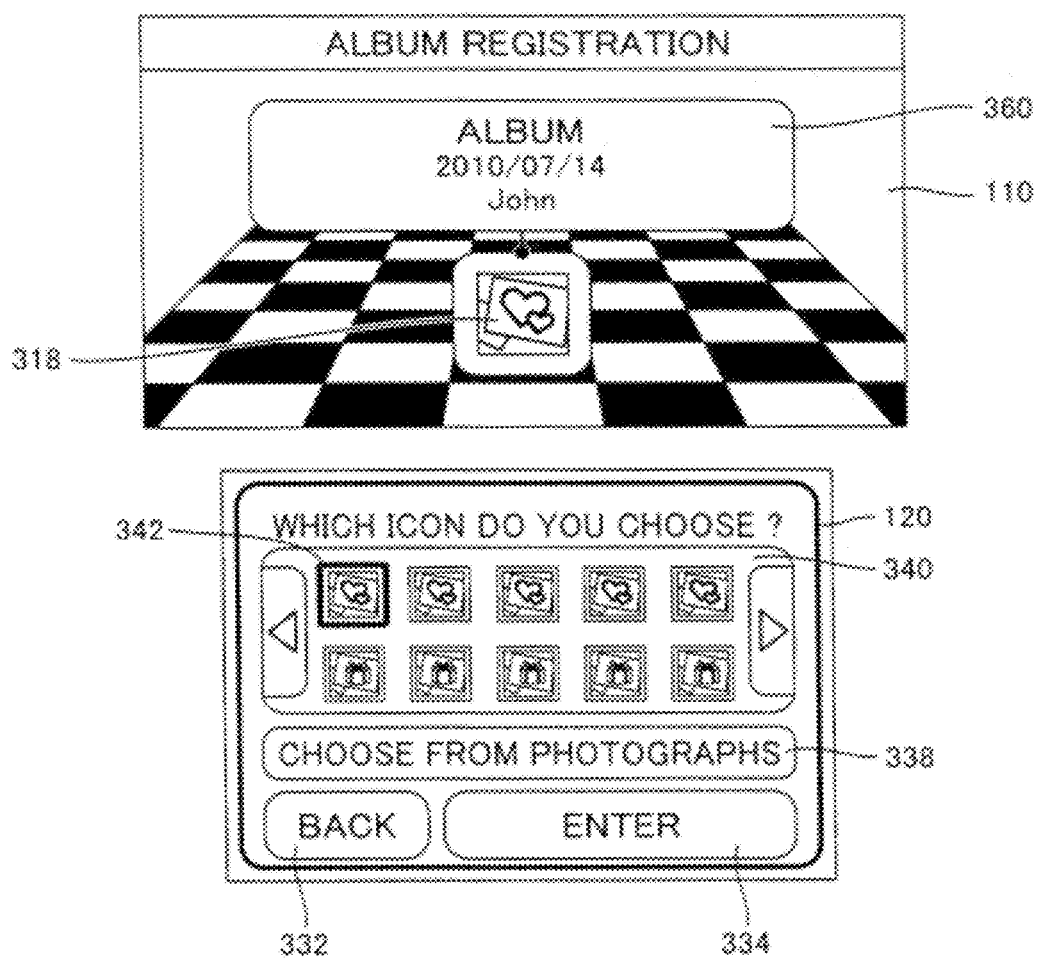
Figure 30:
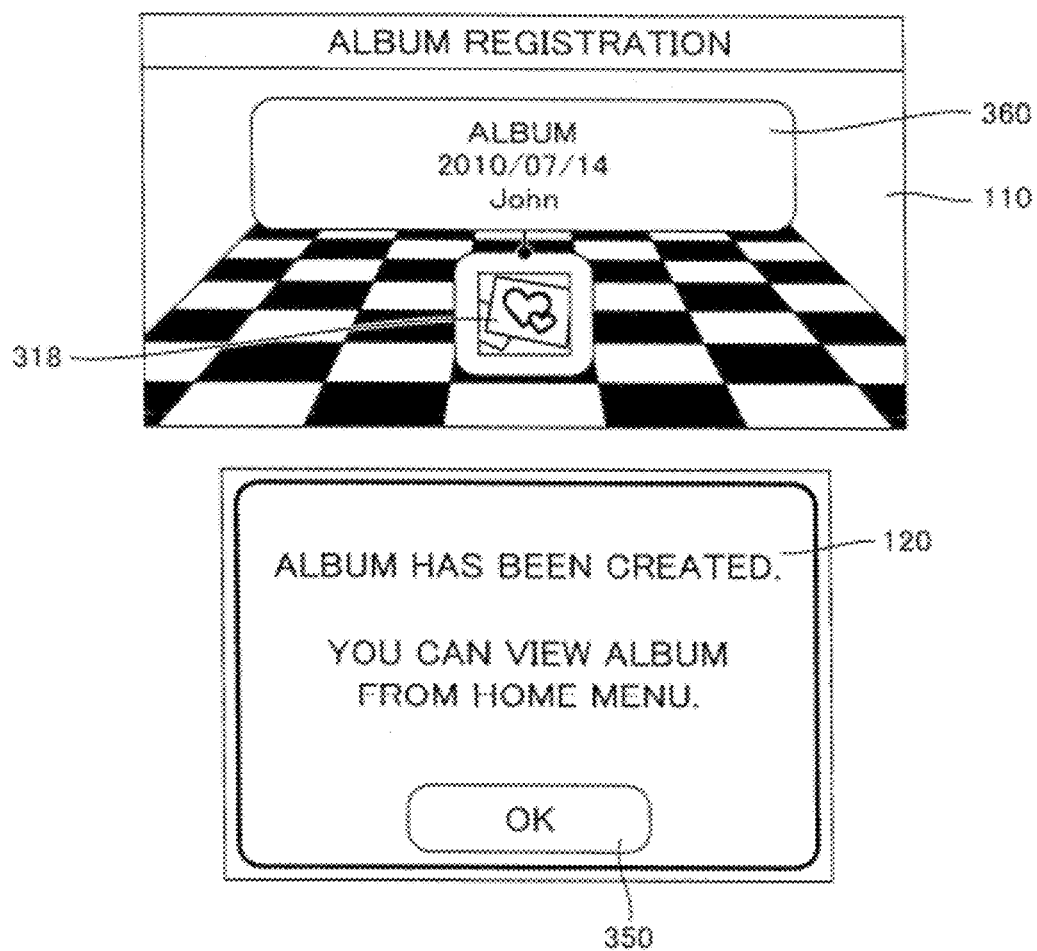

Namely, as the user uses stylus pen 177 or the like to perform an operation to touch operation image 312 labeled with "change title", transition to screen display as shown in FIG. 27 is made. Alternatively, as the user uses stylus pen 177 or the like to perform an operation to touch operation image 314 labeled with "change icon", transition to screen display shown in FIG. 28 or 29 is made. Alternatively, as the user uses stylus pen 177 or the like to perform an operation to touch operation image 316 labeled with "enter", generation and output of the album data is carried out and thereafter transition to screen display shown in FIG. 30 is made.

In screen display shown in FIG. 27, lower LCD 120 provides a character input interface for changing the title. More specifically, lower LCD 120 displays a character input image 320 like a keyboard, an operation image 322 indicating interruption of title change processing, and an operation image 324 indicating entry of title change.

Namely, as the user uses stylus pen 177 or the like to perform an operation to touch each character to constitute a desired title, that is included in character input image 320, the input character is reflected on a message image 321. Alternatively, as the user uses stylus pen 177 or the like to perform an operation to touch operation image 322 labeled with "quit", a character string (a character string displayed in message image 321) that has been input so far is cleared and the screen returns to screen display as shown in FIG. 26. Alternatively, as the user uses stylus pen 177 or the like to perform an operation to touch operation image 324 labeled with "enter", a character string (a character string displayed in message image 321) that has been input as the title is entered and the screen returns to screen display as shown in FIG. 26. Here, the title after change is reflected also on the display contents in message image 360.

In screen display shown in FIGS. 28 and 29, lower LCD 120 provides an input interface for selecting an icon to be provided to the album data. More specifically, on lower LCD 120, a listing display 330 or 340 including icons that can be provided to the album data is displayed. Listing display 330 shown in FIG. 28 includes icons (thumbnail images) obtained from the images of interest included in the corresponding album, and listing display 340 shown in FIG. 29 includes icons prepared in advance. Then, a selected display image 342 is displayed over these listing images 330 and 340. A position of this selected display image 342 varies in response to the user's operation of stylus pen 177 or the like or the user's operation of cross-shaped key 161 (see FIG. 1). An icon provided to icon data is selected by this selected display image 342.

Switching between FIGS. 28 and 29 can mutually be made. More specifically, in screen display shown in FIG. 28, an operation image 336 indicating switch to screen display in FIG. 29 is displayed on lower LCD 120, and in screen display shown in FIG. 29, an operation image 338 indicating switch to screen display in FIG. 28 is displayed on lower LCD 120.

Namely, as the user uses stylus pen 177 or the like to perform an operation to touch operation image 336 labeled with "choose from illustrations" shown in FIG. 28, transition to screen display as shown in FIG. 29 is made. On the other hand, as the user uses stylus pen 177 or the like to perform an operation to touch operation image 338 labeled with "choose from photographs" shown in FIG. 29, transition to screen display as shown in FIG. 28 is made.

In screen display shown in FIGS. 28 and 29, an operation image 332 indicating interruption of icon change processing and an operation image 334 indicating entry of icon change are displayed on lower LCD 120.

Namely, as the user uses stylus pen 177 or the like to perform an operation to touch operation image 332 labeled with "back", change in icon is not reflected but the screen returns to screen display as shown in FIG. 26. Alternatively, as the user uses stylus pen 177 or the like to perform an operation to touch operation image 334 labeled with "enter", the selected icon is reflected as an attribute value for the album data and then the screen returns to screen display as shown in FIG. 26.

In addition, in screen display shown in FIG. 26, as the user uses stylus pen 177 or the like to perform an operation to touch operation image 316 labeled with "enter", the album data is generated and the generated album data is saved in the saving destination selected in screen display shown in FIG. 25. In succession, transition to screen display shown in FIG. 30 is made.

In screen display shown in FIG. 30, a message that "album has been created" indicating that creation and output of the album data has been completed is displayed on lower LCD 120. In addition, on lower LCD 120, a message that "you can view album from HOME menu" guiding a method of reproducing the created album data is also displayed.

Moreover, in screen display shown in FIG. 30, an operation image 350 labeled with "OK" is also displayed, and as the user uses stylus pen 177 or the like to perform an operation to touch this operation image 350, the screen returns to screen display as shown in FIG. 10.

(i6: Data Structure of Album Data)

FIG. 31 shows a data structure of album data generated in game device 1 according to the present embodiment.

Referring to FIG. 31, each piece of album data 400 includes metadata 401, an image data group 402, an audio data group 403, album setting data 404, and album management data 405.

Metadata 401 includes information necessary for display of corresponding album data in the HOME menu.

Image data group 402 includes data for displaying images of interest constituting the album and it substantially corresponds to copy of image data for the images of interest saved in advance in game device 1. Similarly, audio data group 403 includes data for displaying sound effect associated with each image of interest constituting the album and it substantially corresponds to copy of audio data saved in advance in game device 1. Image data and audio data included in image data group 402 and audio data group 403 respectively are ordered, and association between the image of interest and sound effect is made in accordance with this order of alignment.

For reproduction in any environment, even in a case where the album includes the same images or voices and sounds, the album data preferably includes such image or audio data in a redundant manner.

Album setting data 404 includes attribute information set for the album (a title and an icon) and the like. Album management data 405 includes information for managing an order of reproduction of images of interest constituting the album and the like.

<J. Processing Procedure>

Figure 32:
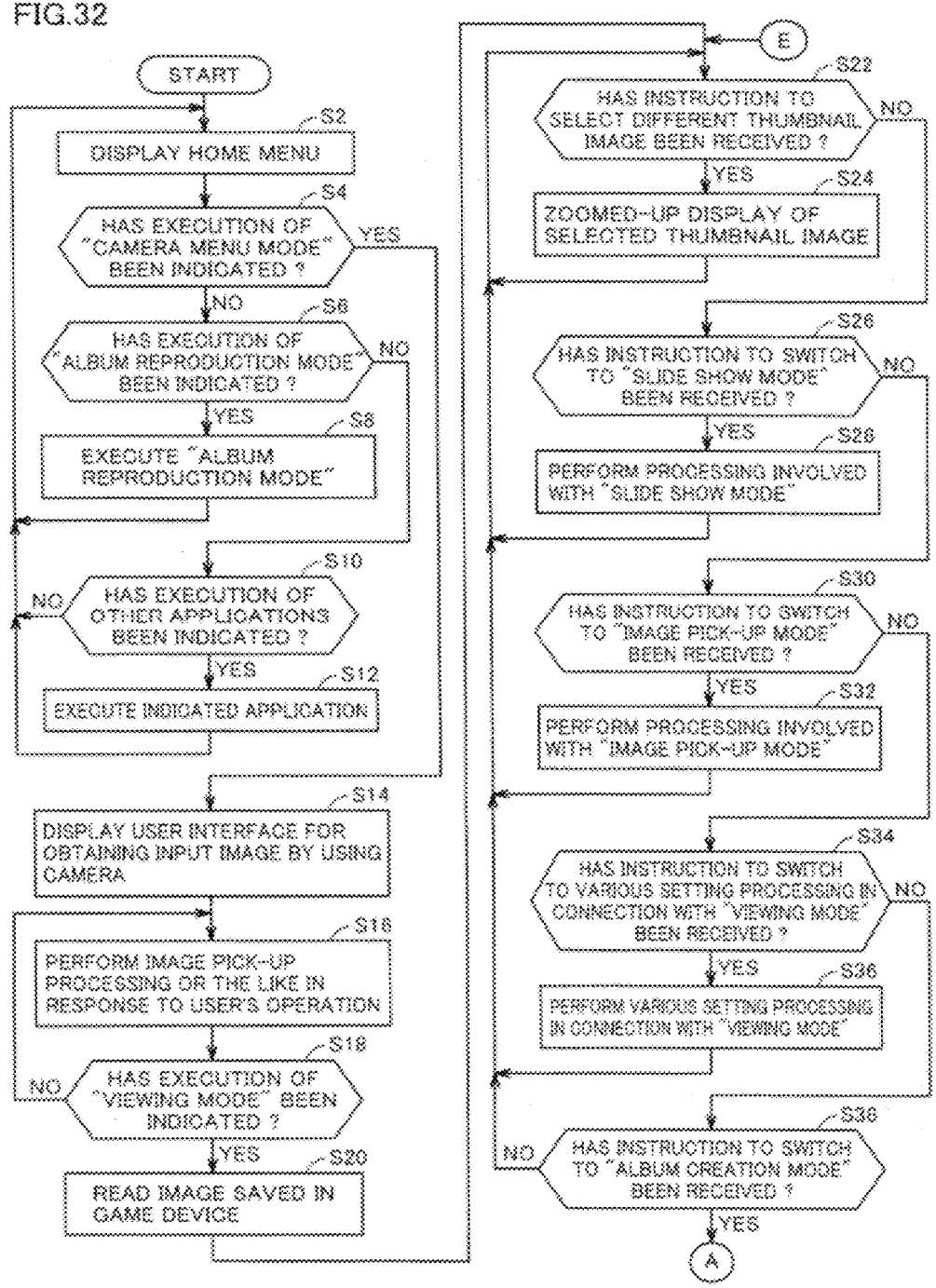
FIGS. 32 to 34 show exemplary non-limiting flowcharts of a main routine involved with display control processing provided in the game device.
Figure 33:
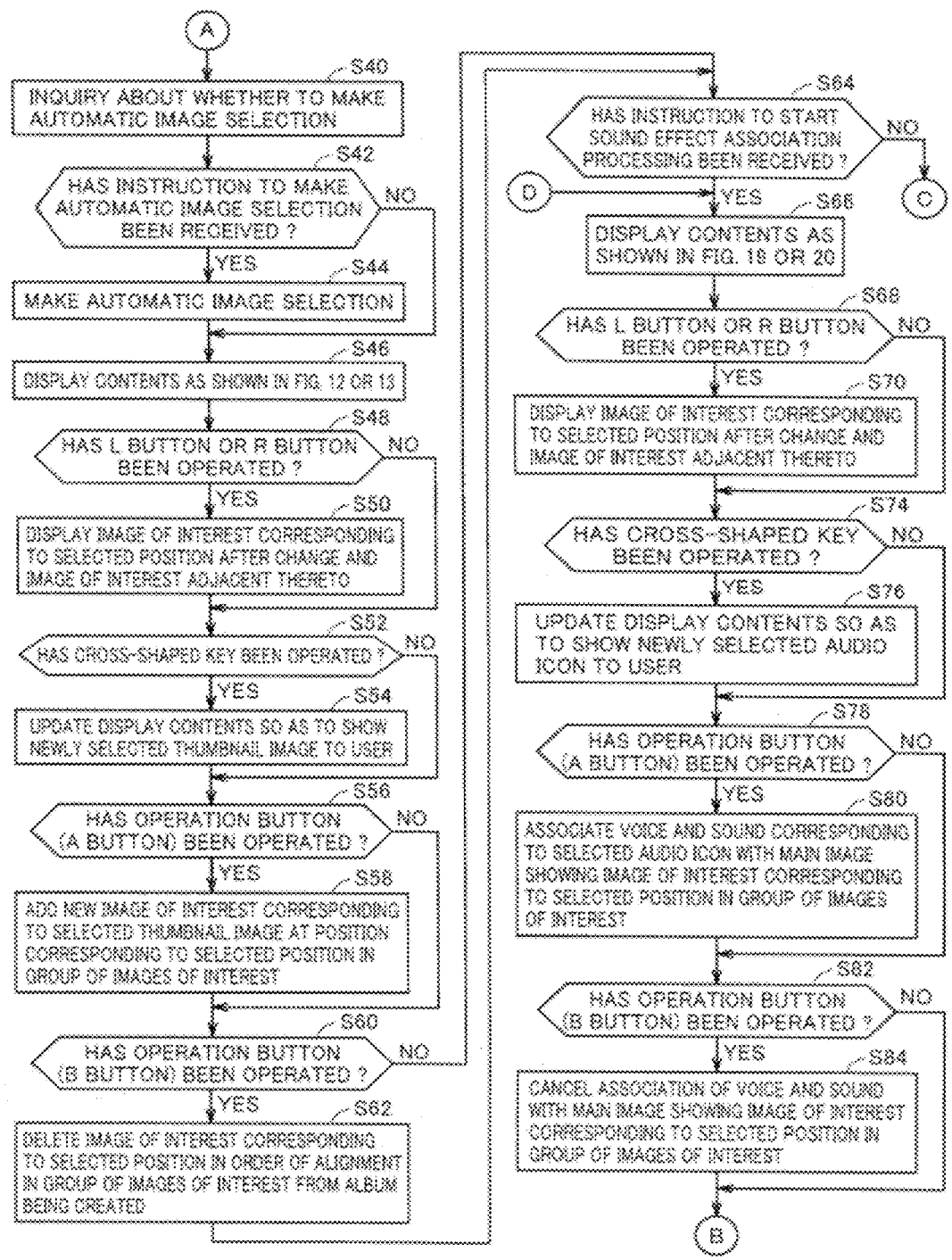
Figure 34:
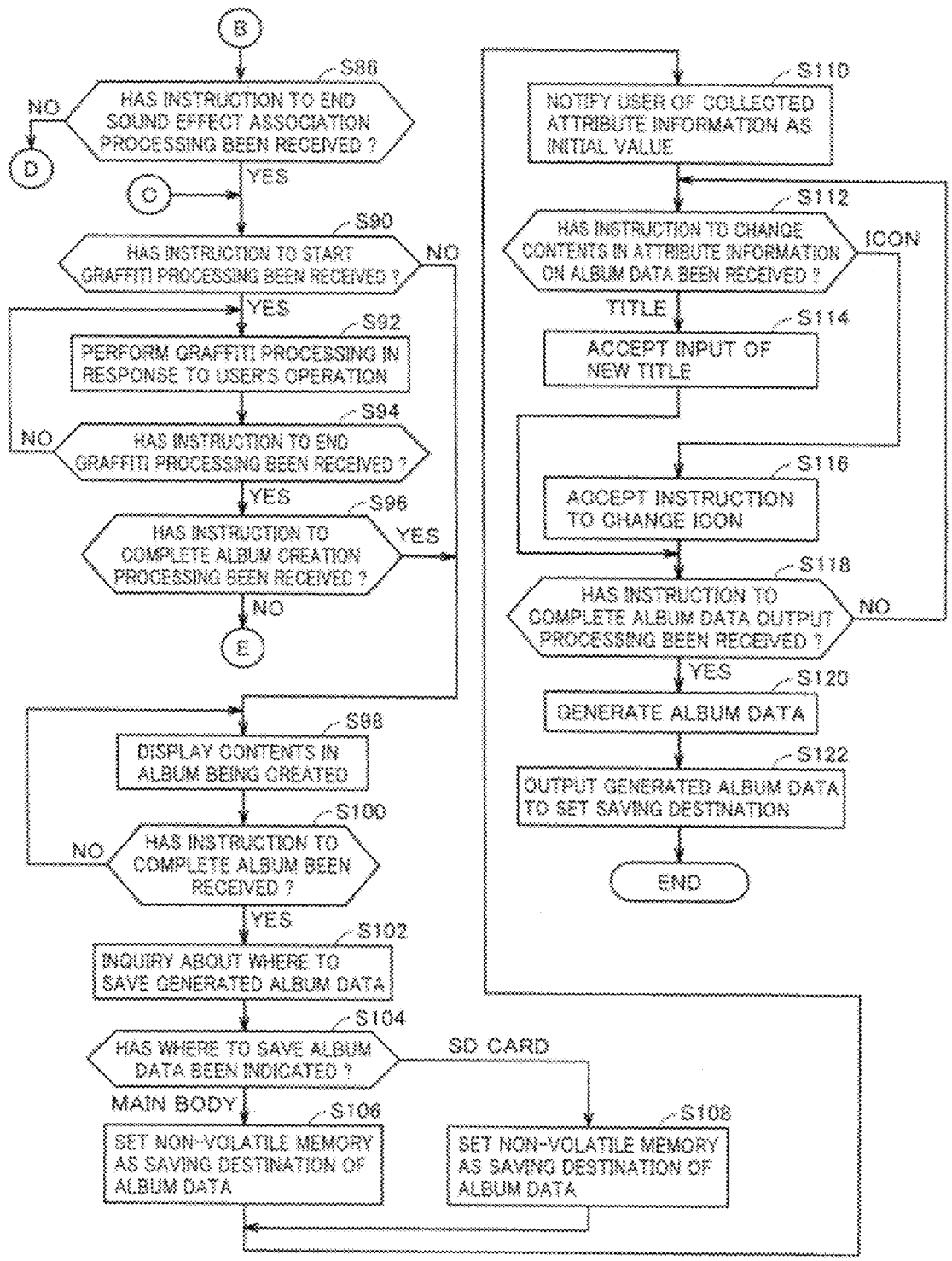

FIGS. 32 to 34 are flowcharts of a main routine involved with display control processing provided in game device 1 according to the embodiment.

Each step in each flowchart shown in FIGS. 32 to 34 is typically provided by operation processing unit 100 (FIG. 4) executing a program (instruction set). It is noted that operation processing unit 100 does not have to execute a single program but one application or a plurality of applications may be executed together with a program (or firmware) providing a basic OS (Operating System). In addition, the entirety or a part of processing shown below may be implemented by hardware.

Referring to FIGS. 32 to 34, operation processing unit 100 provides screen display of an image (not shown) corresponding to the HOME menu (step S2). Namely, as the initial state, it is assumed that the "HOME menu mode" (state ST1) shown in FIG. 9 is set. In succession, operation processing unit 100 determines whether execution of the "camera menu mode" has been indicated or not (step S4). When execution of the "camera menu mode" has been indicated (YES in step S4), the process proceeds to step S14.

When execution of the "camera menu mode" has not been indicated (NO in step S4), operation processing unit 100 determines whether execution of the "album reproduction mode" has been indicated or not (step S6). When execution of the "album reproduction mode" has been indicated (YES in step S6), operation processing unit 100 executes the "album reproduction mode" (step S8). Namely, transition to the "album reproduction mode" (state ST7) shown in FIG. 9 is made. After the "album reproduction mode" ends, the process returns to step S2.

When execution of the "album reproduction mode" has not been indicated (NO in step S6), whether execution of other applications has been indicated or not is determined (step S10). When execution of other applications has been indicated (YES in step S10), operation processing unit 100 executes the indicated application (step S12). After the application ends, the process returns to step S2.

When execution of other applications has not been indicated (NO in step S10), the processing in step S2 and subsequent steps is repeated.

In step S14, operation processing unit 100 provides screen display of contents involved with processing for obtaining an input image with the use of a pair of outer cameras 131L and 131R (see FIG. 2A) or inner camera 133 (see FIG. 1) (step S14). Namely, operation processing unit 100 provides a user interface necessary for execution of the "image pick-up mode." Then, operation processing unit 100 performs image pick-up processing or the like in response to the user's operation (step S16).

In addition, operation processing unit 100 determines whether execution of the "viewing mode" (state ST4) has been indicated or not (step 518). When execution of the "viewing mode" (state ST4) has been indicated (YES in step S18), processing in step S20 and subsequent steps is performed. In contrast, when execution of the "viewing mode" (state ST4) has not been indicated (NO in step S18), processing in step S16 and subsequent steps is performed.

In step S20, operation processing unit 100 reads an image saved in game device 1 and provides display of contents as shown in FIG. 10 on upper LCD 110 and lower LCD 120. In succession, operation processing unit 100 determines whether an instruction to select a thumbnail image different from the currently selected thumbnail image from among thumbnail images displayed as listing image 202A has been received or not (step S22). When an instruction to select a thumbnail image different from the currently selected thumbnail image has been received (YES in step S22), operation processing unit 100 provides zoomed-up display of the selected thumbnail image on upper LCD 110 (step S24). Then, processing in step S22 and subsequent steps is repeated.

In contrast, when an instruction to select a thumbnail image different from the currently selected thumbnail image has not been received (NO in step S22), operation processing unit 100 determines whether an instruction to switch to the "slide show mode" (state ST6 shown in FIG. 9) has been received or not (step S26). Namely, whether a coordinate indication on operation image 212 shown in FIG. 10 has been provided or not is determined. When an instruction to switch to the "slide show mode" has been received (YES in step S26), operation processing unit 100 randomly orders images saved in game device 1 and provides switched display of each image on upper LCD 100 in that order every prescribed time. Operation processing unit 100 adds an effect based on setting contents designated in advance. Namely, operation processing unit 100 performs processing involved with the "slide show mode" (step S28). After processing involved with the "slide show mode" has ended, processing in step S22 and subsequent steps is repeated.

In contrast, when an instruction to switch to the "slide show mode" has not been received (NO in step S26), operation processing unit 100 determines whether an instruction to switch to the "image pick-up mode" (state ST3 shown in FIG. 9) has been received or not (step S30). Namely, whether a coordinate indication on operation image 214 shown in FIG. 10 has been provided or not is determined. When an instruction to switch to the "image pick-up mode" has been received (YES in step S30), operation processing unit 100 performs processing involved with the "image pick-up mode" (step S32). After the processing involved with the "image pick-up mode" has ended, processing in step S22 and subsequent steps is repeated.

In contrast, when an instruction to switch to the "image pick-up mode" has not been received (NO in step S30), operation processing unit 100 determines whether an instruction to switch to various setting processing in connection with the "viewing mode" has been received or not (step S34). Namely, whether a coordinate indication on operation image 216 shown in FIG. 10 has been provided or not is determined. When an instruction to switch to various setting processing in connection with the "viewing mode" has been received (YES in step S34), operation processing unit 100 performs various setting processing in connection with the "viewing mode" (step S36). After the various setting processing in connection with the "viewing mode" has ended, processing in step S22 and subsequent steps is repeated.

In contrast, when an instruction to switch to the various setting processing in connection with the "viewing mode" has not been received (NO in step S34), operation processing unit 100 determines whether an instruction to switch to the "album creation mode" (state ST5 shown in FIG. 9) has been received or not (step S38). Namely, whether a coordinate indication on operation image 210 shown in FIGS. 10A and 10B has been provided or not is determined. When an instruction to switch to the "album creation mode" has not been received (NO in step S38), processing in step S22 and subsequent steps is repeated.

When an instruction to switch to the "album creation mode" has been received (YES in step S38), operation processing unit 100 provides display of contents as shown in FIG. 11 on upper LCD 110 and lower LCD 120 (step S40). Namely, operation processing unit 100 inquires of the user about whether to perform a function to automatically initially select an image of interest to be included in the album (automatic image selection). In succession, operation processing unit 100 determines whether an instruction to make automatic image selection has been received or not (step S42). Namely, which of a coordinate indication on operation image 242 shown in FIG. 11 and a coordinate indication on operation image 244 shown in FIG. 11 has been given is determined.

When an instruction to make automatic image selection has been received (YES in step S42), operation processing unit 100 randomly selects one theme of a plurality of themes prepared in advance and extracts as images of interest, one or more images from among images saved in game device 1, in accordance with the selection rules corresponding to the selected theme (step S44). It is noted that operation processing unit 100 holds in main memory 138 (see FIG. 4), information indicating images of interest included in the album. This information retains information for specifying image data showing each image of interest (a folder name, a file name and the like), in association with an order of alignment in the album.

In contrast, when an instruction not to make automatic image selection has been received (NO in step S42), operation processing unit 100 skips processing in step S44.

Thereafter, operation processing unit 100 provides display of contents as shown in FIG. 12 or 13 on upper LCD 110 and lower LCD 120 (step S46).

Operation processing unit 100 determines whether L button 162L or R button 162R has been operated or not (step S48). Namely, operation processing unit 100 accepts an instruction to change the selected position in the order of alignment in the group of images of interest included in the album being created. In other words, operation processing unit 100 determines whether an instruction to select an image of interest different from the currently selected image of interest from among the images of interest included in the album being created and displayed on upper LCD 110 has been received or not.

When L button 162L or R button 162R has been operated (YES in step S48), operation processing unit 100 causes upper LCD 110 to display an image of interest corresponding to the changed selected position in a largest size and also at least a part of two images of interest adjacent to the selected image of interest (step S50). Then, the process proceeds to step S52.

In contrast, when neither of L button 162L and R button 162R has been operated (NO in step S48), operation processing unit 100 skips processing in step S50.

In succession, operation processing unit 100 determines whether cross-shaped key 161 has been operated or not (step S52). Namely, operation processing unit 100 accepts selection of some kind of thumbnail image from the thumbnail image group displayed in a list. In other words, operation processing unit 100 determines whether an instruction to select a thumbnail image different from the currently selected thumbnail image from among images displayed as listing image 202 displayed on lower LCD 120 has been received or not.

When cross-shaped key 161 has been operated (YES in step S52), operation processing unit 100 updates display contents on lower LCD 120 so as to show a newly selected thumbnail image to the user (step S54).

In contrast, when cross-shaped key 161 has not been operated (NO in step S52), operation processing unit 100 skips processing in step S54.

In succession, operation processing unit 100 determines whether operation button 162A has been operated or not (step S56). Namely, operation processing unit 100 determines whether an instruction to add a main image corresponding to the selected thumbnail image to the album has been received or not.

When operation button 162A has been operated (YES in step S56), operation processing unit 100 adds a new image of interest corresponding to the selected thumbnail image (main image) at a position corresponding to the selected position in the order of alignment in the group of images of interest (step S58). Along with addition of this new image of interest, operation processing unit 100 causes upper LCD 110 to display at least one object (image of interest) included in the group of images of interest after addition. More specifically, operation processing unit 100 updates information indicating the image of interest included in the album held in main memory 138. Here, the order of alignment of all images of interest included in the album, inclusive of the newly added main image, is updated. Therefore, regarding the order of alignment of the images of interest following the newly added main image, those images are moved down.

In contrast, when operation button 162A has not been operated (NO in step S56), operation processing unit 100 skips processing in step S58.

In succession, operation processing unit 100 determines whether operation button 162B has been operated or not (step S60). Namely, operation processing unit 100 determines whether an instruction to delete the image of interest corresponding to the selected position in the order of alignment in the group of images of interest from the album being created has been received or not.

When operation button 162B has been operated (YES in step S60), operation processing unit 100 deletes the image of interest corresponding to the selected position in the order of alignment in the group of images of interest from the album being created (step S62). Then, as this image of interest is deleted, operation processing unit 100 updates display contents on upper LCD 110. More specifically, operation processing unit 100 updates information indicating the images of interest included in the album held in main memory 138. Here, the order of alignment of the remaining images of interest except for the newly deleted image of interest is updated. Therefore, regarding the order of alignment of the images of interest that followed the deleted image of interest, those images are moved up.

In contrast, when operation button 162B has not been operated (NO in step S60), operation processing unit 100 skips processing in step S62.

Steps S42 to S62 described above correspond to the contents in the material selection processing described above.

In succession, operation processing unit 100 determines whether an instruction to start the sound effect association processing has been received or not (step S64). Namely, whether a coordinate indication on operation image 252 shown in FIG. 12 or 13 has been given or not is determined.

When an instruction to start the sound effect association processing has been received (YES in step S64), operation processing unit 100 provides display of contents as shown in FIG. 19 or 20 on upper LCD 110 and lower LCD 120 (step S66).

Operation processing unit 100 determines whether L button 162L or R button 162R has been operated or not (step S68). Namely, operation processing unit 100 accepts an instruction to change the selected position in the order of alignment in the group of images of interest included in the album being created. In other words, operation processing unit 100 determines whether an instruction to select an image of interest different from the currently selected image of interest among the images of interest included in the album being created and displayed on upper LCD 110 has been received or not.

When L button 162L or R button 162R has been operated (YES in step S68), operation processing unit 100 causes upper LCD 110 to display an image of interest corresponding to the changed selected position in a largest size and also at least a part of two images of interest adjacent to the selected image of interest (step S70). Then, the process proceeds to step S74.

In contrast, when neither of L button 162L and R button 162R has been operated (NO in step S68), operation processing unit 100 skips processing in step S70.

In succession, operation processing unit 100 determines whether cross-shaped key 161 has been operated or not (step S74). Namely, operation processing unit 100 accepts selection of some kind of audio icon from the audio icon group displayed in a list. In other words, operation processing unit 100 determines whether an instruction to select an audio icon different from the currently selected audio icon from among the audio icons displayed as listing image 286 or 288 displayed on lower LCD 120 has been received or not.

When cross-shaped key 161 has been operated (YES in step S74), operation processing unit 100 updates display contents on lower LCD 120 so as to show a newly selected audio icon to the user (step S76). Here, operation processing unit 100 reproduces voice and sound corresponding to the newly selected audio icon.

In contrast, when cross-shaped key 161 has not been operated (NO in step S74), operation processing unit 100 skips processing in step S76.

In succession, operation processing unit 100 determines whether operation button 162A has been operated or not (step S78). Namely, operation processing unit 100 determines whether an instruction to associate voice and sound corresponding to the selected audio icon with a main image corresponding to the selected image of interest has been received or not.

When operation button 162A has been operated (YES in step S78), operation processing unit 100 associates voice and sound corresponding to the selected audio icon with the main image showing the image of interest corresponding to the selected position in the order of alignment in the group of images of interest (step S80). Along with this association processing, operation processing unit 100 causes upper LCD 110 to display the associated image of interest, with association of voice and sound being shown. Namely, operation processing unit 100 updates display contents on upper LCD 110 as this sound effect association processing is performed. More specifically, operation processing unit 100 updates information indicating the images of interest included in the album held in main memory 138. Here, information for specifying audio data (a folder name, a file name and the like) and information for specifying image data of the associated image of interest are held in a manner associated with each other.

In contrast, when operation button 162A has not been operated (NO in step S78), operation processing unit 100 skips processing in step S80.

In succession, operation processing unit 100 determines whether operation button 162B has been operated or not (step S82). Namely, operation processing unit 100 determines whether an instruction to delete voice and sound associated with the main image showing the image of interest corresponding to the selected position in the order of alignment in the group of images of interest has been received or not (step S82).

When operation button 162B has been operated (YES in step S82), operation processing unit 100 cancels association of voice and sound with the main image showing the image of interest corresponding to the selected position in the order of alignment in the group of images of interest (step S84). Namely, operation processing unit 100 deletes voice and sound associated with the main image showing the image of interest corresponding to the selected position. Further, operation processing unit 100 updates display contents on upper LCD 110 as this associated voice and sound is deleted. More specifically, operation processing unit 100 updates information indicating the image of interest included in the album held in main memory 138. Here, information for specifying the audio data of interest (a folder name, a file name and the like) in such information is deleted.

In contrast, when operation button 162B has not been operated (NO in step S82), operation processing unit 100 skips processing in step S84.

In succession, operation processing unit 100 determines whether an instruction to end the sound effect association processing has been received or not (step S86). Namely, whether a coordinate indication on operation image 280 shown in FIGS. 14 to 19 has been given or not is determined.

When an instruction to end the sound effect association processing has been received (YES in step S86), the process proceeds to step S90. In addition, when an instruction to start the sound effect association processing has been received as well (NO in step S64), the process proceeds to step S90.

In contrast, when an instruction to end the sound effect association processing has not been received (NO in step S86), the processing in step S66 and subsequent steps is repeated.

The steps S66 to S86 described above correspond to the contents in the sound effect association processing described above.

In step S90, operation processing unit 100 determines whether an instruction to start the graffiti processing has been received or not (step S90). Namely, whether a coordinate indication on operation image 254 shown in FIG. 12 or 13 has been given or not is determined.

When an instruction to start the graffiti processing has been received (YES in step S90), operation processing unit 100 performs the graffiti processing in response to the user's operation (step S92). Then, operation processing unit 100 determines whether an instruction to end the graffiti processing has been received or not (step S94). When an instruction to end the graffiti processing has been received (YES in step S94), the process proceeds to step S96. In contrast, when an instruction to end the graffiti processing has not been received (NO in step S94), the processing in step S92 and subsequent steps is repeated.

In contrast, when an instruction to start the graffiti processing has not been received (NO in step S90), the process proceeds to step S98.

The steps S92 to S96 described above correspond to the contents in the graffiti processing described above.

In step S96, operation processing unit 100 determines whether an instruction to complete the album creation processing has been received or not (step S96). Namely, whether a coordinate indication on operation image 256 shown in FIG. 12 or 13 has been given or not is determined. When an instruction to complete the album creation processing has not been received (NO in step S96), the processing in step S22 and subsequent steps is repeated.

When an instruction to complete the album creation processing has been received (YES in step S96), operation processing unit 100 provides display of contents in the album being created on upper LCD 110 (step S98). In addition, operation processing unit 100 determines whether an instruction to complete the album has been received or not (step S100). Namely, whether a coordinate indication on operation image 302 shown in FIG. 24 has been given or not is determined. When an instruction to complete the album has not been received (NO in step S100), the processing in step S98 and subsequent steps is repeated.

When an instruction to complete the album has been received (YES in step S100), operation processing unit 100 provides screen display of contents that the user is inquired about where to save the generated album data (step S102). Namely, operation processing unit 100 provides display of contents as shown in FIG. 25 on upper LCD 110 and lower LCD 120.

In succession, operation processing unit 100 determines where to save the album data has been indicated or not (step S104). Namely, on which of operation image 306 and operation image 308 shown in FIG. 25 a coordinate indication has been given is determined.

When non-volatile memory 136 (see FIG. 4) is indicated as the saving destination of the album data ("main body" in step S104), operation processing unit 100 sets non-volatile memory 136 as the saving destination of the album data (step S106). Then, the process proceeds to step S110.

In contrast, when non-volatile memory 136 (see FIG. 4) has been indicated as the saving destination of the album data ("SD card" in step S104), operation processing unit 100 sets memory card 173 (see FIG. 1) as the saving destination of the album data (step S108). Then, the process proceeds to step S110.

The steps S96 to S108 described above correspond to the contents in the preview processing described above.

In step S110, operation processing unit 100 obtains attribute information on the album of interest and notifies the user of the album data output processing, with the collected attribute information being set as the initial value (step S110). Namely, operation processing unit 100 provides display of contents as shown in FIG. 26 on upper LCD 110 and lower LCD 120. In succession, operation processing unit 100 determines whether an instruction to change the contents in the attribute information on the album data has been received or not (step S112). Namely, on which of operation image 312 and operation image 314 shown in FIG. 26 a coordinate indication has been given is determined.

When change in title in the attribute information on the album data has been indicated ("title" in step S112), operation processing unit 100 accepts input of a new title (step S114). Namely, operation processing unit 100 provides display of contents as shown in FIG. 27 on upper LCD 110 and lower LCD 120, and accepts input of a corresponding character string in response to a position indication operation accepted on touch panel 122. As the input of the character string is completed, the process proceeds to step S118.

When change in icon in the attribute information on the album data has been indicated ("icon" in step S112), operation processing unit 100 accepts an instruction to change the icon (step S116). Namely, operation processing unit 100 provides display of contents as shown in FIG. 28 or 29 on upper LCD 110 and lower LCD 120, and accepts input of the selected icon in response to a position indication operation accepted on touch panel 122. As selection of the icon is completed, the process proceeds to step S118.

In step S118, operation processing unit 100 determines whether an instruction to complete the album data output processing has been received or not (step S118). Namely, whether a coordinate indication on operation image 316 shown in FIG. 26 has been given or not is determined.

When an instruction to complete the album data output processing has been received (YES in step S118), operation processing unit 100 generates album data based on information held in main memory 138 (see FIG. 4) (information for specifying image data showing an image of interest (a folder name, a file name and the like) or information for specifying audio data associated with each image of interest (a folder name, a file name and the like)) (step S120). Namely, operation processing unit 100 generates album data having a data structure as shown in FIG. 31. In addition, operation processing unit 100 outputs (causes saving of) the generated album data to the saving destination set in step S106 or step S108 (step S122).

In contrast, when an instruction to complete the album data output processing has not been received (NO in step S118), the processing in step S112 and subsequent steps is repeated.

The steps S110 to S120 described above correspond to the contents in the album data output processing described above. Then, the process ends.

<K. Variation>

(k1. First Variation)

In the embodiment described above, game device 1 adopting such a foldable structure that upper LCD 110 and lower LCD 120 face each other with a pivot shaft being interposed has been exemplified, however, the game device is not limited to such a form. For example, a form may be such that a housing accommodating upper LCD 110 and a housing accommodating lower LCD 120 are slidably engaged with each other. Alternatively, such a form that a plurality of LCDs are arranged in the same housing may be adopted.

Relative positional relation among the plurality of LCDs is not limited to relation in a vertical direction and such a construction that a plurality of LCDs are aligned in a lateral direction can also be adopted.

(k2. Second Variation)

In the embodiment described above, an example where a certain embodiment is implemented as game device 1 representing one example of an information processing apparatus is shown, however, a manner other than this can also be adopted.

For example, an exemplary embodiment(s) can also be implemented as a non-transitory computer readable storage medium contained in some kind of information processing apparatus (game device 1 as described above) or as an information processing program (instruction set) stored in a non-transitory computer readable storage medium that can removably be attached to an information processing apparatus.

In the former case, the information processing program is read by a processing apparatus having display means having first and second display regions and the processing is performed in the computer.

In the latter case, an information processing system including a processing apparatus main body having such a computer as a game device or a portable terminal and a storage medium providing an information processing program to the processing apparatus main body is configured.

In any case, the information processing program stored in a computer readable storage medium does not have to include all programs necessary for processing provided by game device 1 described above. Namely, an instruction set or a library essentially possessed by the processing apparatus main body such as game device 1 may be made use of so as to realize processing provided by game device 1 according to the present embodiment described above.

In addition, in the embodiment described above, a case where a series of processing is performed in single game device 1 has been described, however, the series of processing may be performed by a plurality of information processing apparatuses in a distributed manner. For example, in an information processing system including a terminal device and a server device capable of communicating with the terminal device through a network, partial processing in the series of processing above may be performed by the server device. Further, in the information processing system including the terminal device and the server device capable of communicating with the terminal device through the network, main processing in the series of processing above may be performed by the server device and partial processing may be performed by the terminal device.

While certain example systems, methods, devices, apparatuses, and programs have been described herein, it is to be understood that the appended claims are not to be limited to the systems, methods, devices, apparatuses, and programs disclosed, but on the contrary, are intended to cover various modifications and equivalent arrangements included within the spirit and scope of the appended claims.

What is claimed is:

1. An information processing apparatus, comprising:
    a handheld housing;
    a processing unit;
    a display device configured to provide a first display area and a second display area;
    first and second operation portions included with the handheld housing and respectively positioned to be actionable by respective fingers of left and right hands holding the handheld housing;
    a third operation portion included with the handheld housing and positioned to be actionable by a finger of any one of left and right hands holding the handheld housing, the finger of any one of left and right hands being different from the respective fingers for activating the first and second operation portions; and
    a direction operation portion included with the handheld housing and positioned to be actionable by a finger of the other one of the left and right hands holding the handheld housing, the finger of the other one of the left and right hands being different from the fingers for activating the first, second, and third operations portions,
    said processing unit including:
        a first object selection unit for at least partially displaying a first object group on said first display area and selecting at least one first object from said first object group in response to an operation of said direction operation portion,
        a second object display unit for changing a selected position within an ordered second object group in response to an operation of said first or second operation portion and causing said display device to display at least one object included in said second object group on said first display area and corresponding to the selected position, and
        an object addition unit for adding a new object corresponding to the selected first object at a position corresponding to said selected position in said second object group in response to an operation of said third operation portion and then displaying at least one object included in said second object group on said second display area.

2. The information processing apparatus according to claim 1, further comprising a fourth operation portion provided on a surface where said third operation portion is located and at a position adjacent to said third operation portions, and
    said processing unit further includes an object deletion unit for deleting at least one object included in said second object group and corresponding to said selected position in response to an operation of said fourth operation portion and then causing said display device to display at least one object included in said second object group on said second display area.

3. The information processing apparatus according to claim 1, wherein
    said second object display unit is configured to display in a line objects included in said second object group in a direction in parallel to a side of said handheld housing and slide the objects included in the displayed second object group in a direction brought in correspondence with relative positional relation with said first or second operation portion relative to said first display area in response to an operation of said first or second operation portion.

4. The information processing apparatus according to claim 1, wherein
    said direction operation portion is a cross-shaped key or an analog stick, and
    said first object selection unit is configured to two-dimensionally display objects included in the first object group and display a selected image indicating the selected first object at a position in accordance with an operation of said direction operation portion.

5. The information processing apparatus according to claim 1, wherein
    said display device includes a touch panel, and
    said processing unit further includes an input processing unit capable of performing processing identical to corresponding processing performed when an operation of any of said first to third operation portions and said direction operation portion is performed, based on information detected in response to an operation of said touch panel.

6. The information processing apparatus according to claim 1, wherein
    said display device includes a screen capable of stereoscopic display.

7. The information processing apparatus according to claim 2, wherein
    said third and fourth operation portions are arranged within a reach of a user's right thumb when the user holds said first housing with both hands, and
    said direction operation portion is arranged within a reach of a user's left thumb when the user holds said first housing with both hands.

8. The information processing apparatus according to claim 1, wherein said first operation portion is arranged within a reach of a user's right forefinger when the user holds said first housing with both hands, and said second operation portion is arranged within a reach of a user's left forefinger when the user holds said first housing with both hands.

9. An information processing apparatus, comprising:

a handheld housing;

at least one processing unit;

a display device configured to provide a first display area and a second display area, first and second operation portions included with the handheld housing and respectively positioned to be actionable by respective fingers of left and right hands holding the handheld housing;

a third operation portion included with the handheld housing and positioned to be actionable by a finger of any one of left and right hands holding the handheld housing, the finger of any one of left and right hands being different from the respective fingers for activating the first and second operation portions; and a direction operation portion included with the handheld housing and positioned to be actionable by a finger of the other one of the left and right hands holding the handheld housing, the finger of the other one of the left and right hands being different from the fingers for activating the first, second, and third operations portions, said processing unit including a first object selection unit for at least partially displaying a first object group on said first display area and selecting at least one first object from said first object group in response to an operation of said direction operation portion, a second object display unit for changing a selected position within an ordered second object group in response to an operation of said first or second operation portion and causing said display device to display at least one object included in said second object group on said second display area and corresponding to the selected position, and an association unit for associating data corresponding to the selected first object with data showing at least one object included in said second object group and corresponding to the selected position in said second object group in response to an operation of said third operation portion and then displaying the associated object on said second display area, with association with the data being shown.

10. The information processing apparatus according to claim 9, further comprising a fourth operation portion provided on a surface where said third operation portion is located an at a position adjacent to said third operation portion, and said processing unit further includes an association cancellation unit for canceling association with data showing at least one object included in said second object group and corresponding to the selected position in said second object group in response to an operation of said fourth operation portion and causing said display device to display the object, of which association has been canceled, on said second display area, with absence of association with data being shown.

11. The information processing apparatus according to claim 9, wherein said second object display unit is configured to display in a line objects included in said second object group in a direction in parallel to a side of said handheld housing and slide the objects included in the displayed second object group in a direction brought in correspondence with relative positional relation with said first or second operation portion relative to said first display area in response to an operation of said first or second operation portion.

12. The information processing apparatus according to claim 9, wherein said direction operation portion is a cross-shaped key or an analog stick, and said first object selection unit is configured to two-dimensionally display objects included in the first object group and display a selected image indicating the selected first object at a position in accordance with an operation of said direction operation portion.

13. The information processing apparatus according to claim 9, wherein said display device includes a touch panel, and said processing unit further includes an input processing unit capable of performing processing identical to corresponding processing performed when an operation of any of said first to third operation portions and said direction operation portion is performed, based on information detected in response to an operation of said touch panel.

14. The information processing apparatus according to claim 9, wherein said display device includes a screen capable of stereoscopic display.

15. The information processing apparatus according to claim 10, wherein said third and fourth operation portions are arranged within a reach of a user's right thumb when the user holds said first housing with both hands, and said direction operation portion is arranged within a reach of a user's left thumb when the user holds said first housing with both hands.

16. The information processing apparatus according to claim 9, wherein said first operation portion is arranged within a reach of a user's right forefinger when the user holds said first housing with both hands, and said second operation portion is arranged within a reach of a user's left forefinger when the user holds said first housing with both hands.

17. An information processing system, comprising:

a non-transitory storage medium storing an information processing program; and a processing apparatus main body to which said storage medium can be attached, said processing apparatus main body including:

a handheld housing;

a processing system that includes at least one processor;

a display device configured to provide a first display area and a second display area;

first and second operation portions included with the handheld housing and respectively positioned to be actionable by respective fingers of left and right hands holding the handheld housing;

a third operation portion included with the handheld housing and positioned to be actionable by a finger of any one of left and right hands holding the handheld housing, the finger of any one of left and right hands being different from the respective fingers for activating the first and second operation portions; and a direction operation portion included with the handheld housing and positioned to be actionable by a finger of the other one of the left and right hands holding the handheld housing, the finger of the other one of the left and right hands being different from the fingers for activating the first, second, and third operations portions, said storage medium including instructions that are configured to be executed by the processing system of the processing apparatus main body, the instructions including at least:

first object selection instructions for at least partially displaying a first object group on said first display area and selecting at least one first object from said first object group in response to an operation of said direction operation portion, second object display instructions for changing a selected position within an ordered second object group in response to an operation of said first or second operation portion and displaying at least one object included in said second object group and corresponding to the selected position on said second display area, and object addition instructions for adding a new object corresponding to the selected first object at a position corresponding to the selected position in said second object group in response to an operation of said third operation portion and then displaying at least one object included in said second object group on said second display area.

18. An information processing system, comprising:
a non-transitory storage medium storing an information processing program; and
a processing apparatus main body to which said storage medium can be attached,
said processing apparatus main body including:
a handheld housing,
a processing unit,
a display device configured to provide a first display area and a second display area,
first and second operation portions included with the handheld housing and respectively positioned to be actionable by respective fingers of left and right hands holding the handheld housing,
a third operation portion included with the handheld housing and positioned to be actionable by a finger of any one of left and right hands holding the handheld housing, the finger of any one of left and right hands being different from the respective fingers for activating the first and second operation portions, and
a direction operation portion included with the handheld housing and positioned to be actionable by a finger of the other one of the left and right hands holding the handheld housing, the finger of the other one of the left and right hands being different from the fingers for activating the first, second, and third operations portions,
the information processing program stored on said storage medium including instructions for execution by the processing unit of said processing apparatus main body, the instructions including
first object selection instructions for at least partially displaying a first object group on said first display area and selecting at least one first object from said first object group in response to an operation of said direction operation portion,
second object display instructions for changing a selected position in an ordered second object group in response to an operation of said first or second opera-
tion portion and displaying at least one object included in said second object group and corresponding to the selected position on said second display area, and
association instructions for associating data corresponding to the selected first object with data showing at least one object included in said second object group and corresponding to the selected position in said second object group in response to an operation of said third operation portion and then displaying the associated object on said second display area, with association with the data being shown.

19. A computing system for creating an ordered arrangement of items, the computing apparatus comprising:
a handheld housing;
a display device that is disposed in the handheld housing and configured to simultaneously display:
a plurality of selectable items; and
at least one item from the ordered arrangement of items;
first and second inputs included with the handheld housing and respectively positioned to be actionable by respective fingers of left and right hands holding the handheld housing;
at least one other input that is different from the first and second trigger inputs included with the first body; and
a processing system that includes at least one processor and a memory, the processing system coupled to the display device, the first input, the second input, and the at least one other input, the processing system configured to:
select at least one item of the plurality of selectable items based on a selection input provided to the at least one other input;
control a position at which a new item will be inserted into the ordered arrangement of items based on input provided from the first and/or second inputs; and
insert the selected at least one item into the ordered arrangement of items in accordance with the controlled position and based on a further input provided to the at least one other input.

20. The computing system of claim 19, wherein the at least one other input includes two separate inputs included on respective left and right sides of a display screen of the display device, wherein:
the selection input is provided to one of the two separate inputs, and
the further input is provided to the other one of the two separate inputs.

21. The computing system of claim 19, wherein the at least one other input is a touch panel layered with a display screen of the display device.

22. The computing system of claim 19, wherein the display device includes a first display screen and a separately provided second display screen,
where the plurality of selectable items and the at least one item from the ordered arrangement of items are respectively, and simultaneously, displayed on the first and second display screens.

23. A handheld computing device for inserting a selected item into an ordered arrangement of items, the handheld computing device comprising:
a body with a handheld form factor;
at least one display that is configured to display:
a plurality of selectable items; and
at least one item from the ordered arrangement of items while the plurality of selectable items is displayed;
a touch screen input device that is layered with the at least one display, the touch screen input device configured to, while the plurality of selectable items and the at least one item are being displayed on the at least one display, receive:
- a first input operation at a position on the touch screen input device, the first input operation for selecting a selected item out of the plurality of selectable items displayed on the at least one display; and
- a second input operation that is different from the first input operation, the second input operation for adjusting an insert position within the ordered arrangement of items; and a processing system that includes at least one processor coupled to a memory, the processing system configured to:
- select the item from the plurality of selectable items that corresponds to the position of the first input operation;
- adjust the insert position within the ordered arrangement of items in accordance with the second input operation;
- insert the selected item into the ordered arrangement of items in accordance with the adjusted insert position; and
- update the displayed ordered arrangement of item in accordance with the inserted selected item.

* * * * *